United States Patent
Hong et al.

(10) Patent No.: US 11,470,605 B2
(45) Date of Patent: Oct. 11, 2022

(54) APPARATUS AND METHOD FOR TRANSMITTING/RECEIVING OF DATA IN WIRELESS COMMUNICATION SYSTEM

(71) Applicant: Samsung Electronics Co., Ltd., Suwon-si (KR)

(72) Inventors: Sungnam Hong, Suwon-si (KR); Yeohun Yun, Hwaseong-si (KR); Chanhong Kim, Suwon-si (KR); Taeyoung Kim, Seoul (KR); Jiyun Seol, Seongnam-si (KR); Jongbu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/936,748

(22) Filed: Jul. 23, 2020

(65) Prior Publication Data

US 2020/0351876 A1 Nov. 5, 2020

Related U.S. Application Data

(62) Division of application No. 15/887,376, filed on Feb. 2, 2018, now abandoned.

(30) Foreign Application Priority Data

Feb. 3, 2017 (KR) .................. 10-2017-0015798
Mar. 23, 2017 (KR) .................. 10-2017-0036765

(51) Int. Cl.
*H04W 72/04* (2009.01)
*H04W 72/12* (2009.01)

(52) U.S. Cl.
CPC ....... *H04W 72/0446* (2013.01); *H04W 72/12* (2013.01)

(58) Field of Classification Search
CPC ............. H04W 72/0446; H04W 72/12; H04W 72/1236; H04L 5/0007; H04L 5/00; H04L 5/0044; H04L 5/0053
(Continued)

(56) References Cited

U.S. PATENT DOCUMENTS

2007/0280166 A1 12/2007 Jung et al.
2014/0126504 A1 5/2014 Jung et al.
(Continued)

OTHER PUBLICATIONS

Sony; Dynamic Resource Sharing for eMBB/URLLC in DL; 3GPP TSG RAN WG1 Meeting #87; R1-1611545; Oct. 10-14, 2016; Lisbon, Portugal.
Guangdong Oppo Mobile Telecom; eMBB data transmission to support dynamic resource sharing between eMBB and URLLC; 3GPP TSG RAN WG1 Meeting #87; R1-1611700; Nov. 14-18, 2016; Reno, NV.
(Continued)

*Primary Examiner* — Kwang B Yao
*Assistant Examiner* — Syed M Bokhari
(74) *Attorney, Agent, or Firm* — Jefferson IP Law, LLP

(57) ABSTRACT

The present disclosure relates to a fifth generation (5G) or pre-5G communication system supporting a higher data transmission rate since fourth generation (4G) communication systems like long term evolution (LTE). A method for transmitting heterogeneous service data from a base station is provided. The method for transmitting data includes at least one processor configured to control to allocate a first resource by scheduling to provide the first service data to the first terminal, identify whether the second service data to be transmitted to the first terminal or the second terminal is generated using at least some of the first resource during the transmission of the first service data to the first terminal using the first resource, transmit the second service data by allocating the second service data to at least some of the first resource if the second service data is generated, and configure and transmit the second service data.

8 Claims, 33 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0085794 A1* | 3/2015 | Chen | H04L 5/0092 |
| | | | 370/329 |
| 2015/0256308 A1 | 9/2015 | Ma et al. | |
| 2015/0280871 A1 | 10/2015 | Xu et al. | |
| 2017/0230994 A1* | 8/2017 | You | H04L 5/0053 |
| 2017/0265169 A1 | 9/2017 | Chen et al. | |
| 2018/0206267 A1 | 7/2018 | Islam et al. | |
| 2019/0182756 A1* | 6/2019 | Wang | H04W 48/12 |
| 2019/0215133 A1 | 7/2019 | Pan et al. | |
| 2020/0092856 A1* | 3/2020 | Horiuchi | H04W 72/042 |
| 2021/0307047 A1* | 9/2021 | Lin | H04L 5/0007 |

OTHER PUBLICATIONS

Zte et al.; URLLC and eMBB frame structure and multiplexing; 3GPP TSG-RAN WG1 Meeting #87; R1-1611709; Nov. 14-18, 2016; Reno, NV.

ETRI; Dynamic resource sharing between eMBB and URLLC in DL; 3GPP TSG RAN WG1 Meeting #87; R1-1612222; Nov. 14-18, 2016; Reno, NV.

Korean Office Action dated Jan. 27, 2021, issued in a counterpart Korean Application No. 10-2017-0036765.

ZTE, ZTE Microelectronics, URLLC and eMBB frame structure and multiplexing, 3GPP TSG RAN WG1 #87; R1-1608957; Nov. 5, 2016, Lisbon, Portugal.

Indian Office Action dated Jan. 4, 2022, issued in a counterpart Indian Application No. 201947031325.

* cited by examiner

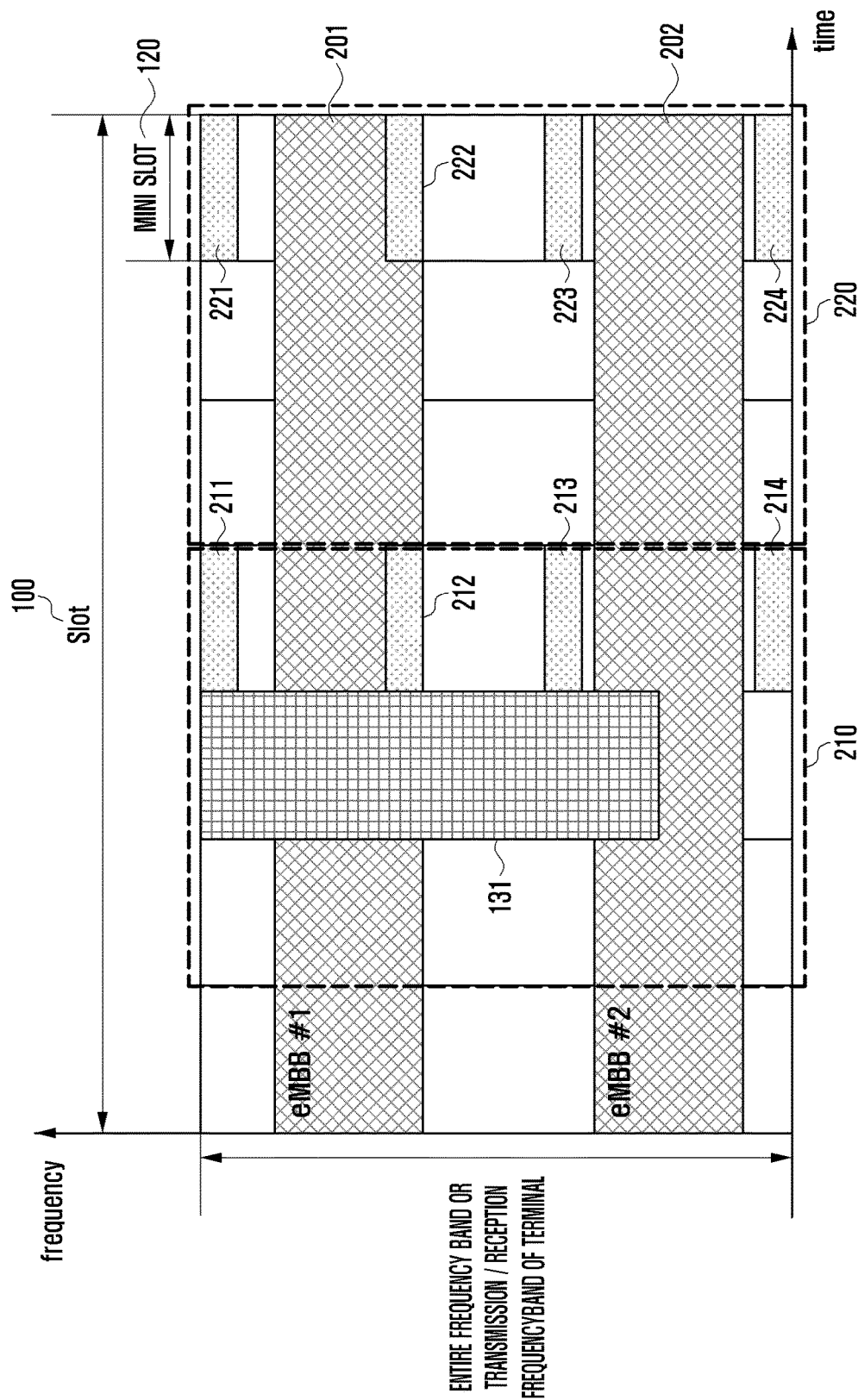

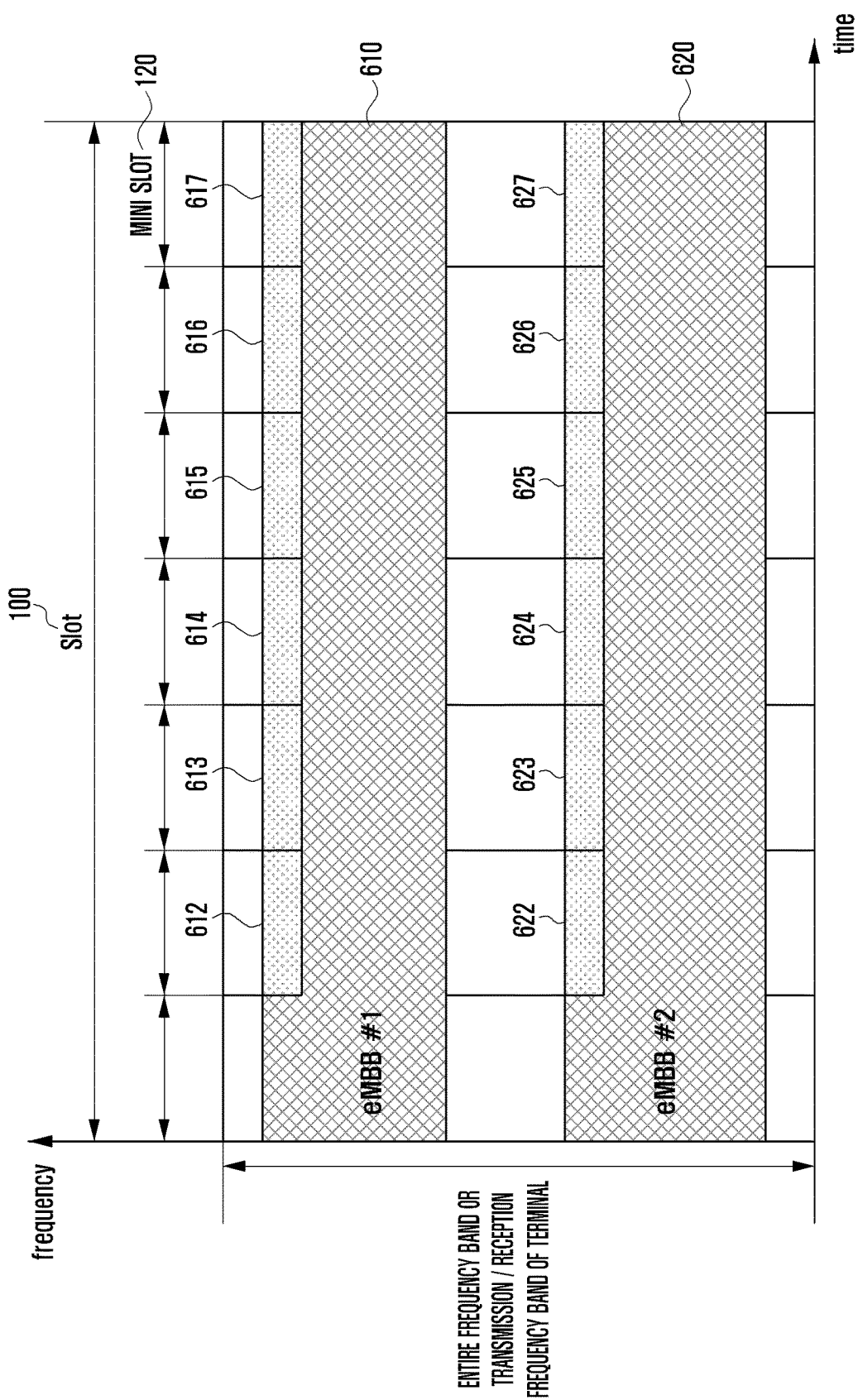

FIG. 8A
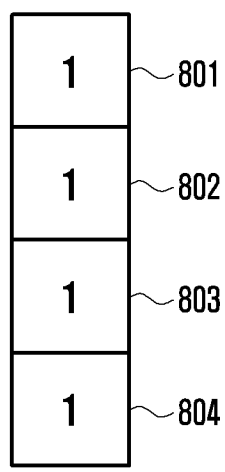 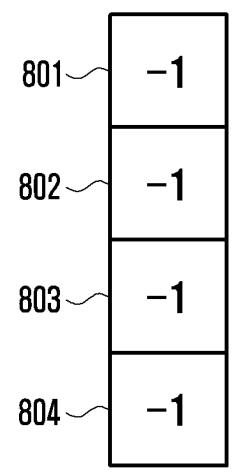
WHEN INDICATION INFORMATION IS 0   WHEN INDICATION INFORMATION IS 1

FIG. 8B
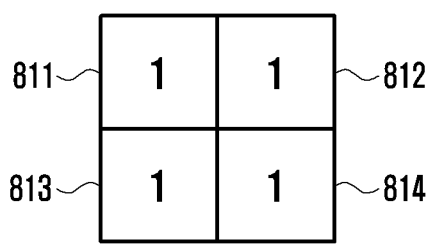
WHEN INDICATION INFORMATION IS 0
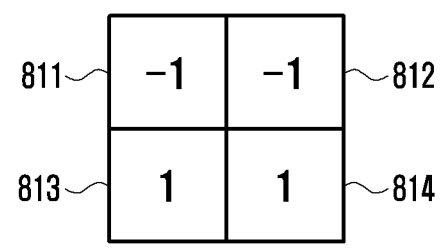
WHEN INDICATION INFORMATION IS 1

FIG. 8C

| 821 | 822 | 823 | 824 |
|---|---|---|---|
| 1 | 1 | 1 | 1 |

WHEN INDICATION INFORMATION IS 0

| 821 | 822 | 823 | 824 |
|---|---|---|---|
| −1 | −1 | 1 | 1 |

WHEN INDICATION INFORMATION IS 1

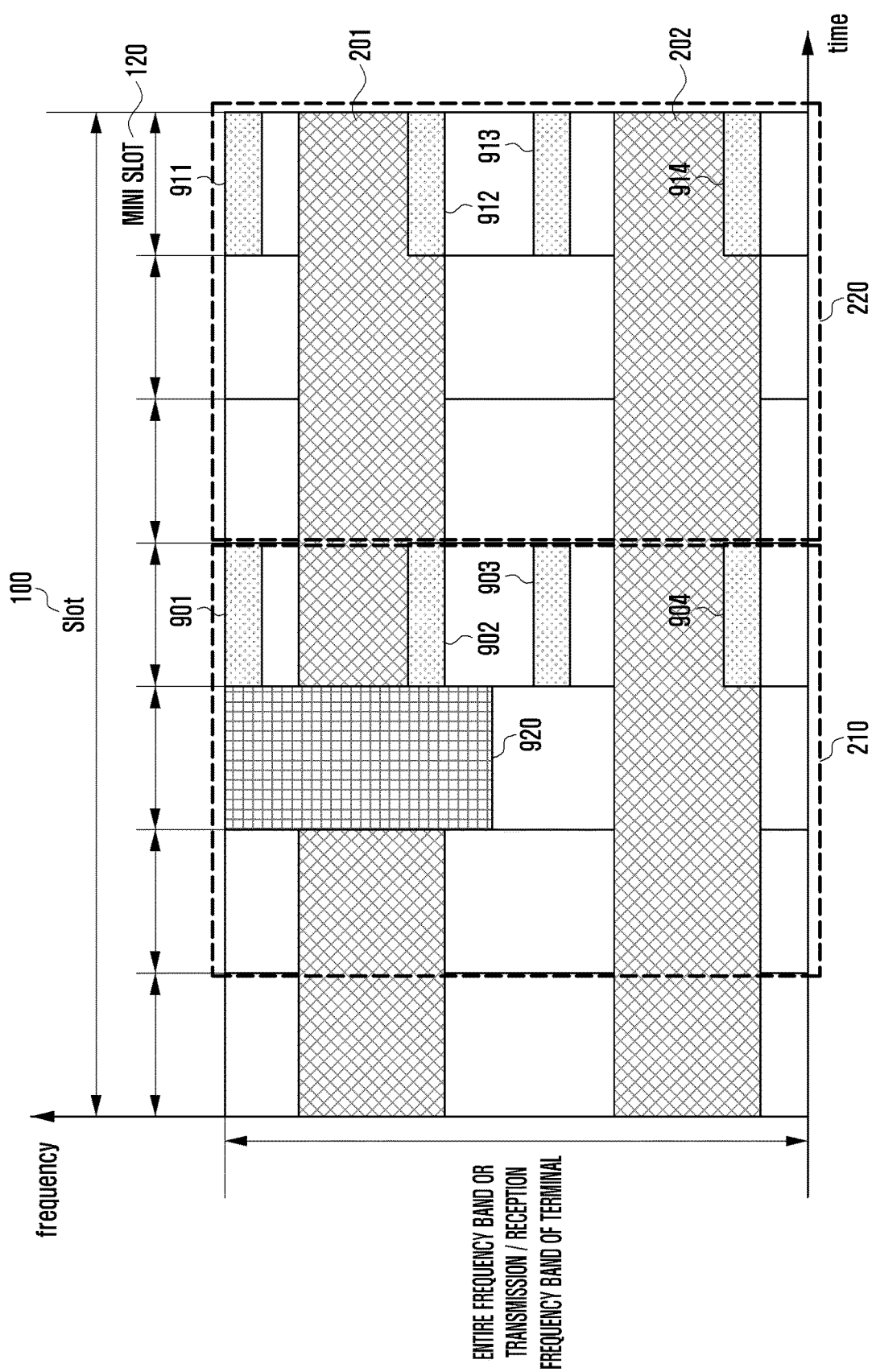

APPARATUS AND METHOD FOR TRANSMITTING/RECEIVING OF DATA IN WIRELESS COMMUNICATION SYSTEM

CROSS-REFERENCE TO RELATED APPLICATION(S)

This application is a divisional application of prior application Ser. No. 15/887,376, filed on Feb. 2, 2018, and claimed priority under 35 U.S.C. § 119 to Korean Patent Application Nos. 10-2017-0015798, filed on Feb. 3, 2017 in the Korean Intellectual Property Office, and under 35 U.S.C. § 119 to Korean patent application 10-2017-0036765 filed on Mar. 23, 2017 in the Korean Intellectual Property Office, the disclosure of each of which is incorporated by reference herein in its entirety.

TECHNICAL FIELD

The present disclosure relates to an apparatus and method for transmitting/receiving data in a wireless communication system. More particularly, the present disclosure relates to an apparatus and a method for transmitting/receiving data for providing heterogeneous service data in a wireless communication system.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system.

To achieve a high data transmission rate, the 5G communication system is considered to be implemented in a very high frequency (mmWave) band (e.g., like 60 GHz band). To relieve a path loss of a radio wave and increase a transfer distance of the radio wave in the mmWave band, in the 5G communication system, beamforming, massive multiple input and multiple output (MIMO), full dimensional MIMO (FD-MIMO), array antenna, analog beam-forming, and large scale antenna technologies have been discussed.

Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition to this, in the 5G system, hybrid frequency-shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

The 5G system has considered a support for various services compared to the existing 4G system based on various types of technological developments. For example, the most representative services are an enhanced mobile broadband (eMBB) communication service, an ultra-reliable and low latency communication (URLLC) service, a massive machine type communication (mMTC) service, an evolved multimedia broadcast/multicast service (eMBMS), and the like. Unlike the existing 4G system, the URLLC service is a service that is newly considered in the 5G system and need to satisfy ultra-high reliability (packet error rate of 10-5) and low latency (0.5 msec) conditions, compared to other services. In order to satisfy the strict requirements, the URLLC service needs to apply a transmission time interval (TTI) shorter than the eMBB service, and various operating methods utilizing the TTI have been considered.

For example, it is possible to consider a scenario in which the eMBB service is operated by being scheduled based on the eMBB TTI in the downlink network environment and the URLLC service is operated by being scheduled based on the TTI shorter than the eMBB TTI. In this case, the base station may transmit the URLLC packet while transmitting the eMBB service packet. As such, when the URLLC packet needs to be transmitted during the transmission of the eMBB service packet, some of the resources allocated to the eMBB service need to be allocated to provide the URLLC service instead of the eMBB service data due to the characteristics of the URLLC service. As described above, when some of the resources allocated to the eMBB service in advance are allocated to provide the URLLC service instead of the eMBB service data, there may be a problem in that the terminal receiving the eMBB service processes the URLLC service data by recognizing the URLLC service data as the eMBB service data. Therefore, the data reception performance of the terminal receiving the eMBB service may seriously deteriorate.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, aspects of the present disclosure are directed to the provision of an apparatus and a method for efficiently allocating resources when heterogeneous services having different characteristics are provided in a wireless communication system.

Embodiments of the present disclosure are directed to the provision of an apparatus and a method for increasing reception efficiency of data when heterogeneous services having different characteristics are provided in a wireless communication system.

Embodiments of the present disclosure are directed to the provision of an apparatus and a method for explicitly/implicitly providing resource allocation information to each service when heterogeneous services having different characteristics are provided in a wireless communication system.

Embodiments of the present disclosure are directed to the provision of the provision of an apparatus and a method for efficient decoding by explicitly/implicitly using resource allocation information to each service when heterogeneous services having different characteristics are provided in a wireless communication system.

Embodiments of the present disclosure are directed to the provision of an apparatus and a method for recognizing resources allocated to each service when heterogeneous services having different characteristics are provided in a wireless communication system.

In accordance with an aspect of the present disclosure, a method for transmitting heterogeneous service data from a base station which is a method for transmitting data is provided. The method includes transmitting a first service data by allocating a first resource through scheduling the first service data to be transmitted to a first terminal, identifying whether a second service data to be transmitted to the first terminal or a second terminal is generated using at least some of the first resource during a transmission of the first service data to the first terminal, transmitting the second service data by allocating the second service data to at least some of the first resource if the second service data is generated, and configuring and transmitting the second service data to notify and indicate the transmission of the second service data at an indication information transmission time of a time closest to a transmission time of the second service data among next times including the transmission time of the second service data.

In accordance with another aspect of the present disclosure, a base station apparatus for transmitting heterogeneous service data which is an apparatus for transmitting data is provided. The base station includes a first service data generator configured to generate a first service data to be transmitted to a first terminal based on scheduling information, a second service data generator configured to generate a second service data to be transmitted to the first terminal or a second terminal, a frame configuration unit configured to form a first data generated from the first service data generator and a second data generated from the second service data generator as one frame, a radio transmitter configured to transmit the data generated from the frame configuration unit as a signal in a transmission band, and a controller configured to control to allocate a first resource by scheduling to provide the first service data to the first terminal, identify whether the second service data to be transmitted to the first terminal or the second terminal is generated using at least some of the first resource during the transmission of the first service data to the first terminal using the first resource, transmit the second service data by allocating the second service data to at least some of the first resource if the second service data is generated, and configure and transmit the second service data to notify the transmission of the second service data at an indication information transmission time of a time closest to a transmission time of the second service data among next times including the transmission time of the second service data.

In accordance with another aspect of the present disclosure, a method for receiving, by a terminal, a service data which is a method for receiving data is provided. The method includes receiving a first service data through a scheduled first resource, detecting indication information indicating whether to transmit a second service data in the first resource, identifying whether to transmit the second service data using the indication information, detecting the second service data when the second service data is transmitted through the first resource, and puncturing the second service data and decoding only the received first service data.

In accordance with another aspect of the present disclosure, a terminal apparatus for receiving data which is an apparatus for receiving data is provided. The terminal apparatus includes a wireless receiver configured to convert a radio signal received through a set band into a baseband signal, and a communication processor configured to receive data through a first resource allocated to the terminal, detect indication information indicating whether to transmit a second service data in the first resource, identify whether to transmit the second service data using the indication information, detect the second service data when the second service data is transmitted through the first resource, and puncture the second service data and decode only the received first service data.

In accordance with another aspect of the present disclosure, a method for transmitting heterogeneous service data from a base station is provided. The method includes transmitting a first service data to be transmitted to a first terminal by scheduling by allocating the first service data to a first resource, transmitting a second service data of the same kind as the first service data to be transmitted to a second terminal by allocating the second service data to a second resource through scheduling, identifying whether a third service data of a kind different from a first service data to be transmitted to the first terminal is generated using at least some of the first resource during a transmission of the first service data to the first terminal, transmitting the third service data by allocating the third service data to at least some of the first resource if the third service data is generated, identifying whether a fourth service data of a kind different from the second service data to be transmitted to the second terminal is generated using at least some of the second resource during the transmission of the second service data to the second terminal, transmitting the fourth service data by allocating the fourth service data to at least some of the second resource if the fourth service data is generated, transmitting first indication information by configuring the first indication information notifying a transmission of the third service at an indication information transmission time closest to a transmission time of the third service data among next times including the transmission time of the third service data in the first resource scheduled to transmit the first service data, and transmitting second indication information by configuring the second indication information notifying a transmission of the fourth service at an indication information transmission time closest to a transmission time of the fourth service data among next times including the transmission time of the fourth service data in the second resource scheduled to transmit the second service data.

According to the embodiment of the present disclosure, it is possible to efficiently allocate resources when the heterogeneous services having different characteristics are provided in the wireless communication system and recognize resources allocated to each service based on the allocated resources. Also, according to the embodiment of the present disclosure, it is possible to increase the transmission/reception efficiency of data when the heterogeneous services having different characteristics are provided in the wireless communication system. In addition, according to the embodiment of the present disclosure, it is possible to explicitly/implicitly provide the resource allocation information to each service when the heterogeneous services having different characteristics are provided in the wireless communication system and perform the efficient decoding using the explicitly/implicitly provided resource allocation information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a frame structure diagram including indication information for indicating a second service data transmission when the second service data is transmitted in some of a first service data area according to an embodiment of the present disclosure;

FIGS. 6A, 6B, 6C, 6D are diagrams for transmitting indication information based on a resource allocated to a receiving terminal according to another embodiment of the present disclosure;

FIGS. 8A, 8B, and 8C are diagrams illustrating a method of transmitting indication information in a case in which a sequence length is 4 according to an embodiment of the present disclosure;

FIG. 9 is a frame structure diagram including indication information for indicating a second service data transmission when the second service data is transmitted in some of a first service data area according to another embodiment of the present disclosure;

Throughout the drawings, it should be noted that like reference numbers are used to depict the same or similar elements, features, and structures.

DETAILED DESCRIPTION

Figure 1A:
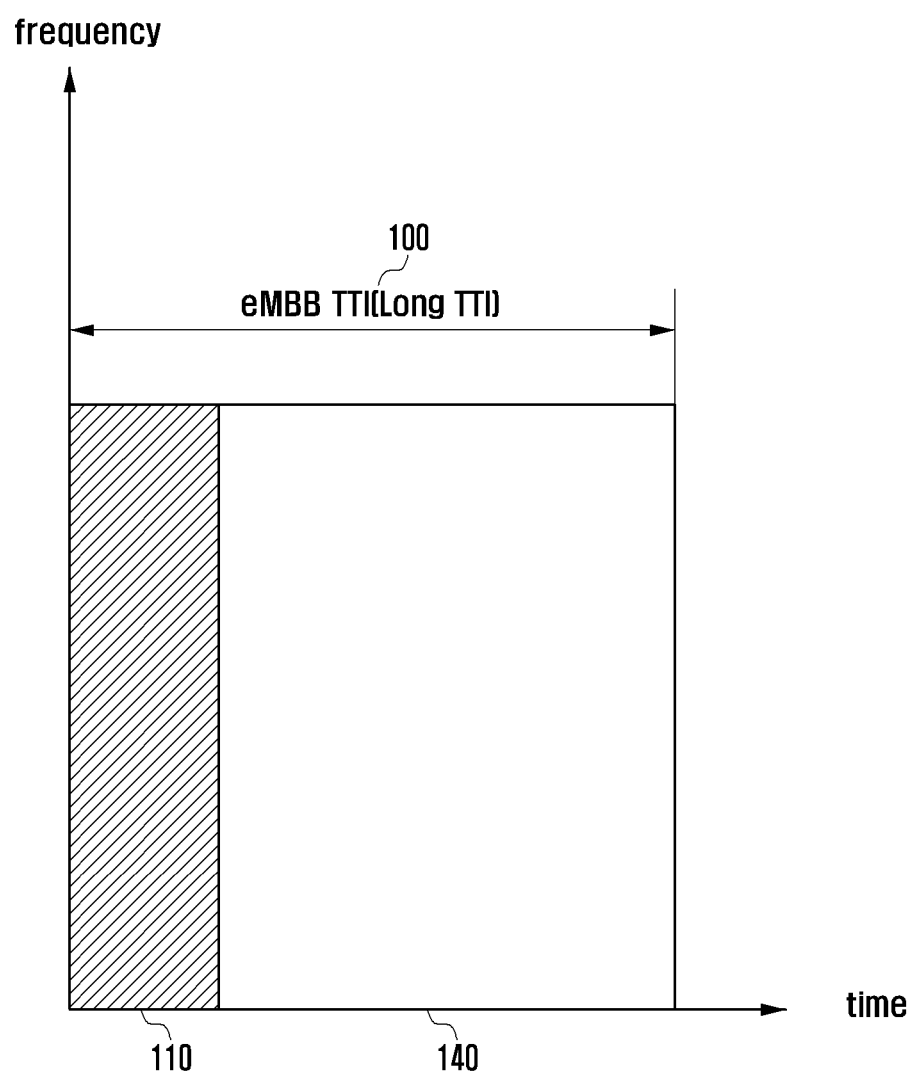
FIG. 1A is a diagram for explaining a resource allocation unit in an enhanced mobile broadband (eMBB) service in a fifth generation (5G) wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to describing the present disclosure, a fifth generation (5G or new radio) wireless communication system will be briefly described. The 5G wireless communication system has a band even wider than that of the existing third generation (3G) and fourth generation (4G or long term evolution (LTE) or LTE-advanced (LTE-A)) wireless communication systems. In addition, the existing 3G and fourth generation (4G or LTE or LTE-A) wireless communication systems need to be considered to support backward compatibility when defining standard protocols, but the 5G wireless communication system defines standard protocols in consideration of forward compatibility. According to the policy of the standard protocols, the 5G wireless communication system defines a use case for three services largely. The three services defined in the 5G generation wireless communication system are as follows.

First, there is an enhanced mobile broadband (eMBB) service based on the enhanced transmission rate. Second, there is, as an enhanced machine type communication (eMTC) service based on a large scale Internet of Things, a data communication service capable of acquiring and transmitting necessary information anytime and anywhere by wirelessly connecting without a direct operation or intervention of a person. Finally, there is an ultra-reliable low latency communication (URLLC) service based on ultra-low latency and high reliability.

For convenience of explanation, in the following description of the above-mentioned services, the data communication service based on the enhanced transmission rate which is the first service will be described using one of 'data communication', 'data communication service', 'eMBB', 'eMBB service' and 'eMBB communication service'. Here, even though the respective terms are used interchangeably, they should be understood as the same meaning.

The communication service based on the large scale Internet of Things which is the second service will be described using one of the 'Internet of Things', 'Internet of Things service', 'eMTC communication', 'eMTC communication service', and 'eMTC service'. Here, even if the respective terms are used interchangeably, they should be understood as the same meaning.

In addition, the Internet of things communication service based on the ultra-low latency and high reliability which is the third service will be described using one of 'ultra-low latency service', 'high reliability service', 'ultra-low latency communication', 'high reliability communication', 'ultra-low latency and high reliability Internet of things communication', 'ultra-low latency and high reliability Internet of things communication service', 'URLLC', 'URLLC communication', 'URLLC service', and 'URLLC communication service'. Here, the respective terms are used interchangeably, they should be understood as the same meaning.

Hereinafter, resources to which an eMBB service and a URLLC service are provided will be described with reference to FIGS. 1A and 1B.

Figure 1B:
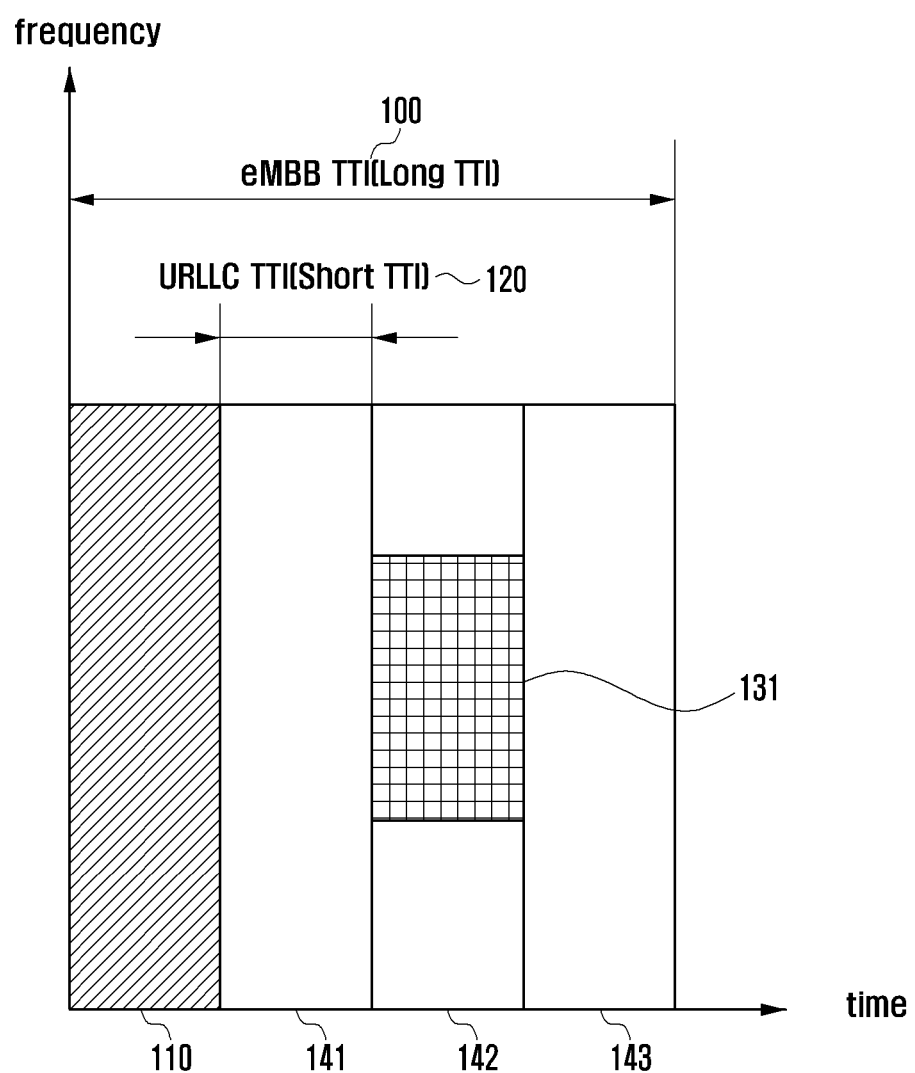
FIG. 1B is a diagram illustrating a case in which an ultra-reliable and low latency communication (URLLC) service is allocated to a resource allocation area of the eMBB service according to an embodiment of the present disclosure.

FIG. 1A is a diagram for describing a resource allocation unit in an eMBB service in a 5G wireless communication system according to an embodiment of the present disclosure, and FIG. 1B is a diagram for describing a case in which a URLLC service is allocated to a resource allocation area of an eMBB service according to an embodiment of the present disclosure.

Referring to FIG. 1A, a horizontal axis is a time resource and a vertical axis is a frequency resource. In the wireless communication system, the allocation of resources may be allocated in a frequency resource unit and a time resource unit. In FIGS. 1A and 1B, it is assumed that a predetermined frequency band or a predetermined number of frequency resources are allocated in the frequency resource unit. At this time, the time resources may be allocated in the same form or different forms according to each service in the 5G generation wireless communication system. The case in which a time resource is allocated to an eMBB service will be described with reference to FIG. 1A. A unit for allocating time resources in the eMBB service, that is, a transmission time interval (TTI), is units of a long TTI 100. The long TTI for allocating the time resource to the eMBB service includes an interval in which an eMBB control channel 110 for transmitting control information is transmitted and a short TTI or mini slot 120 in which an eMBB service data is transmitted.

FIG. 1B is a diagram for describing resources to which an eMBB service and a URLLC service are provided according to an embodiment of the present disclosure.

Referring to FIG. 1B, an eMBB service resource and a URLLC service resource will be compared with each other. Even in FIG. 1B, it is assumed that a predetermined frequency band or a predetermined number of frequency resources are allocated in the frequency resource unit as described above. In this case, resources are allocated to the eMBB service resources in units of the long TTI 100 as described above. The long TTI 100 includes an interval in which an eMBB control channel 110 for transmitting control information is transmitted and an interval in which an eMBB service data 140 is transmitted. In addition, the URLLC service may be allocated resources in a time interval unit of a short TTI or mini slot 120 instead of the unit of the long TTI 100. The mini slot 120 in which data is transmitted in the long TTI 100 may include a time interval unit of at least two mini slot TTIs 120. FIG. 1B illustrates a form including three short TTIs 141, 142, and 143. However, a data transmission interval of the long TTI 100 may be configured to include a larger number of short TTIs than three short TTIs illustrated in FIG. 1B, or include a smaller number of short TTIs than three short TTIs.

Hereinafter, it will be described that the respective services are allocated with reference to the above-mentioned FIGS. 1A and 1B. As described above, when the wireless communication system provides an eMBB service to a specific terminal, resources may be allocated in units of an eMBB TTI, that is, the units of the long TTI 100. Therefore, as described with reference to FIG. 1A, one eMBB TTI may be divided into an eMBB control channel 110 and an eMBB service data 140 for transmitting control information. The base station inserts control information necessary for receiving data in a terminal receiving the eMBB service data 140 in the eMBB control channel 110 and transmits the inserted control information. Accordingly, the eMBB receiving terminal may first receive the eMBB control channel 110, and demodulate and decode the eMBB service data 140 based on the information included in the eMBB control channel 110.

On the other hand, the URLLC data is data requiring ultra-low latency and high reliability. Therefore, when the URLLC data is generated in a burst, it should be urgently transmitted. Therefore, as illustrated in FIG. 1B, resources should be allocated in units of a very short TTI, and data should be transmitted as soon as they are generated. Since data should be transmitted in the units of the very short TTI, frequency resources that can transmit available frequency resources, for example, URLLC data may be allocated to other all terminals in advance. In this case, when considering priority between the eMBB service and the URLLC service, the URLLC service has higher priority. Therefore, it is necessary to transmit the URLLC data by allocating resources necessary for the URLLC service by using some of the resources already allocated to the eMBB service.

FIG. 1B illustrates a case in which some of the eMBB resources allocated to a specific terminal are allocated to transmit URLLC data. That is, the case in which some of the eMBB resources of long TTI 100 allocated to the specific terminal are used to transmit the URLLC data is the case in which the area of eMBB service data 140 is filled with eMBB data to be already transmitted to the corresponding terminal. Therefore, the base station may puncture or remove data allocated to some of the resources in the area of eMBB service data 140, and may insert a URLLC data 131 into the punctured location and transmit the inserted URLLC data 131. As described above, when the base station punctures or removes the data allocated to some of the resources in the area of eMBB service data 140 and inserts the URLLC data 131 into the punctured location and transmits the inserted URLLC data 131, the receiving terminal receiving the eMBB service may transmit other data by including the other data in the received data, instead of the data of the receiving terminal.

When the receiving terminal receiving the eMBB service receives the URLLC data to be transmitted to other terminals within the long TTI 100 allocated to the receiving terminal, the receiving terminal performs demodulation and decoding the URLLC data instead of its own data. The receiving terminal requests a retransmission to the base station when failing to perform the demodulation and decoding. In addition, when using a hybrid automatic repeat request (HARQ) scheme for combining and demodulating received data, the receiving terminal may perform the decoding by recognizing wrong data as its own data and thus may request more retransmissions than usual cases. As a result, since many retransmissions are required in the system due to the burst type URLLC data, there may be the problem in that a waste of the band may be caused and a waste of unnecessary power may be caused in the terminal.

Therefore, the present disclosure described below describes a technology for providing an apparatus and a method for recognizing, by an eMBB receiving terminal, a URLCC service provided by using some of the resources allocated to the eMBB service as illustrated in FIG. 1B. That is, the present disclosure will describe an apparatus and a method for indicating, by a receiving terminal of a first service, a case in which there are heterogeneous services and a second service data is transmitted together using some of resources allocated to the first service. The indication method may perform an explicit/implicit indication. In addition, an apparatus and a method for increasing processing efficiency of received data by allowing a receiving terminal to use explicitly or implicitly indicated information will be described.

In addition, in the present disclosure described below, various forms of examples for utilizing indication information, various forms for transmitting indication information, and the like will be described. In addition, in the present disclosure described below, methods for utilizing, by a receiver, these forms will be described.

Method for Transmitting Indication Information

Hereinafter, when there are different types of heterogeneous services and the second service data is allocated to at least some of the resources to transmit the first service data and the second service data together by using the first service resource, an allocation location and a frame structure of the indication information for indicating that the second service data is included will be described.

FIG. 2 is a frame structure diagram including indication information for indicating a second service data transmission when the second service data is transmitted in some of a first service data area according to an embodiment of the present disclosure.

Referring to FIG. 2, the first service may be the eMBB service and the second service may be the URLLC service. Therefore, in the embodiment of FIG. 2, the first service is assumed to be the eMBB service, and the second service is assumed to be the URLLC service. However, it is obvious that the present disclosure may be similarly applied to a service having different names even if the service has the characteristics of the first service and the characteristics of the second service. The first service is a general data service, and may be a service in which resources are allocated in advance and data is transmitted using the allocated resources. In addition, the second service may be a burst type data service requiring ultra-low latency and high reliability.

Referring to FIG. 2, the horizontal axis is a time resource and the vertical axis is a frequency resource, as illustrated in FIGS. 1A and 1B. The frequency resource on the vertical axis may be the entire frequency band that may be used or allocated in the 5G wireless communication system or may be a transmission/reception bandwidth of a specific terminal.

Further, in FIG. 2, one slot (e.g., a long TTI 100) and a mini slot 120 are illustrated, in which one slot may be a long TTI which is a transmission time unit of one first service described in FIGS. 1A and 1B and the mini slot 120 may be a short TTI.

FIG. 2 illustrates an example in which one slot (long TTI 100) consists of seven mini slots. One or more orthogonal frequency-division multiplexing (OFDM) symbol may be included in one mini slot 120. In the embodiment of the present disclosure, a description will be made on the assumption that two OFDM symbols are included in one mini slot 120. In addition, in FIG. 2, an eMBB #1 resource 201 allocated to the first terminal and an eMBB #2 resource 202 allocated to the second terminal are illustrated. The base station may transmit data using a frequency resource band in which the eMBB #1 resource 201 allocated to the first terminal and the eMBB #2 resource 202 allocated to the second terminal are each allocated in the entire time interval within the slot (long TTI 100). At this time, as described with reference to FIG. 1B, there may occur a case in which a transmission of a burst type second service, that is, a URLLC data 131 is required in a specific time domain. As illustrated in FIG. 2, the URLLC data 131 may be transmitted using some of resources of the eMBB #1 resource 201 allocated to the first terminal and the eMBB #2 resource 202 allocated to the second terminal. As another example, when there is a smaller amount of URLLC service data, the URLLC data 131 may be transmitted using only some of the resources of the eMBB #1 resource 201 allocated to the first terminal, or may be transmitted using only some of the resources of the eMBB #2 resource 202 allocated to the second terminal.

Also, in the embodiment of the present disclosure, a plurality of mini slots included within one slot (long TTI 100) may be configured as one group. FIG. 2 illustrates the example in which each three mini slots in the remaining six mini slots other than a first mini slot in which control information of the first service is transmitted configures one group. Therefore, except for the first mini slot including the control channel for the first service data transmission, within the slot (long TTI 100), a second mini slot to a fourth mini slot are defined as one mini slot group 210 and a fifth mini slot to a seventh mini slot are defined as another mini slot group 220. As described above, within one slot (long TTI 100), the mini slots are divided in a group unit and it can be notified whether to transmit the second service within each group.

In the embodiment of FIG. 2 according to the present disclosure, to notify whether there is the URLLC service data within one slot, the indication information may be transmitted to a preset time and a location of a frequency resource like reference numerals 211, 212, 213, 214, 221, 222, 223, and 224 so that it may be transmitted by group of each mini slot. At this time, reference numerals 211, 212, 213, 214, 221, 222, 223, and 224 may be a preset location.

In FIG. 2, when the indication information is transmitted, the indication information may be configured to be transmitted by fixing a location in advance so that all terminals within a cell may receive the indication information in the same area in consideration of complexity of decoding upon the decoding of the eMBB service terminal. That is, it may be configured to be transmitted at the same location without the location being changed every slot. In this way, the base station transmitting data may more conveniently configure data to be transmitted, and the receiving terminal may always confirm whether there is the second service, that is, the URLLC service data at the same location.

Also, a large amount of indication information is not required because the indication information only should notify whether there is the second service data, that is, the URLLC service data. Therefore, the indication information may consist of one bit and may be transmitted. Also, to reduce the decoding complexity of the terminal, on/off information of the indication information may be configured to be transmitted in advance as higher signaling or higher layer information from the base station. The on/off information of the indication information will be described in more detail below. Also, since the location of the indication information is set in advance, the base station may perform rate matching in advance when the first service data, that is, the eMBB service data is configured. In addition, a method for transmitting, by a base station, only first service data without transmitting the indication information at the location or resource set to transmit the indication information when there is no second service may be applied. As described above, when the indication information is not transmitted, that is, the resource is not allocated to the indication information, the base station may perform the rate matching without considering the location of the indication information. However, the receiving terminal may always attempt to detect the detection of the indication information at the location where the indication information of the second service data is transmitted. When the base station or the cell notifies in advance that the indication information of the second service data is not transmitted through a specific upper message or signaling, it may not attempt to detect the indication information while the higher message or the signaling is valid.

If it is not informed in advance through the signaling or the like, the receiving terminal should always attempt to detect the indication information at the location of the indication information transmission resource for notifying whether there is the second service. At this time, if it is detected that there is no indication information, there may be the case that the indication information consists of only the first service data and transmitted. In addition, the base station or the cell may allocate the indication information to the resource of the indication information only when the second service data is generated, and notify the receiving terminal that the second service data is first transmitted together with the indication information and then the second service data is transmitted by using the indication information resource at the earliest time.

Also, as illustrated in FIG. 2, one or more mini slot(s) may be configured of one group to provide the indication information on whether there is the second service data for each group, such that the receiving terminal may improve eMBB decoding latency. In addition, since the terminal receiving the first service data can perform channel decoding on a coding block (CB) in a group unit based on the indication information included in the group of the mini slot, the decoding latency can be minimized. As the decoding latency is reduced, the terminal may reduce a use of an additional memory (buffer), such that the complexity and power consumption of the terminal can be reduced.

Another embodiment according to the present disclosure based on the above-mentioned method will be described.

FIGS. 3A to 3D are diagrams for transmitting indication information in a specific cell or a base station according to another embodiment of the present disclosure.

Referring to FIGS. 3A to 3D, a horizontal axis represents a time resource and a vertical axis represents a frequency resource. The frequency resource on the vertical axis may be the entire frequency band that may be used or allocated in the 5G wireless communication system or may be a transmission/reception bandwidth of a specific terminal Generally, the entire band of the 5G wireless communication system is a very wide band. Therefore, it is unreasonable for the terminal to search for the entire band of the 5G wireless communication system in consideration of the power consumption of the terminal and the like, and therefore the following description will be made under the assumption that the vertical axis represents a transmitting/receiving band that the terminal searches for or can search for. Also, the same reference numerals are used for the same parts of the reference numerals used in the drawings described above.

Figure 3A:
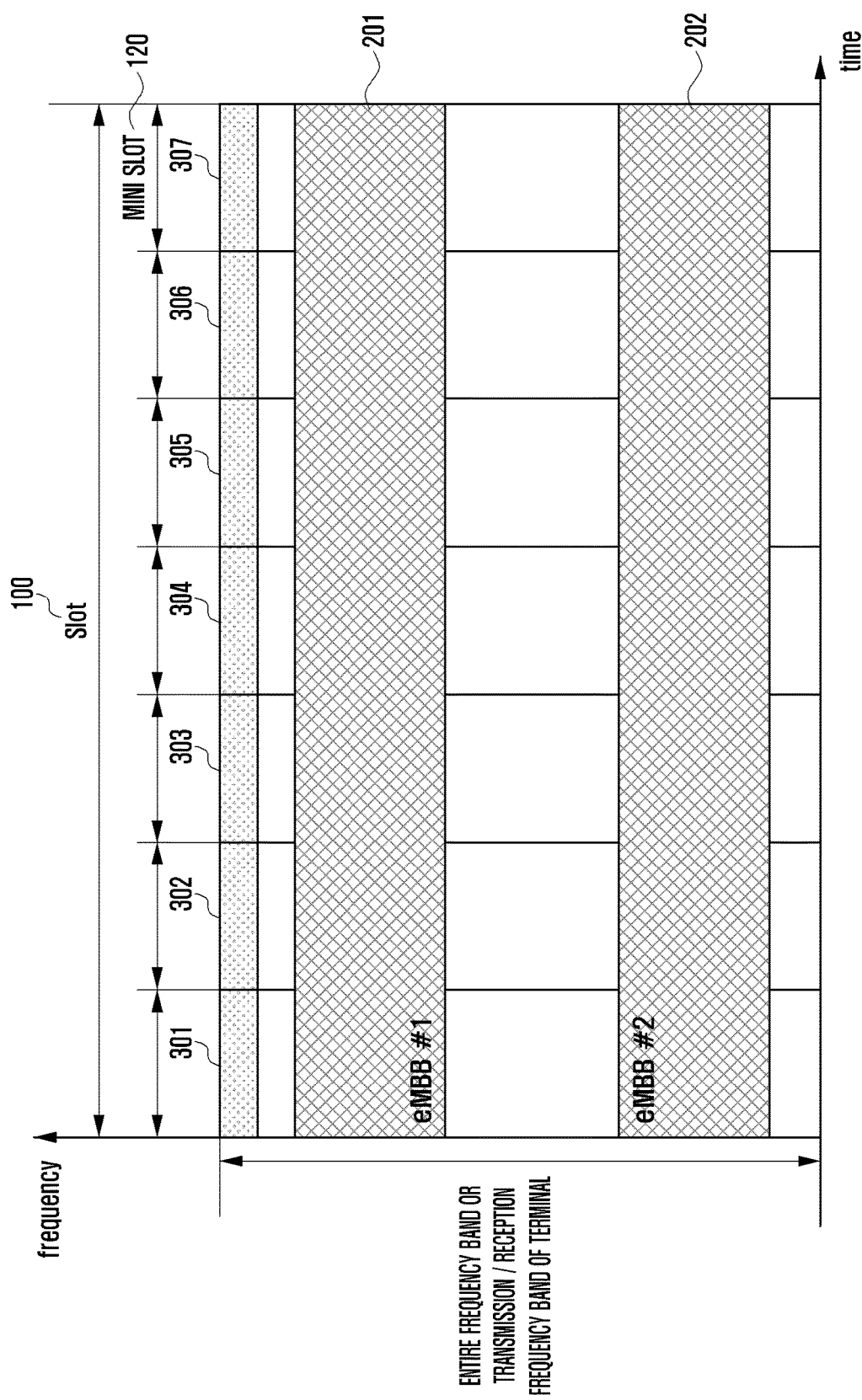
FIGS. 3A, 3B, 3C, and 3D are diagrams for transmitting indication information in a specific cell or a base station according to another embodiment of the present disclosure.
Figure 3B:
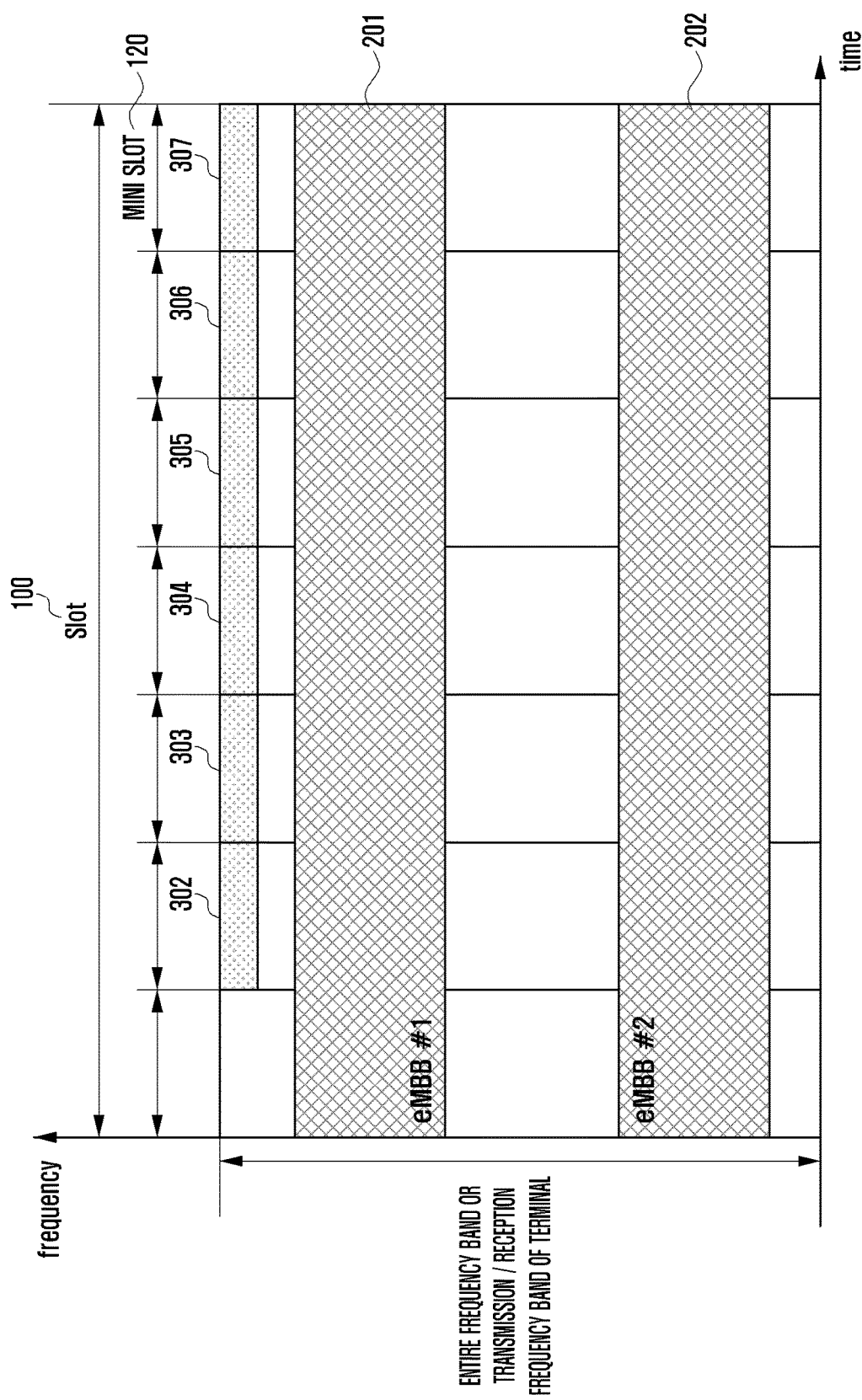

Prior to describing FIG. 3A, FIGS. 3A and 3B illustrate a case in which one slot (long TTI 100) consists of seven mini slots as described above. It is assumed that mini slot 120 may include at least one OFDM symbol, and one mini slot 120 may include two OFDM symbols as described above. In addition, FIG. 3A also illustrates an eMBB #1 resource 201 allocated to the first terminal and an eMBB #2 resource 202 allocated to the second terminal. Here, each eMBB service data may be first service data. The base station may transmit data using a frequency resource band in which the eMBB #1 resource 201 allocated to the first terminal and the eMBB #2 resource 202 allocated to the second terminal are each allocated in the entire time interval within the slot (long TTI 100).

In the example of FIG. 3A, a resource of a specific frequency band in the entire frequency band or the transmission/reception frequency band of the terminal is allocated as a resource for transmitting indication information. FIG. 3A illustrates the case in which indication information 301, 302, 303, 304, 305, 306, and 307 is transmitted in units of each mini slot in a specific band. Each of the indication information 301 to 307 may indicate whether to transmit the second service data in the corresponding mini slot. For example, when the URLLC service data transmission, which is the second service data, is transmitted in a third mini slot, only the indication information 303 of the third mini slot indicates that there is the URLLC service data transmission, and the indication information 301, 302, 304, 305, 306, and 307 of the remaining mini slots may indicate that there is no URLLC service data transmission.

In addition, as described above, the indication information may be transmitted only when there is the second service data. For example, when the URLLC service data transmission, which is the second service data, is transmitted in a third mini slot, only the indication information 303 of the third mini slot indicates that there is the URLLC service data transmission, and the indication information 301, 302, 304, 305, 306, and 307 of the remaining mini slots may also transmit the eMBB service data without transmitting the URLLC service data transmission indication information.

FIG. 3B illustrates a modified embodiment of FIG. 3A as another embodiment of the present disclosure. Describing the example of FIG. 3B by comparing with the FIG. 3A, it may be confirmed that the indication information is not transmitted in the first mini slot. A control channel may be transmitted in the first mini slot within one slot (long TTI 100) as described in FIG. 2. Therefore, it is assumed that the control channel is not transmitted in the first mini slot of each slot. If the control channel is not transmitted, the receiving terminal cannot demodulate and decode the entire data of the corresponding slot. Therefore, there may be the case in which the second service data is configured not to be transmitted in the first mini slot of each slot (long TTI 100). That is, FIG. 3B illustrates the example in which the indication information 302, 303, 304, 305, 306, and 307 is transmitted in the same manner as in FIG. 3A from the second mini slot to the seventh mini slot except for the first mini slot of the slot to be.

Even in the case of FIG. 3B, each of the indication information 302 to 307 may indicate whether to transmit the second service data in the corresponding mini slot. For example, when the URLLC service data transmission is transmitted in the second mini slot, only the indication information 302 of the second mini slot indicates that there is the URLLC service data transmission, and the indication information 303, 304, 305, 306, and 307 of the remaining mini slots may indicate that there is no URLLC service data transmission.

In addition, as described above, the indication information may be transmitted only when there is the second service data. For example, when the URLLC service data transmission, which is the second service data, is transmitted in the second mini slot, only the indication information 302 of the second mini slot indicates that there is the URLLC service data transmission, and the indication information 304, 305, 306, and 307 of the remaining mini slots may also transmit the eMBB service data without transmitting the URLLC service data transmission indication information.

Next, referring to FIG. 3C which is another embodiment, mini slots may be grouped in a predetermined number of units as described with reference to FIG. 2. When one slot consists of seven mini slots, as described above, the first slot may be a mini slot through which the control channel is transmitted. Therefore, the mini slots in which the second service data may be actually transmitted may be the second mini slot to the seventh mini slot. Therefore, FIG. 3C illustrates a case in which six mini slots from the second mini slot to the seventh mini slot are divided into two groups 310 and 320.

Figure 3C:
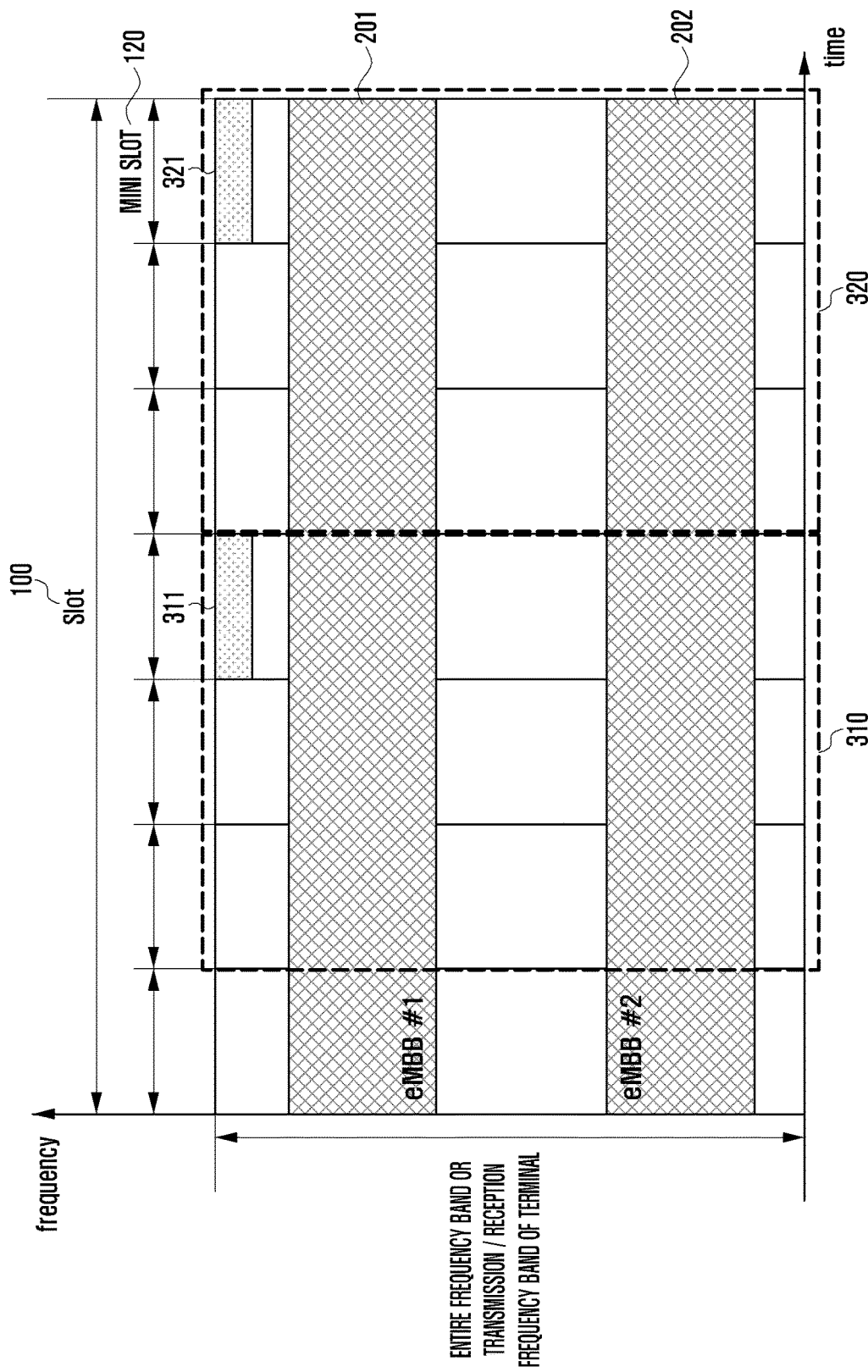

In addition, in the embodiment of FIG. 3C, the case in which one of indication information 311 and 321 is transmitted for each group is illustrated. That is, there is a case in which only one of the indication information 311 and 321 indicates whether to transmit the second service data in at least one of the mini slots in the corresponding group of the mini slots. For example, when the URLLC data, which is the second service data, is transmitted only in the fifth mini slot, the indication information 311 of the first group 310 is configured to indicate that the second service data is not transmitted. Next, the indication information 321 of the second group 320 including the fifth mini slot is configured to indicate that the second service data is included in the corresponding group and transmitted.

In addition, as described above, the indication information may be transmitted only when there is the second service data. For example, when the URLLC service data transmission, which is the second service data, is transmitted in the fifth mini slot, the indication information 311 of the first group 310 may be configured to transmit the eMBB data without being transmitted because the second service data is not transmitted. Next, the indication information 321 of the second group 320 including the fifth mini slot may be transmitted allocated to the corresponding resource because the second service data is included in the corresponding group and transmitted. At this time, the indication information 321 may be configured to indicate that the second service data is transmitted.

Figure 3D:
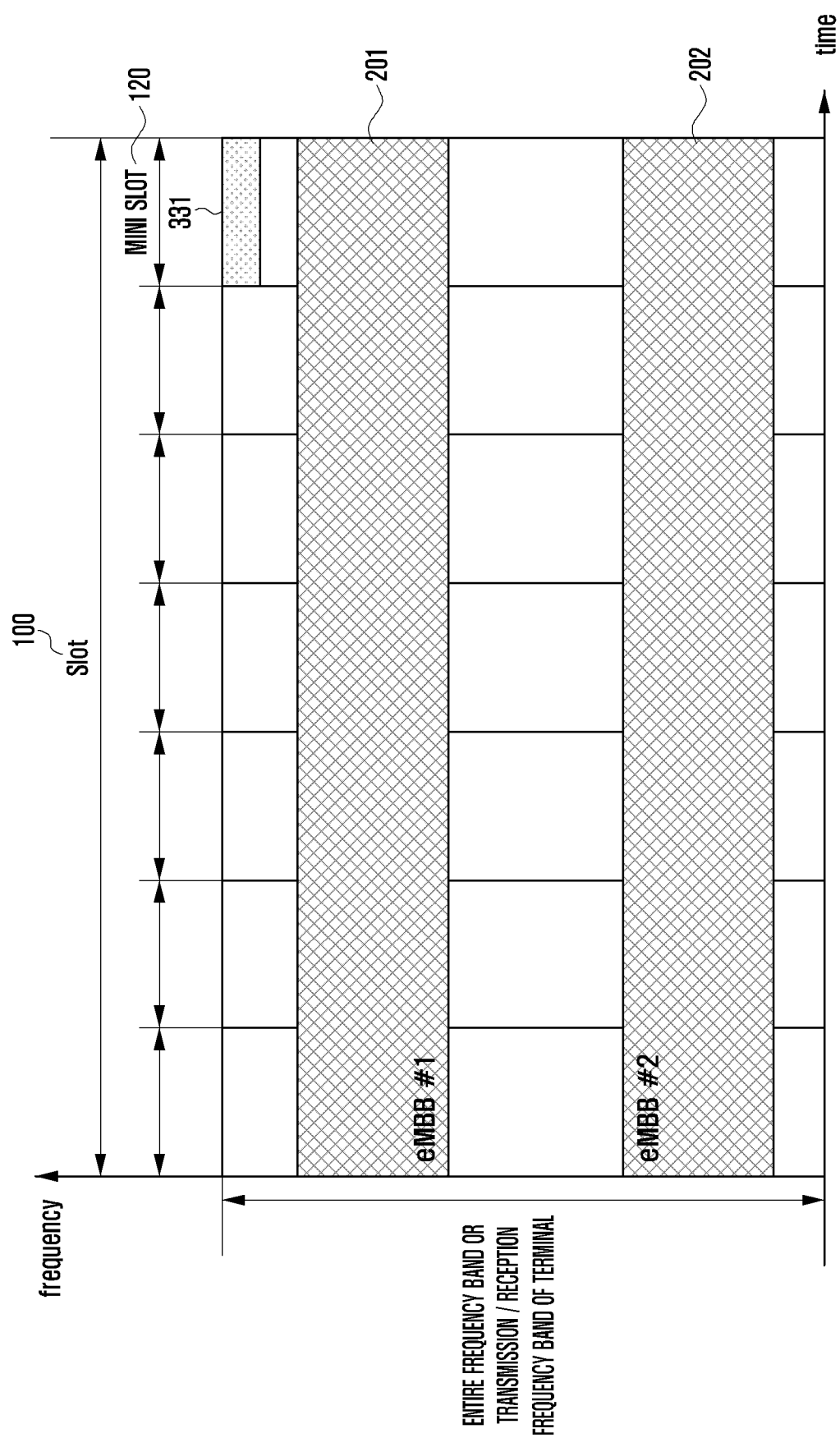

Referring to FIG. 3D which is another embodiment of the present disclosure, the indication information 331 may be configured in units of one slot (long TTI 100) instead of the units of the mini slots. For example, when the second service data is transmitted in at least one of the first mini slot to the seventh mini slot, the indication information 331 configured in the last mini slot of the corresponding slot (long TTI 100) may be transmitted by being configured to notify that the second service data is transmitted. On the other hand, when there is no transmission of the second service data in all of the first mini slot to the seventh mini slot, the indication information 331 configured in the last mini slot of the corresponding slot (long TTI 100) may be configured to notify that the second service data is not transmitted.

In addition, when there is no transmission of the second service data in all of the first mini slot to the seventh mini slot, the indication information 331 configured in the last mini slot of the corresponding slot (long TTI 100) may be configured to transmit the eMBB data without being transmitted.

As illustrated in FIGS. 3A to 3D described above, there may be a case in which it is notified whether to transmit the second service data every mini slot, several mini slots are grouped within one slot to notify whether to transmit the second service data within the grouping, or it is notified whether the second service data is transmitted in a slot unit, not a mini slot unit. That is, in the embodiment of FIGS. 3A to 3D, the indication information may be configured to be transmitted in the minimum number of times by using only resources in a frequency band in a minimum unit for transmitting the indication information in one set unit, for example, units of a mini slot, a group of mini slots, or a slot. The configurations as illustrated in FIGS. 3A to 3D have an advantage that an unnecessary waste of a bandwidth in the wireless communication system may be reduced.

However, the receiver may not accurately detect when the indication information is transmitted once using only the resource of the frequency band in the minimum unit as illustrated in FIGS. 3A to 3D. For example, the radio channel conditions of the corresponding resource may suddenly become poor or may be subject to deep fading, severe interference, and the like. As described above, when the indication information is transmitted only once in the units of the mini slot, the group of the mini slots, or the slot in each base station or the cell, a reception error may occur. The case in which the reception error occurs may be understood in the same manner as in the case in which there is no corresponding indication information as described in the related art.

Therefore, other embodiments of the present disclosure for addressing the problem will be described with reference to FIGS. 4A to 4D.

FIGS. 4A to 4D are diagrams for transmitting indication information in a specific cell or a base station according to another embodiment of the present disclosure.

Referring to FIGS. 4A to 4D, a horizontal axis represents a time resource and a vertical axis represents a frequency resource. The frequency resource on the vertical axis may be the entire frequency band that may be used or allocated in the 5G wireless communication system or may be a transmission/reception bandwidth of a specific terminal Generally, the entire band of the 5G wireless communication system is a very wide band. Therefore, it is unreasonable for the terminal to search for the entire band of the 5G wireless communication system in consideration of the power consumption of the terminal and the like, and therefore the following description will be made under the assumption that the vertical axis represents a transmitting/receiving band that the terminal searches for or can search for. In addition, even in FIGS. 4A to 4D, the same reference numerals among the reference numerals used in the drawings described above are used for the same parts.

First of all, prior to describing FIG. 4A, FIGS. 4A to 4D illustrate a case in which one slot (long TTI 100) consists of seven mini slots as described above. It is assumed that mini slot 120 may include at least one OFDM symbol, and one mini slot 120 may include two OFDM symbols as described above. In addition, FIG. 4A also illustrates an eMBB #1 resource 201 allocated to the first terminal and an eMBB #2 resource 202 allocated to the second terminal. Here, each eMBB service data may be first service data. The base station may transmit data using a frequency resource band in which the eMBB #1 resource 201 allocated to the first terminal and the eMBB #2 resource 202 allocated to the second terminal are each allocated in the entire time interval within the slot (long TTI 100).

Figure 4A:
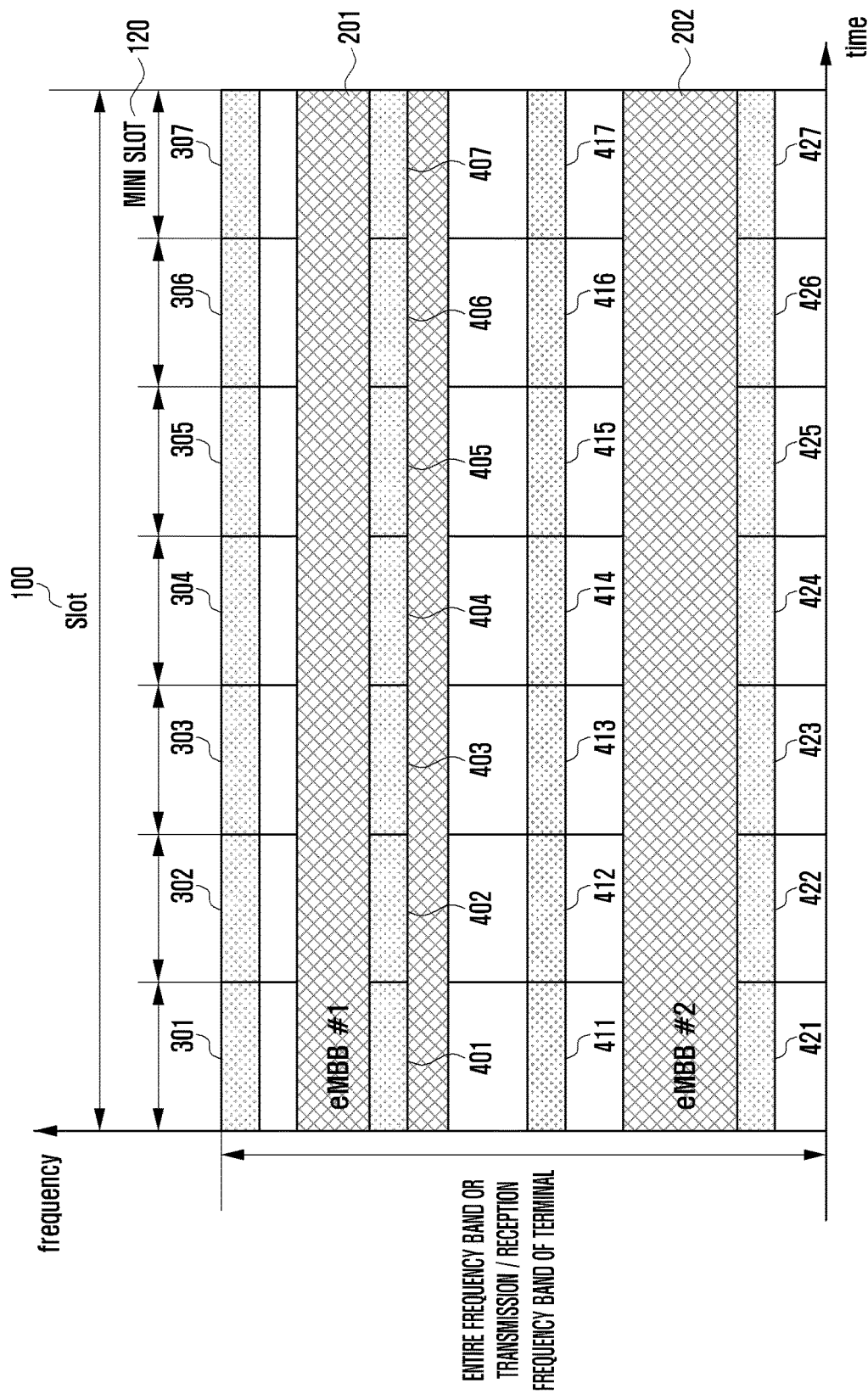
FIGS. 4A, 4B, 4C, and 4D are diagrams for transmitting indication information in a specific cell or a base station according to another embodiment of the present disclosure.

FIG. 4A illustrates an example of a method for allocating a resource transmitting indication information in a plurality of fixed frequency bands in the entire frequency band or a transmission/reception frequency band of a terminal. As illustrated in FIG. 4A, one slot (long TTI 100) may include the first mini slot to the seventh mini slot. The case in which in the first mini slot among those mini slots, indication information 301, 401, 411 and 421 is transmitted in different four fixed frequency bands is illustrated. Also, the case in which even in the second mini slot, the indication information 302, 402, 412, and 422 are transmitted in the same four frequency bands as the first mini slot is illustrated, and the case in which even in the third mini slot to the seventh mini slot, indication information 403, 413, 423, 304, 404, 414, 424, 305, 405, 415, 425, 306, 406, 416, 426, 307, 407, 417, and 427 is transmitted in the same four frequency bands is illustrated.

In the case of using the above method, it is possible to indicate whether to transmit the second service data in units of each mini slot. For example, when the URLLC service data transmission, which is the second service data, is transmitted in the third mini slot, only the indication information 303, 403, 413, and 423 of the third mini slot indicates that there is the URLLC service data transmission, and the indication information of the remaining mini slots may indicate that there is no URLLC service data transmission.

In addition, for example, when the URLLC service data transmission, which is the second service data, is transmitted in the third mini slot, only the indication information 303, 403, 413, and 423 of the third mini slot indicates that there is the URLLC service data transmission, and the indication information of the remaining mini slots may be configured to transmit the eMBB data without transmitting the URLLC service data.

Figure 4B:
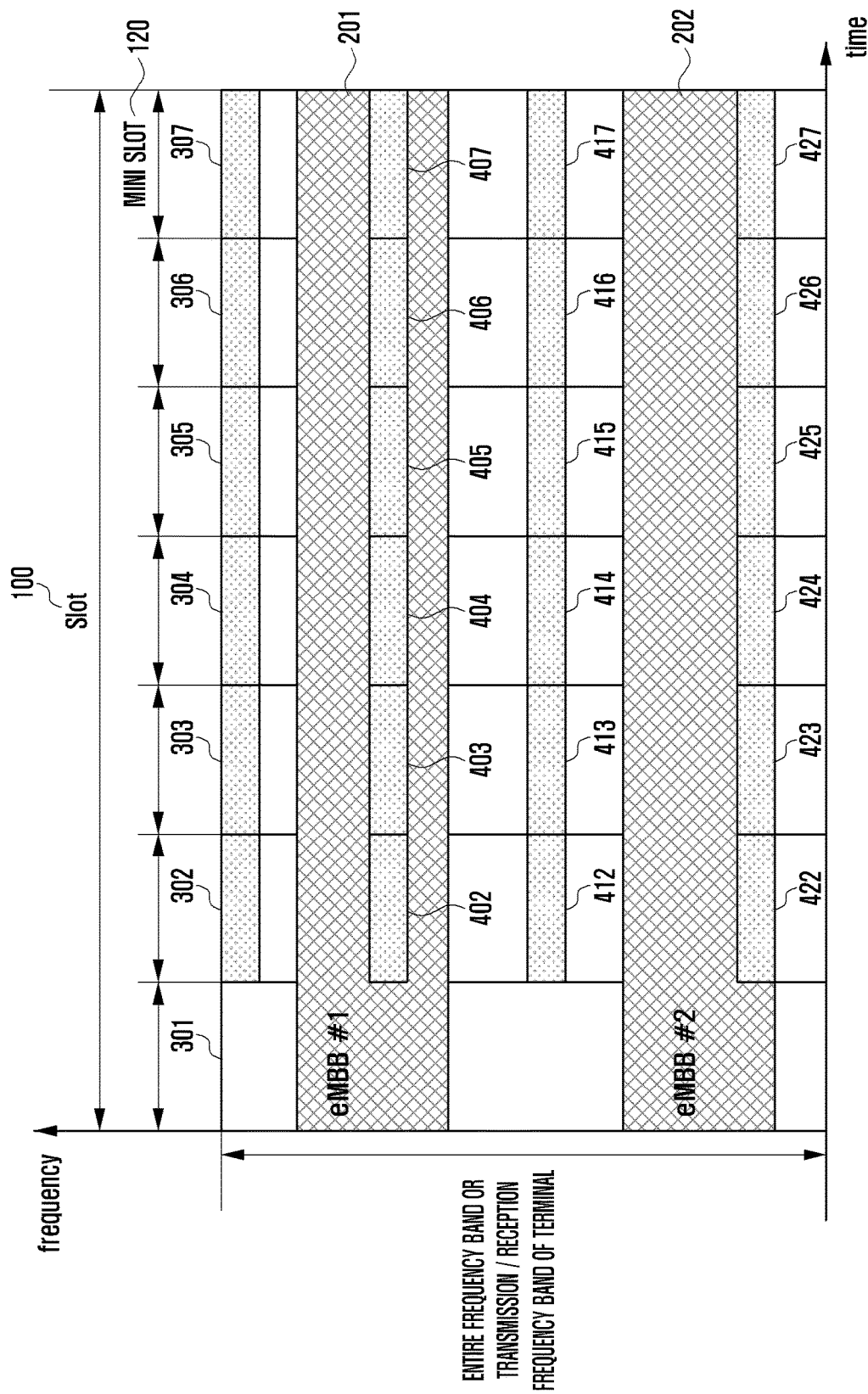

FIG. 4B illustrates a modified embodiment of FIG. 4A as another embodiment of the present disclosure. Describing the example of FIG. 4B by comparing with the FIG. 4A, it may be confirmed that the indication information is not transmitted in the first mini slot. A control channel may be transmitted in the first mini slot within one slot (long TTI 100) as described in FIG. 2. Therefore, it is assumed that the control channel is not transmitted in the first mini slot of each slot. If the control channel is not transmitted, the receiving terminal cannot demodulate and decode the entire data of the corresponding slot. Therefore, there may be the case in which the second service data is configured not to be transmitted in the first mini slot of each slot (long TTI 100). That is, FIG. 4B illustrates the example of the case in which the indication information 302, 402, 412, 422, 303, 403, 413, 423, 304, 404, 414, 424, 305, 405, 415, 425, 306, 406, 416, 426, 307, 407, 417, and 427 is transmitted in the same form as FIG. 4A in the second mini slot to the seventh mini slot except for the first mini slot of the slots.

Even in the case of FIG. 3B, the indication information transmitted in one mini slot may indicate whether to transmit the second service data in the corresponding mini slot. For example, when the URLLC service data transmission is transmitted in the second mini slot, only the indication information 302, 402, 412, and 422 of the second mini slot indicates that there is the URLLC service data transmission, and the indication information of the remaining mini slots may indicate that there is no URLLC service data transmission.

In addition, for example, when the URLLC service data transmission is transmitted in the second mini slot, only the indication information 302, 402, 412, and 422 of the third mini slot indicates that there is the URLLC service data transmission, and the indication information of the remaining mini slots may be configured to transmit the eMBB data without transmitting the URLLC service data transmission indication information.

Next, referring to FIG. 4C which is another embodiment, mini-slots may be grouped in a predetermined number of units as described with reference to FIG. 2. When one slot consists of seven mini slots, as described above, the first slot may be a mini slot through which the control channel is transmitted. Therefore, the mini slots in which the second service data may be actually transmitted may be the second mini slot to the seventh mini slot. Therefore, FIG. 3C illustrates a case in which six mini slots from the second mini slot to the seventh mini slot are divided into two groups 410 and 420.

Figure 4C:
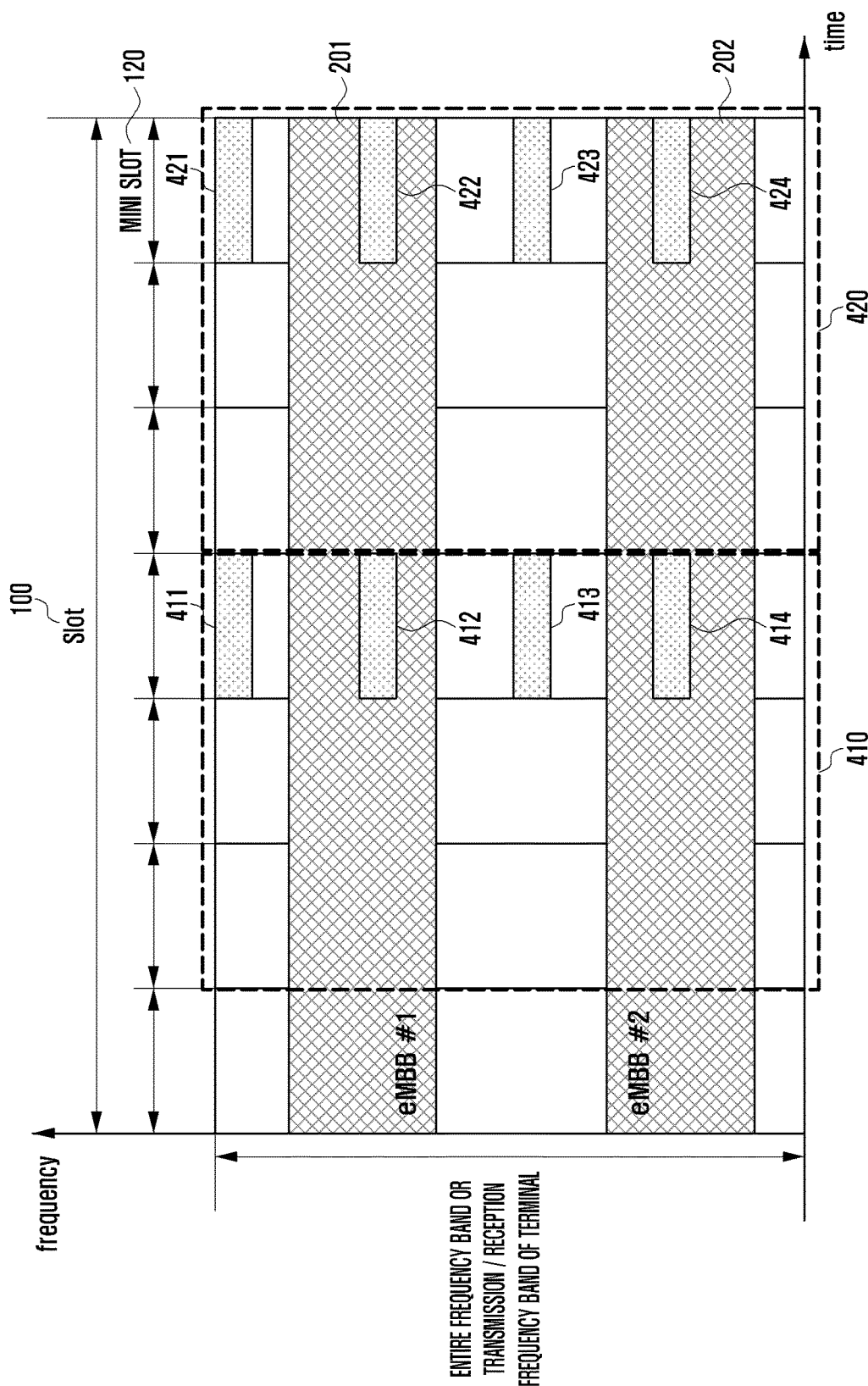

In addition, in the embodiment of FIG. 4C, the case in which the indication information 411, 412, 413, 414, 421, 422, 423, and 424 are transmitted in the preset frequency resource bands for each group is illustrated. That is, the indication information included in the group of each mini slot may be configured to notify whether to transmit the second service data in at least one of the mini slots in the corresponding slot. For example, when the URLLC data, which is the second service data, is transmitted only in the fifth mini slot among the mini slots illustrated in FIG. 4C, the indication information 411, 412, 413, and 414 included in the first group 410 may be configured to indicate that the second service data is not transmitted. Next, the indication information 421, 422, 423, and 424 of the second group 420 including the fifth mini slot is configured to indicate that the second service data is included in the corresponding group and transmitted.

In addition, when the URLLC data, which is the second service data, is transmitted only in the fifth mini slot among the mini slots illustrated in FIG. 4C, the indication information 411, 412, 413, and 414 included in the first group 410 may be configured to transmit the first service data without transmitting the second service data transmission indication information. Next, the indication information 421, 422, 423, and 424 of the second group 420 including the fifth mini slot is configured to indicate that the second service data is included in the corresponding group and transmitted.

Figure 4D:
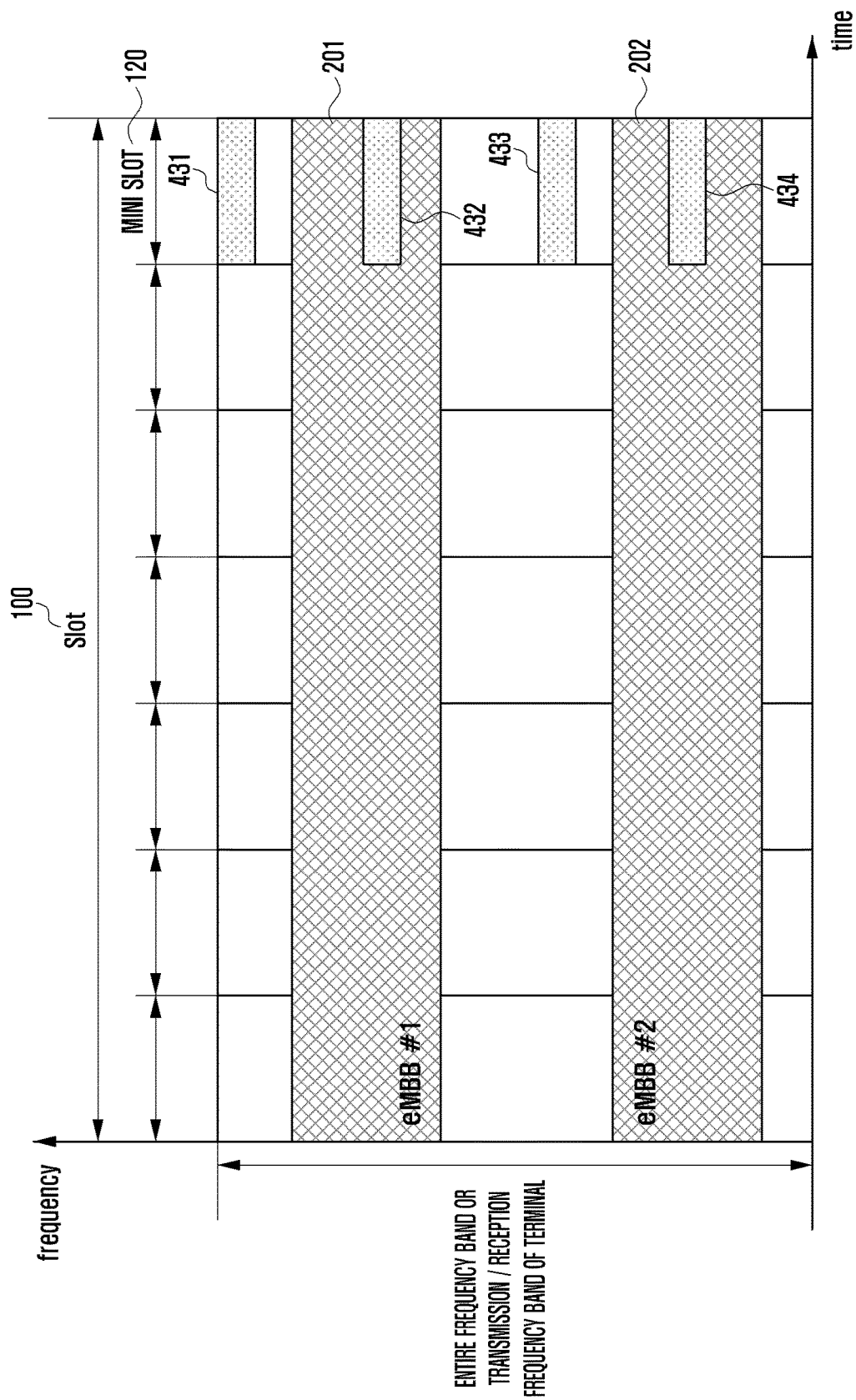

Referring to FIG. 4D which is another embodiment of the present disclosure, the indication information 431, 432, 433, and 434 may be configured in units of one slot (long TTI 100) instead of the units of the mini slots. For example, when the second service data is transmitted in at least one of the first mini slot to the seventh mini slot, the indication information 431, 432, 433, and 434 configured in the last mini slot of the corresponding slot (long TTI 100) may be configured to notify that the second service data is transmitted. On the other hand, when there is no transmission of the second service data in all of the first mini slot to the seventh mini slot, the indication information 431, 432, 433, and 434 configured in the last mini slot of the corresponding slot (long TTI 100) may be configured to notify that the second service data is not transmitted.

In addition, when there is no transmission of the second service data in all of the first mini slot to the seventh mini slot, the indication information 431, 432, 433, and 434 configured in the last mini slot of the corresponding slot (long TTI 100) may be configured to transmit the first service data without transmitting the second service data transmission indication information.

In the FIGS. 4A to 4D described above, a method of improving reliability of indication information has been described. That is, in order to overcome the situation in which the specific frequency band in which the indication information is transmitted is in de-fading, a method for transmission using a plurality of location resources has been described.

Meanwhile, comparing FIGS. 3A to 3D with FIGS. 4A to 4D, in the case of FIGS. 3A to 3D, the indication information may be transmitted once in the units of the mini slot, the group unit of the mini slots, or every slot unit. On the other hand, in the case of FIGS. 4A to 4D, the indication information may be transmitted plural times in the units of the mini slot, the group unit of the mini slots, or every slot unit. Therefore, in the case of FIGS. 4A to 4D, the acquisition probability of the indication information can be increased in terms of the receiving terminal as compared with the case of FIGS. 3A to 3D, thereby providing a more stable service. On the other hand, the case of FIGS. 4A to 4D may waste more bandwidth than the case of FIGS. 3A to 3D. Therefore, it is preferable to set the number of times of the indication information to be transmitted in the units of each mini slot, the group unit of the mini slots, or the slot unit to be the appropriate number of times in terms of the bandwidth and the stability. This may be set by an experiment in the real environment, or may use a simulation result obtained by assuming the real environment.

The present disclosure described above first proposes the structure considering the complexity of the decoding of the first service data, that is, the eMBB service data in the receiving terminal when the indication information is transmitted. That is, it is possible to reduce the complexity due to the decoding of the first service data in the receiving terminal by setting the specific location in advance and transmitting the indication information only at the corresponding location. In addition, the receiving terminal monitors only the preset location, thereby recognizing whether to transmit the second service data, that is, the URLLC service data. In addition, it is possible to greatly reduce (several bits) the amount of indication information and greatly reduce the complexity upon the decoding of the indication information in the receiving terminal, by notifying whether there is the second service data based on the indication information in the group unit of the mini slots. In addition, in the base station or the cell corresponding to a transmitter, since the resource area used as the indication information is set in advance, the rate matching of the information to be transmitted may be performed in consideration of the set resource area.

In addition, after the rate matching of the information to be transmitted is performed without the resource area used as the indication information in the base station or the cell corresponding to the transmitter, if the second service transmission indication information is not transmitted, the first service data may be transmitted, and if the second service transmission indication information is transmitted, the first service data is punctured or removed from the corresponding resource area and then the indication information for notifying the transmission of the second service data may be transmitted.

Meanwhile, according to the embodiment described above, the decoding latency for the eMBB service data, which is the first service data, can be minimized. Generally, a plurality of code blocks may exist in the resource area allocated for the eMBB, and the receiving terminal may perform channel decoding in a code block unit while receiving the eMBB signal. By the way, if the URLLC service data, which is the second service data, is transmitted by puncturing or removing the first service data from the resource area allocated to the first service, the indication information indicating that the first service data is punctured is recognized before the channel decoding to perform the channel decoding in the state in which the first service data is punctured. If the indication information exists only in the last part of the eMBB allocation resources, the channel decoding may not be performed on the previously received data and the reception of the corresponding indication information should be waited. That is, the receiving terminal should additionally include a buffer for storing the received data, and the decoding process may also be delayed. Therefore, this may be prevented by transmitting the indication information for each mini slot or each group of the mini slots among the methods according to the present disclosure described above. In addition, if the structure according to the present disclosure is applied, the receiving terminal may receive at least one indication information included in the group of the mini slots and perform the channel decoding using the code block in the group of the mini slots, thereby preventing the complexity of the receiving terminal and the latency of the data processing.

In addition, in the present disclosure described above, it is possible to minimize the overhead of the indication information. It is possible to minimize the overhead of the indication signal by indicating only whether to transmit the second service data, that is, the URLLC service data in the group unit of the mini slots (i.e., whether to puncture or remove the first service data). As described above, in order to notify only whether transmit the second service within the group of the mini slots, the indication information may consist of only one bit. The detailed configuration of the indication information will be described in more detail below.

On the other hand, the frequency band set for transmitting the indication information in the methods of FIGS. 3A to 3D and FIGS. 4A to 4D described above have been described only based on the viewpoint of one base station. However, in the actual wireless environment, a plurality of base stations are neighboring to each other to form a network. Therefore, the actual wireless network may be influenced by signals received from neighboring base stations at an edge of the base station or a cell edge. Accordingly, a method for transmitting the indication information more securely is needed. Hereinafter, a method for transmitting indication information considering neighboring base stations will be described.

Figure 5A:
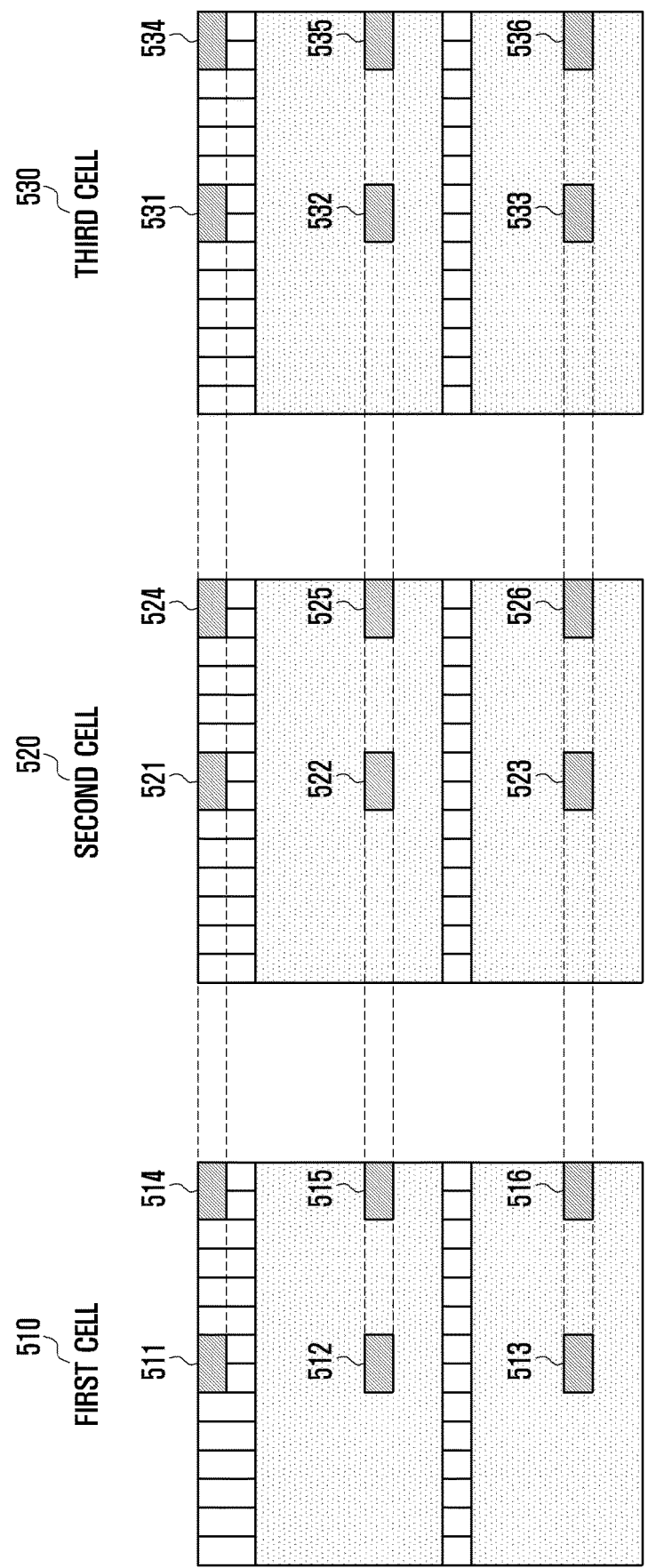
FIG. 5A is a diagram for explaining a case in which a frequency band for transmitting indication information is set as the same frequency band for each base station or each cell according to an embodiment of the present disclosure.
Figure 5B:
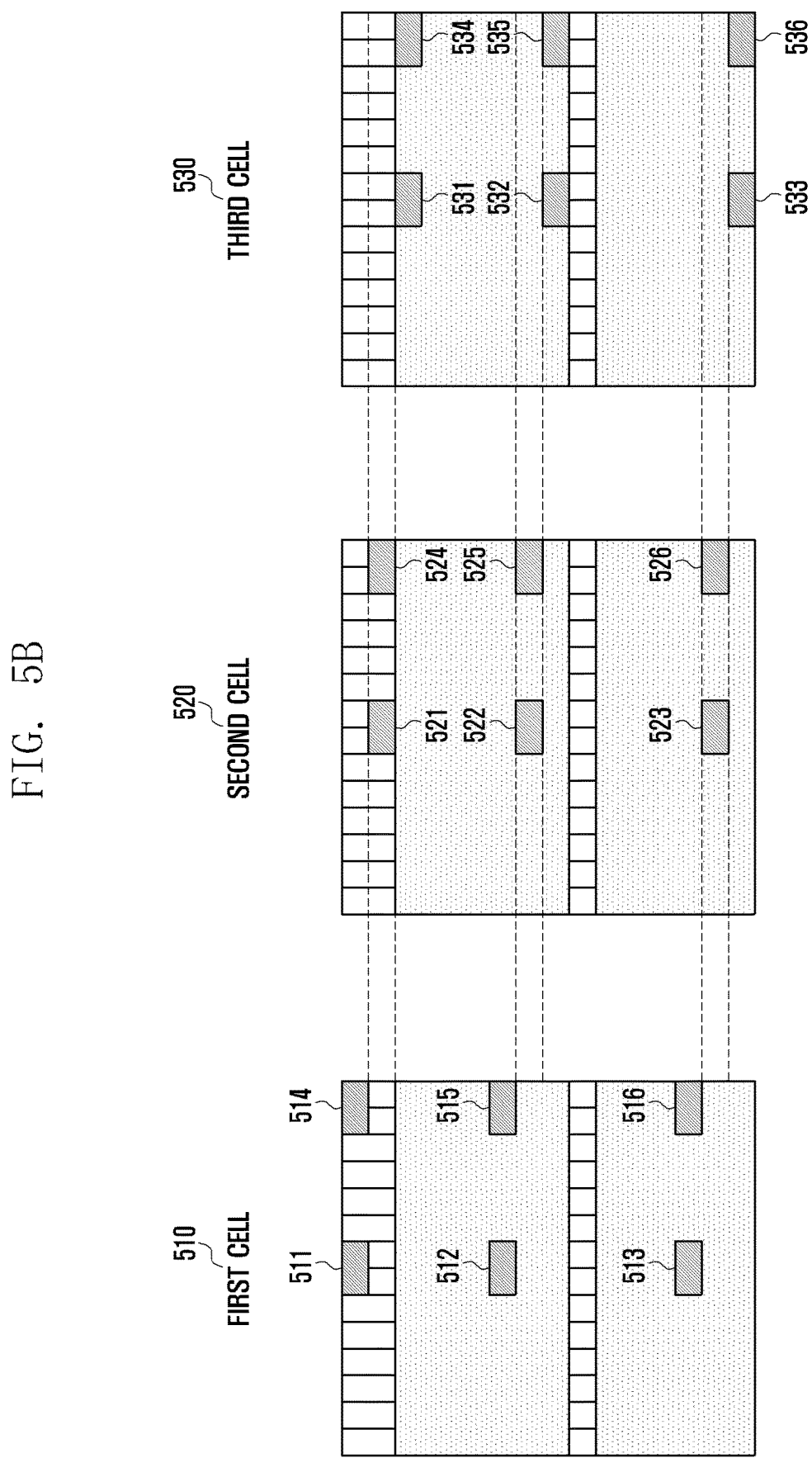
FIG. 5B is a diagram for explaining a case in which a frequency band for transmitting indication information is set as different frequency bands for each base station or each cell according to an embodiment of the present disclosure.

FIG. 5A is a diagram for explaining a case in which a frequency band for transmitting indication information is set as the same frequency band for each base station or each cell according to an embodiment of the present disclosure, and FIG. 5B is an diagram for explaining a case in which a frequency band for transmitting indication information is set as different frequency bands for each base station or each cell according to an embodiment of the present disclosure.

Referring to FIG. 5A, an example of a case in which indication information is transmitted in each slot within a first cell 510, a second cell 520, and a third cell 530 is illustrated. In addition, in the example of FIG. 5A, the case in which the indication information is transmitted by the transmission method of FIG. 4C is illustrated. However, as the transmission method of FIG. 5A, any of the method for transmitting indication information of FIGS. 3A to 3D and the transmission method of FIGS. 4A to 4D may be used. In addition, the first cell 510, the second cell 520, and the third cell 530 illustrated in FIG. 5A may be neighboring cells to each other.

In the first cell 510, three indication information 511, 512, and 513 is transmitted using preset three frequency resources in a fourth mini slot, and three indication information 514, 515, and 516 is transmitted using the same three frequency resources in a seventh mini slot. In addition, in the second cell 520, three indication information 521, 522, and 523 is transmitted using preset three frequency resources in a fourth mini slot, and three indication information 524, 525, and 526 is transmitted using the same three frequency resources in a seventh mini slot. In the finally illustrated cell 530, three indication information 531, 532, and 533 is transmitted using preset three frequency resources in a fourth mini slot, and three indication information 534, 535, and 536 is transmitted using the same three frequency resources in a seventh mini slot. In this case, it can be understood based on the example of FIG. 5A that the preset three frequency resources in the first cell 510, the second cell 520, and the third cell 530 are resources of the same frequency band.

That is, in FIG. 5A illustrates a method for sharing, by all the cells 510, 520, and 530, the same frequency resource to which the indication information is transmitted. As described above, when the indication information is transmitted using the same frequency resources in all the cells 510, 520 and 530, it is preferable to use a sequence having an excellent correlation characteristic between neighboring cells. This will be described in more detail in the description of the drawings to be described below.

Referring to FIG. 5B, the example of the case in which indication information is transmitted in each slot within the first cell 510, the second cell 520, and the third cell 530 is illustrated. In addition, in the example of FIG. 5B, the case in which the indication information is transmitted by the transmission method of FIG. 4C is illustrated. In addition, like the description of FIG. 5A, as the transmission method of FIG. 5B, any of the method for transmitting indication information of FIGS. 3A to 3D and the transmission method of FIGS. 4A to 4D may be used. In addition, the first cell 510, the second cell 520, and the third cell 530 illustrated in FIG. 5B may be neighboring cells to each other.

In the first cell 510, three indication information 511, 512, and 513 is transmitted using preset three frequency resources in a fourth mini slot, and three indication information 514, 515, and 516 is transmitted using the same three frequency resources as the fourth mini slot in a seventh mini slot.

In the second cell 520, three indication information 521, 522, and 523 is transmitted using preset three frequency resources in a fourth mini slot, and three indication information 524, 525, and 526 is transmitted using the same three frequency resources as the frequency resource transmitting the indication information in the fourth mini slot even in a seventh mini slot.

In the finally illustrated third cell 530, three indication information 531, 532, and 533 is transmitted using preset three frequency resources in a fourth mini slot, and three indication information 534, 535, and 536 is transmitted using the same three frequency resources as the frequency resource transmitting the indication information in the fourth mini slot even in a seventh mini slot. In this case, it can be understood based on the example of FIG. 5B that the preset three frequency resources in the first cell 510, the second cell 520, and the third cell 530 are resources of different frequency bands. That is, the indication information 521 and 524 transmitted through the first frequency resource in the second cell 520 is a different resource from the first frequency resource of the first cell 510 and is also a resource different from the first frequency resource of the third cell 530. In addition, the first frequency resource of the first cell 510 is a resource different from a first frequency resource of the third cell 530.

That is, the following two rules may apply to allocation of frequency resources for transmitting the indication information between neighboring cells according to the present disclosure illustrated in FIG. 5B. First, in each cell 510, 520, and 530, the indication information is transmitted using the frequency resource of the same location. Second, the indication information is transmitted using different frequency resources between the respective neighboring cells, that is, the frequency resource that does not overlap with any of neighboring cells. By applying these two rules, it is possible to minimize the interference influence between cells and the influence at the cell edge. In addition, the specific frequency resource is fixedly allocated in the same cell, thereby reducing the complexity of the receiving terminal. On the other hand, when different frequency resources are used between neighboring cells as illustrated in FIG. 5B, they may configured to be transmitted by boosting the power of the indication information to be higher than that of a data symbol. This makes it possible to secure higher reliability in reception of the indication information in the receiving terminal.

On the other hand, a method for setting a frequency band to transmit the indication information using different frequency resources for each base station and each cell may be defined in various forms. First, in the standard protocol, the location of the frequency resource may be determined using the information of the base station or the cell, for example, identification information. Second, it is also possible to control the frequency resources for each base station or cell to be different from each other at a node of a higher layer controlling the base stations or the cells. The second method may be defined in the standard protocol, or may be left to the discretion of each operator. Third, the base stations may set a frequency resource for transmitting their own indication information in a mutual random form. When the first to third methods are used, the base stations may notify all the terminals included in the base station or the active terminals performing communication using the higher layer signal or the broadcast signal of the frequency resource location of the indication information in advance.

In the above description, the contents for allocating the indication information in terms of each base station or cell has been described. However, it may be configured to transmit indication information based on the resources allocated to the receiving terminal. That is, it may be configured to transmit the indication information within the corresponding resource based on the resource allocated to the receiving terminal receiving the eMBB data which is the first service data. Hereinafter, the methods of transmitting indication information from a resource allocated to a receiving terminal will be described.

FIGS. 6A to 6D are diagrams for transmitting indication information based on a resource allocated to a receiving terminal according to another embodiment of the present disclosure.

Referring to FIGS. 6A to 6D, a horizontal axis represents a time resource and a vertical axis represents a frequency resource. As described above, it is unreasonable for the terminal to search for the entire band of the 5G wireless communication system in consideration of the power consumption of the terminal and the like, and therefore the following description will be made under the assumption that the vertical axis represents a transmitting/receiving band that the terminal searches for or can search for. Also, the same reference numerals are used for the same parts of the reference numerals used in the drawings described above.

First of all, prior to describing FIG. 6A, FIGS. 6A to 6D illustrate a case in which one slot (long TTI 100) consists of seven mini slots as described above. It is assumed that mini slot 120 may include at least one OFDM symbol, and one mini slot 120 may include two OFDM symbols as described above.

Figure 6A:
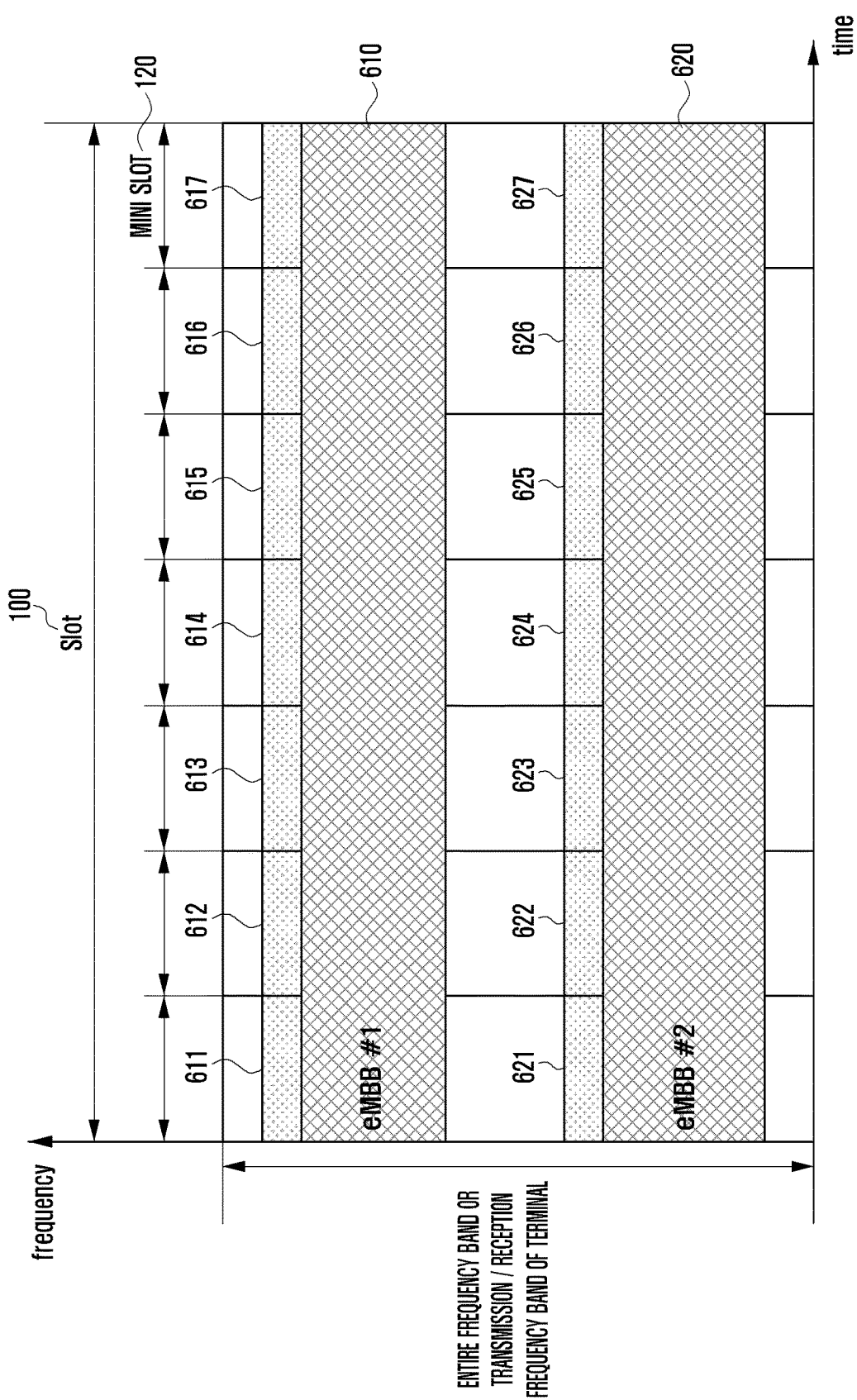

FIG. 6A also illustrates an eMBB #1 resource 610 allocated to the first terminal and an eMBB #2 resource 620 allocated to the second terminal Here, each eMBB service data may be first service data. The base station may transmit data using a frequency resource band in which the eMBB #1 resource 610 allocated to the first terminal and the eMBB #2 resource 620 allocated to the second terminal are each allocated in the entire time interval within the slot (long TTI 100).

Referring to FIG. 6A, the base station transmits indication information 611, 612, 613, 614, 615, 616, and 617 for notifying whether to transmit the second service data in all mini slots using the preset frequency resource in the eMBB #1 resource 610 allocated to the first terminal.

At this time, the indication information 611 to 617 transmitted from the eMBB #1 resource 610 allocated to the first terminal is information transmitted only to the first terminal, and may be information valid only for the first terminal. In addition, the base station transmits indication information 621, 622, 623, 624, 625, 626, and 627 for notifying whether to transmit the second service data in all mini slots using the preset frequency resource in the eMBB #2 resource 610 allocated to the second terminal. At this time, the indication information 621 to 627 in the eMBB #2 resource 620 allocated to the second terminal is information transmitted only to the second terminal, and may be information valid only for the second terminal.

For example, when the second service data is transmitted to the third mini slot of the eMBB #1 resource 610 allocated to the first terminal, the indication information 613 located in the third mini slot of the eMBB #1 resource 610 allocated to the first terminal may indicate that the second service data is transmitted, and the indication information 611, 612, and 614 to 617 located in the remaining mini slots may indicate that the second service data is not transmitted. In this case, since the second terminal does not refer to the area allocated to the first terminal, the transmission of the second service data in the third mini slot of the eMBB #2 resource 620 allocated to the second terminal follows the indication of the indication information 623 located in the third mini slot.

In addition, the indication information 611 to 617 transmitted from the eMBB #1 resource 610 allocated to the first terminal is the information transmitted only to the first terminal, and the indication information 621 to 627 transmitted from the eMBB #2 resource 620 allocated to the second terminal is information transmitted only to the second terminal. The channel conditions between the base station and the first terminal may be different from the channel conditions between the base station and the second terminal may be different, such that the received signal-to-noise ratios of the first terminal and the second terminal may be different from each other. Accordingly, the indication information 611 to 617 transmitted from the eMBB #1 resource 610 allocated to the first terminal and the indication information 621 to 627 transmitted from the eMBB #2 resource 620 allocated to the second terminal may be applied with different modulation methods and different channel encoding techniques or channel encoding rates. In addition, the indication information 611 to 617 transmitted from the eMBB #1 resource 610 allocated to the first terminal and the indication information 621 to 627 transmitted from the eMBB #2 resource 620 allocated to the second terminal may be mapped by a sequence having different length and may be transmitted by making a resource amount used for the indication information transmission different.

For example, if the first terminal applies a quadrature phase-shift keying (QPSK) modulation scheme to transmit the eMBB data and applies a channel encoding rate of 1/3, it is assumed that the signal-to-noise ratio at which the first terminal operates is approximately −1 dB. In this case, the base station may set the channel encoding rate to be applied to the indication information to be 1/4 to allow the first terminal to stably detect the indication information. Meanwhile, if the second terminal applies a QPSK modulation scheme to transmit the eMBB data and applies a channel encoding rate of 1/2, it is assumed that the signal-to-noise ratio at which the second terminal operates is approximately 2 dB. In this way, when the channel conditions of the second terminal are better than those of the first terminal, the base station can increase the channel encoding rate applied to the indication information to be transmitted to the second terminal to 1/2. In addition, if the third terminal applies a 16 quadrature amplitude modulation (QAM) modulation scheme to transmit the eMBB data and applies a channel encoding rate of 1/2, it is assumed that the signal-to-noise ratio at which the third terminal operates is approximately 9 dB. In this case, since the channel conditions of the third terminal are better than those of the first terminal and the second terminal, the base station may not apply channel encoding to the indication information to be transmitted to the third terminal.

As in the above embodiment, the channel encoding rate of the indication information transmitted from the base station to each mobile station may be set differently according to the modulation scheme and the channel encoding rate that each terminal applies for the eMBB data transmission. This may effectively increase the resource utilization efficiency by effectively allocating the resource amount used for the indication information transmission in consideration of the channel conditions of each terminal.

The above embodiment describes the method for differently setting a channel encoding rate applied to indication information transmitted from a base station to each terminal according to a modulation scheme and a channel encoding rate that each terminal applies for the eMBB data transmission. However, the channel encoding rate applied to the indication information is only one example. As another method, at least one of the modulation method applied to the indication information, the length of the sequence for mapping the indication information, and the resource amount allocated for the transmission of the indication information, or a combination thereof may be used.

In addition, in the above embodiment, the modulation scheme and the channel encoding rate applied for the eMBB data transmission are described as (QPSK, 1/3 coding rate), (QPSK, 1/2 coding rate), (16QAM, 1/2 coding rate), which is only an example. Therefore, it is obvious that other modulation schemes and channel encoding rates can be simply extended ad applied.

In addition, the above embodiment describes that when the base station applies (QPSK, 1/3 coding rate) to the terminal for the eMBB data transmission, a 1/4 channel encoding rate is applied for the indication information transmission, and when the base station applies (QPSK, 1/2 coding rate), a 1/2 channel encoding rate is applied for the indication information transmission, and when the base station applies (16QAM, 1/2 coding rate), the channel encoding rate is not applied for the indication information transmission. Here, it is obvious that the channel encoding rates 1/4, 1/2, and 1 (channel encoding is not applied) for the indication information transmission are only an example, and therefore other channel encoding rates may be used.

In addition, the channel encoding rate to be applied to the indication information, the modulation method, the length of the sequence for mapping the indication information, and the resource amount allocated for the transmission of the indication information may be determined in advance depending on the modulation method and channel encoding rate applied when the base station transmits the eMBB data to each terminal. In addition, the modulation method and the channel encoding rate applied when the base station transmits eMBB data to each terminal may be defined by being mapped to the channel encoding rate to be applied to the indication information, the modulation method the length of the sequence for mapping the indication information, and the resource amount allocated for the transmission of the indication information one to one. As another method, the modulation method and the channel encoding rate applied when the base station transmits eMBB data to each terminal may be grouped, and may be defined by being mapping to the channel encoding rate that the base station applies to the indication information, the modulation method, the length of the sequence for mapping the indication information, and the resource amount allocated for the transmission of the indication information one to one, with respect to each group. As another method, a plurality of mapping rules may be defined, and the base station may indicate a mapping rule version to the terminal according to at least one of fading channel conditions, interference conditions, and intra-cell traffic conditions.

As described above, when the indication information is transmitted through a specific frequency band in the resources allocated to each terminal, it is possible to indicate whether to transmit the second service data for each resource allocated to each terminal. When it is indicated whether to transmit the second service for each resource allocated to the terminal, it is sufficient to process data only in the band allocated to the receiving terminal in terms of the receiving terminal, such that the complexity of the terminal can be reduced.

Next, FIG. 6B illustrates a modified embodiment of FIG. 6A as another embodiment of the present disclosure. Describing the example of FIG. 6B by comparing with the FIG. 6A, it may be confirmed that the indication information is not transmitted in the first mini slot. The control channel may be transmitted in the first mini slot within one slot (long TTI 100) as described in FIG. 2. Therefore, it is assumed that the control channel is not transmitted in the first mini slot of each slot. If the control channel is not transmitted, the receiving terminal cannot demodulate and decode the entire data of the corresponding slot. Therefore, there may be the case in which the second service data is configured not to be transmitted in the first mini slot of each slot (long TTI 100). That is, the example of FIG. 6B corresponds to the case in which the indication information is transmitted in the same form as FIG. 6A from the second mini slot to the seventh mini slot other than the first mini slot in the resources allocated to each terminal.

That is, in FIG. 6B, indication information 612, 613, 614, 615, 616, and 617 for notifying whether to transmit the second service data in all the remaining mini slots other than the first mini slot using a preset frequency resource in the eMBB #1 resource 610 allocated to transmit the first service data to the first terminal is transmitted. In addition, indication information 622, 623, 624, 625, 626, and 627 for notifying whether to transmit the second service data in all the remaining mini slots other than the first mini slot using a preset frequency resource in the eMBB #2 resource 620 allocated to transmit the first service data to the second terminal is transmitted.

Even in FIG. 6B, the indication information 612 to 617 transmitted from the eMBB #1 resource 610 allocated to the first terminal is information transmitted only to the first terminal, and may be information valid only for the first terminal. The indication information 622 to 627 in the eMBB #2 resource 620 allocated to the second terminal is information transmitted only to the second terminal, and may be information valid only for the second terminal.

In addition, the indication information 612 to 617 transmitted from the eMBB #1 resource 610 allocated to the first terminal is the information transmitted only to the first terminal, and the indication information 622 to 627 transmitted from the eMBB #2 resource 620 allocated to the second terminal may be the information transmitted only to the second terminal. The channel conditions between the base station and the first terminal may be different from the channel conditions between the base station and the second terminal may be different from each other, such that the received signal-to-noise ratios of the first terminal and the second terminal may be different from each other. Accordingly, the indication information 612 to 617 transmitted from the eMBB #1 resource 610 allocated to the first terminal and the indication information 622 to 627 transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to FIG. 6A described above, and therefore the additional description will be omitted.

Next, referring to FIG. 6C which is another embodiment, mini-slots may be grouped in a predetermined number of units as described with reference to FIG. 2. When one slot consists of seven mini slots, as described above, the first slot may be a mini slot through which the control channel is transmitted. Therefore, the mini slots in which the second service data may be actually transmitted may be the second mini slot to the seventh mini slot. Therefore, FIG. 6C illustrates a case in which six mini slots from the second mini slot to the seventh mini slot are divided into two groups 630 and 640.

Figure 6C:
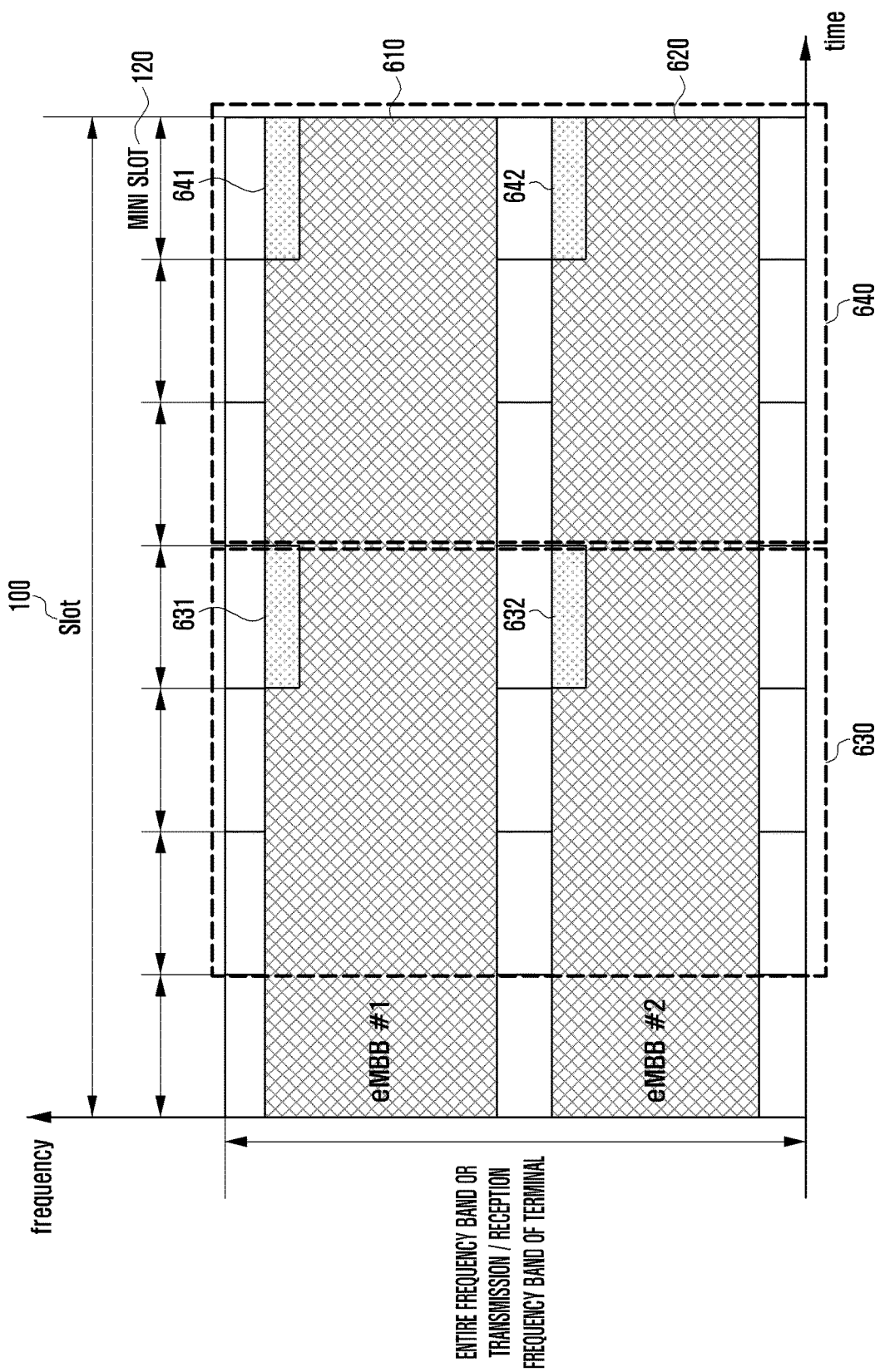

In addition, in the embodiment of FIG. 6C, one indication information 631 and 641 may be transmitted to each of the first group 630 and the second group 640 of the eMBB #1 resources 610 allocated to the first terminal, and one indication information 632 and 642 may be transmitted to each of a first group 630 and a second group 640 of the eMBB #2 resource 620 allocated to the second terminal.

Each indication information may indicate whether to transmit the second service data in at least one of the mini slots included in the corresponding group of the resource allocated to the corresponding terminal. For example, when the URLLC data, which is the second service data, is transmitted only in the fifth mini slot of the eMBB #2 resource 620 allocated to the second terminal, only the indication information 642 of the above-mentioned indication information indicates that the second service data is transmitted and all the remaining indication information indicates that the second service data is not transmitted. Therefore, even in the embodiment of FIG. 6C, the indication information 631 and 641 transmitted from the eMBB #1 resource 610 allocated to the first terminal is the information transmitted only to the first terminal and may be information valid only for the first terminal, and the indication information 632 and 642 transmitted from the eMBB #2 resource 620 allocated to the second terminal is information transmitted only to the second terminal and may be information valid only for the second terminal.

In addition, the indication information 631 and 641 transmitted from the eMBB #1 resource 610 allocated to the first terminal is the information transmitted only to the first terminal, and the indication information 632 and 642 transmitted from the eMBB #2 resource 620 allocated to the second terminal is information transmitted only to the second terminal. The channel conditions between the base station and the first terminal and the channel conditions between the base station and the second terminal may be different from each other, such that the received signal-to-noise ratios of the first terminal and the second terminal may be different from each other. Accordingly, the indication information 631 and 641 transmitted from the eMBB #1 resource 610 allocated to the first terminal and the indication information 632 and 642 transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to the embodiment of FIG. 6A described above, and therefore the additional description will be omitted.

Figure 6D:
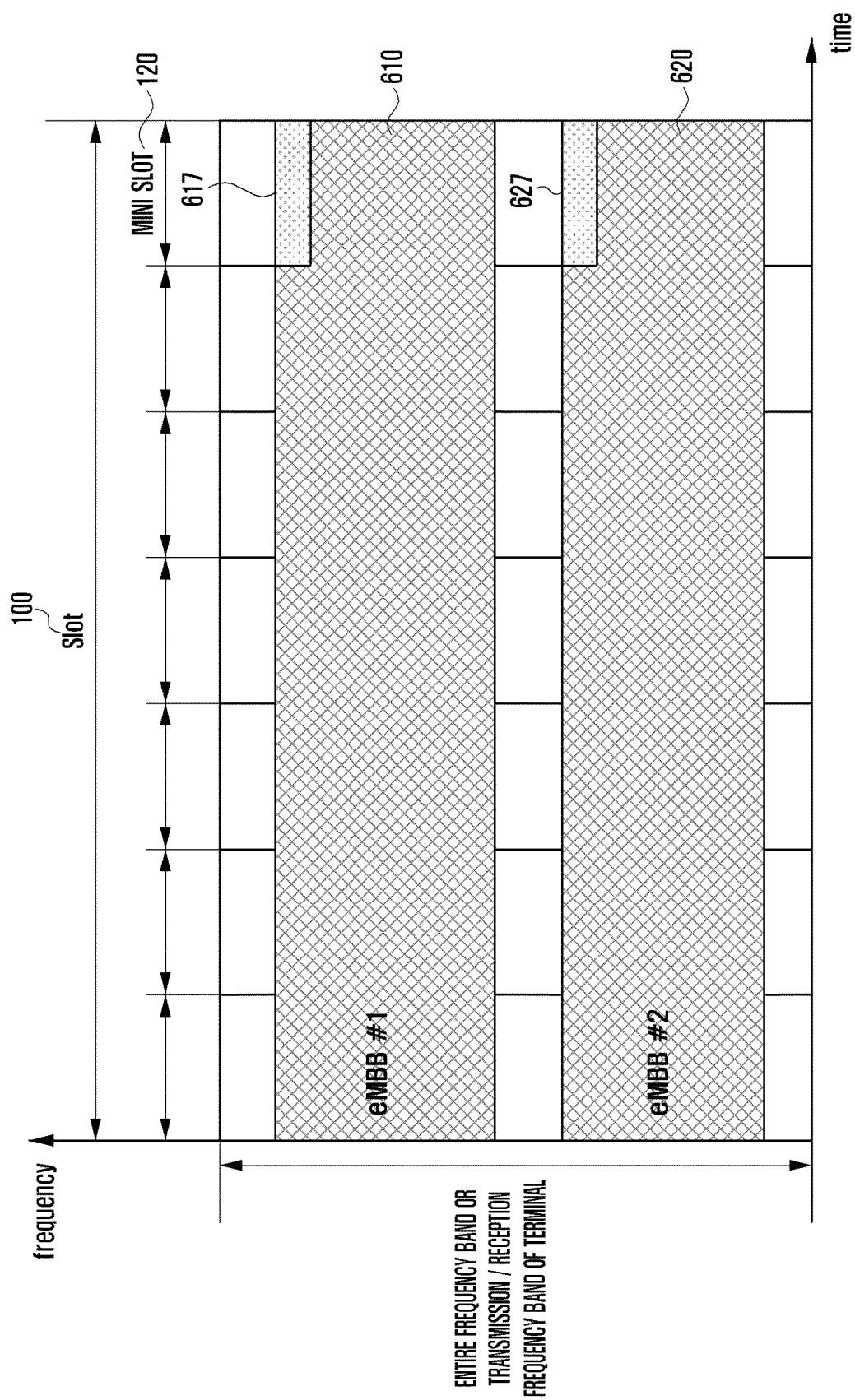

Referring to FIG. 6D which is another embodiment of the present disclosure, the indication information 617 and 627 may be configured in units of one slot (long TTI 100) instead of the units of the mini slots for each resource allocated to each terminal. For example, when the second service data is transmitted in at least one of the first mini slot to the seventh mini slot of the eMBB #1 resource 610 allocated to the first terminal, the indication information 617 configured in the last mini slot of the corresponding slot (long TTI 100) may be transmitted by being configured to notify that the second service data is transmitted. On the other hand, when there is no transmission of the second service data in all of the first mini slot to the seventh mini slot in the eMBB #2 resource 620 allocated to the second terminal, the indication information 627 configured in the last mini slot of the corresponding slot (long TTI 100) may be configured to notify that the second service data is not transmitted.

In addition, on the other hand, when there is no transmission of the second service data in all of the first mini slot to the seventh mini slot in the eMBB #2 resource 620 allocated to the second terminal, the indication information notifying the second service data in the indication information 627 configured in the last mini slot of the corresponding slot (long TTI 100) may not be transmitted and configured to transmit the first service data.

In addition, the indication information 617 transmitted from the eMBB #1 resource 610 allocated to the first terminal is the information transmitted only to the first terminal, and the indication information 627 transmitted from the eMBB #2 resource 620 allocated to the second terminal is information transmitted only to the second terminal. The channel conditions between the base station and the first terminal and the channel conditions between the base station and the second terminal may be different from each other, such that the received signal-to-noise ratios of the first terminal and the second terminal may be different from each other. Accordingly, the indication information 617 transmitted from the eMBB #1 resource 610 allocated to the first terminal and the indication information 627 transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to the embodiment of FIG. 6A described above, and therefore the additional description will be omitted.

As illustrated in FIGS. 6A to 6D described above, there may be a case in which it is notified whether transmit the second service data every mini slot for each band allocated to each terminal, several mini slots are grouped within one slot to notify whether to transmit the second service data within the grouping, or it is notified whether the second service data is transmitted in a slot unit, not a mini slot unit. That is, in the embodiment of FIGS. 6A to 6D, the indication information may be configured to be transmitted in the minimum number of times by using only resources in a frequency band in a minimum unit for transmitting the indication information in one set unit, for example, units of a mini slot, a group of mini slots, or a slot in the resources allocated to each terminal. The configurations as illustrated in FIGS. 6A to 6D have an advantage that an unnecessary waste of a bandwidth in the wireless communication system may be reduced.

However, the receiver may not accurately detect when the indication information is transmitted once using only the resource of the frequency band in the minimum unit as illustrated in FIGS. 6A to 6D. For example, the radio channel conditions of the corresponding resource may suddenly become poor or may be subject to deep fading, severe interference, and the like. As described above, when the indication information is transmitted only once in the units of the mini slot, the group of the mini slots, or the slot in the resources allocated to each terminal, a reception error may occur. The case in which the reception error occurs may be understood in the same manner as in the case in which there is no corresponding indication information as described in the related art.

Therefore, other embodiments of the present disclosure for addressing the problem will be described with reference to FIGS. 7A to 7D.

FIGS. 7A to 7D are diagrams for transmitting indication information based on a resource allocated to a receiving terminal according to another embodiment of the present disclosure.

Referring to FIGS. 7A to 7D, a horizontal axis represents a time resource and a vertical axis represents a frequency resource. The frequency resource on the vertical axis may be the entire frequency band that may be used or allocated in the 5G wireless communication system or may be a transmission/reception bandwidth of a specific terminal. In the following description, it is assumed that the vertical axis is a transmission/reception band which the terminal searches for or may search for.

First of all, prior to describing FIG. 7A, FIGS. 7A to 7D illustrate a case in which one slot (long TTI 100) consists of seven mini slots as described above. It is assumed that mini slot 120 may include at least one OFDM symbol, and one mini slot 120 may include two OFDM symbols as described above. In addition, FIG. 7A also illustrates the eMBB #1 resource 610 allocated to the first terminal and the eMBB #2 resource 620 allocated to the second terminal. Here, each eMBB service data may be first service data. The base station may transmit data using a frequency resource band in which the eMBB #1 resource 610 allocated to the first terminal and the eMBB #2 resource 620 allocated to the second terminal are each allocated in the entire time interval within the slot (long TTI 100).

Figure 7A:
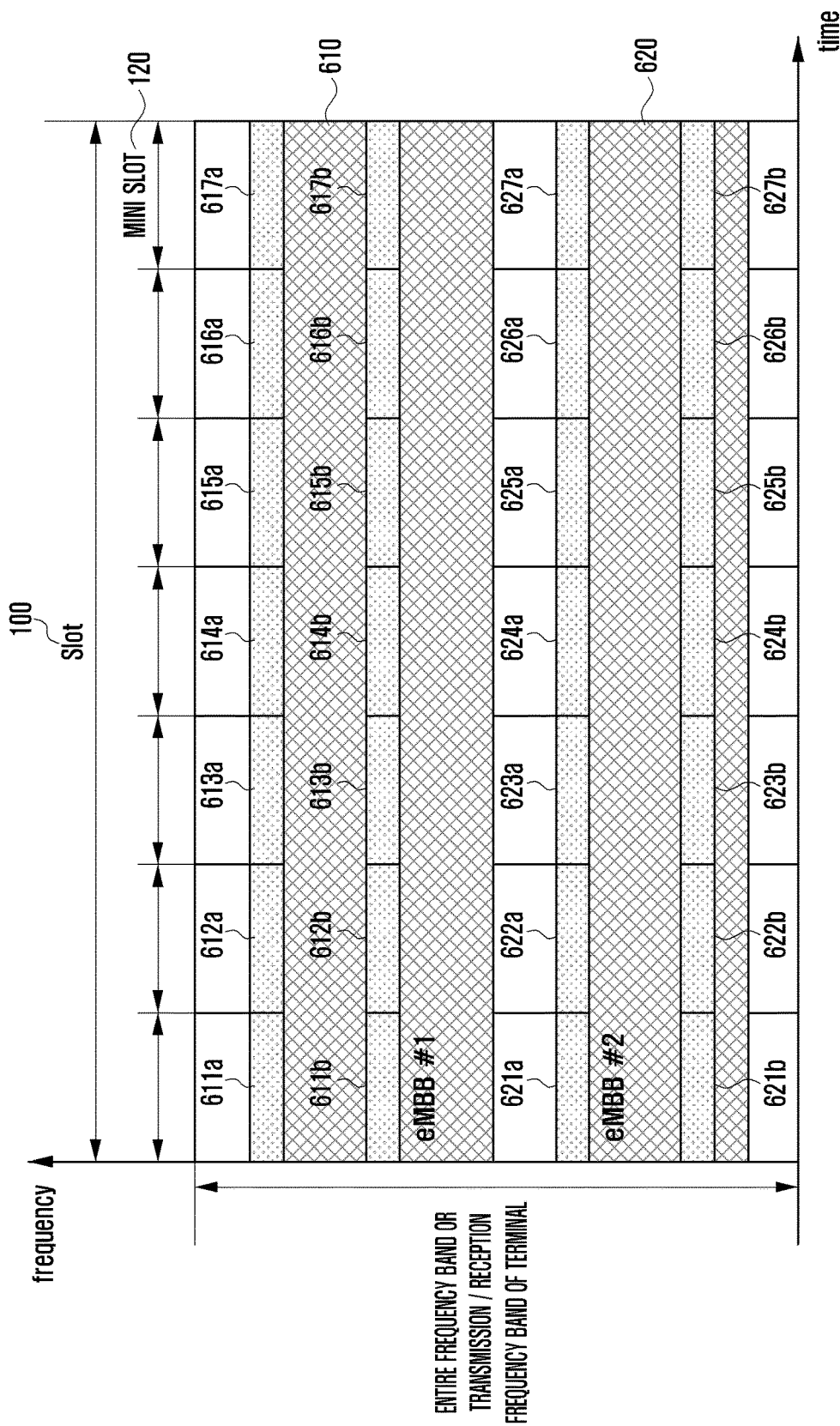
FIGS. 7A, 7B, 7C, and 7D are diagrams for transmitting indication information based on a resource allocated to a receiving terminal according to another embodiment of the present disclosure.

Referring to FIG. 7A, in the example of FIG. 7A, a plurality of fixed frequency bands are allocated, as the resource for transmitting the indication information, to each of resources 610 and 620 allocated to each terminal in the entire frequency band or the transmission/reception frequency band of the terminal. As illustrated in FIG. 7A, one slot (long TTI 100) may include the first mini slot to the seventh mini slot. Among those, in the first mini slot of the eMBB #1 resource 610 allocated for the first service data transmission to the first terminal, the case in which the indication information 611a and 611b are transmitted in two different fixed frequency bands is illustrated. Also, even in the second mini slot of the eMBB #1 resource 610 allocated for the first service data transmission to the first terminal, the case in which indication information 612a and 612b are transmitted in the same two frequency bands as the first mini slot is illustrated, and even in the third mini slot to the seventh mini slot of the eMBB #1 resource 610 allocated for the first service data transmission to the first terminal, the case in which indication information 613a, 613b, 614a, 614b, 615a, 615b, 616a, 616b, 617a, and 617b are transmitted in the same two frequency bands is illustrated. This illustrates that even in the case of the eMBB #2 resource 620 allocated to transmit the first service data to the second terminal, indication information 621a, 621b, 622a, 622b, 623a, 623b, 624a, 624b, 625a, 625b, 626a, 626b, 627a, and 627b may be transmitted in the same form.

As a result, in each of the mini slots of the eMBB #1 resource 610 allocated for the first service data transmission to the first terminal and the eMBB #2 resource 620 allocated for the first service data transmission to the second terminal, two indication information may be configured to be transmitted.

Figure 7B:
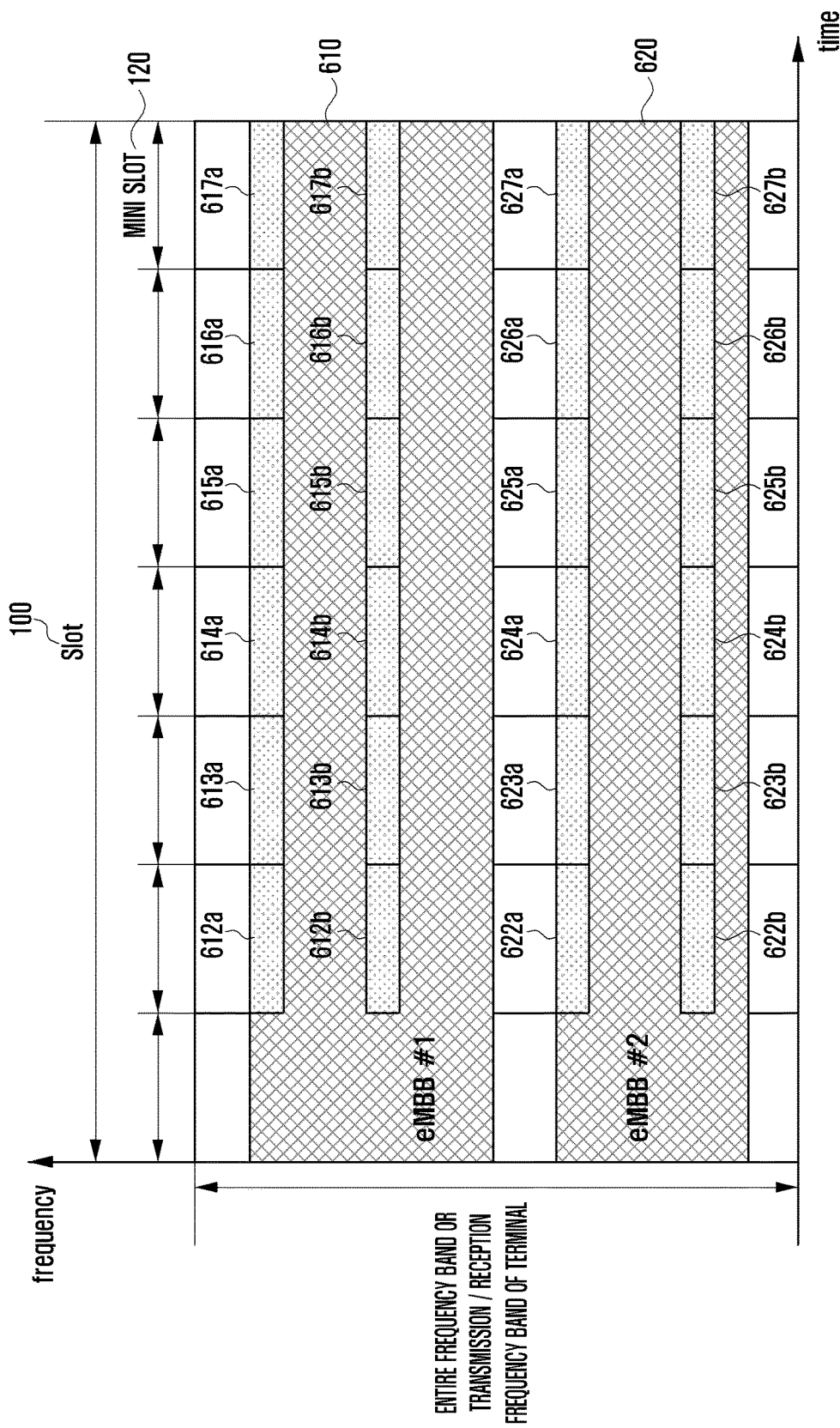

As in FIGS. 7A and 7B, the indication information 611a to 617b transmitted from the eMBB #1 resource 610 allocated to the first terminal is information transmitted only to the first terminal, and may be information valid only for the first terminal. In addition, the indication information 621a to 627b in the eMBB #2 resource 620 allocated to the second terminal is the information transmitted only to the second terminal, and may be the information valid only for the second terminal.

For example, when the second service data is transmitted to the third mini slot of the eMBB #1 resource 610 allocated to the first terminal, the indication information 613a and 613b located in the third mini slot of the eMBB #1 resource 613 allocated to the first terminal may indicate that the second service data is transmitted, and the indication information 611a to 612b and 614a to 617b located in the remaining mini slots may indicate that the second service data is not transmitted. In addition, for example, when the second service data is transmitted to the third mini slot of the eMBB #1 resource 610 allocated to the first terminal, the indication information 613a and 613b located in the third mini slot of the eMBB #1 resource 613 allocated to the first terminal may indicate that the second service data is transmitted, and the indication information 611a to 612b and 614a to 617b located in the remaining mini slots may be configured to transmit the first service data without transmitting the indication information. In this case, since the second terminal does not refer to the area allocated to the first terminal, the transmission of the second service data in the third mini slot of the eMBB #2 resource 620 allocated to the second terminal follows the indication of the indication information 623a and 623b located in the third mini slot.

In addition, the indication information 611a to 617b transmitted from the eMBB #1 resource 610 allocated to the first terminal is the information transmitted only to the first terminal, and the indication information 621a to 627b transmitted from the eMBB #2 resource 620 allocated to the second terminal is information transmitted only to the second terminal. The channel conditions between the base station and the first terminal and the channel conditions between the base station and the second terminal may be different from each other, such that the received signal-to-noise ratios of the first terminal and the second terminal may be different from each other. Accordingly, the indication information 611a to 617b transmitted from the eMBB #1 resource 610 allocated to the first terminal and the indication information 621a to 627b transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to the embodiment of FIG. 6A described above, and therefore the additional description will be omitted.

As described above, when the indication information is transmitted through a specific frequency band in the resources allocated to each terminal, it is possible to indicate whether to transmit the second service data for each resource allocated to each terminal. When it is indicated whether to transmit the second service for each resource allocated to the terminal, it is sufficient to process data only in the band allocated to the receiving terminal in terms of the receiving terminal, such that the complexity of the terminal can be reduced.

FIG. 7B illustrates a modified embodiment of FIG. 7A as another embodiment of the present disclosure. Describing the example of FIG. 7B by comparing with the FIG. 7A, it may be confirmed that the indication information is not transmitted in the first mini slot. The control channel may be transmitted in the first mini slot within one slot (long TTI 100) as described in FIG. 2. Therefore, it is assumed that the control channel is not transmitted in the first mini slot of each slot. If the control channel is not transmitted, the receiving terminal cannot demodulate and decode the entire data of the corresponding slot. Therefore, there may be the case in which the second service data is configured not to be transmitted in the first mini slot of each slot (long TTI 100). That is, in the example of FIG. 7B, in the second mini slot to the seventh mini slot except for the first mini slot of the eMBB #1 resources 610 allocated to the first terminal in the slot (long TTI 100), the indication information 611a to 617b may be transmitted as the same form as FIG. 7A, and in the example of FIG. 7B, in the second mini slot to the seventh mini slot except for the first mini slot of the eMBB #2 resource 620 allocated to the second terminal in the slot (long TTI 100), the indication information 621a to 627b may be transmitted in the same form as FIG. 7A.

In addition, the indication information 612a to 617b transmitted from the eMBB #1 resource 610 allocated to the first terminal is the information transmitted only to the first terminal, and the indication information 622a to 627b transmitted from the eMBB #2 resource 620 allocated to the second terminal is information transmitted only to the second terminal. The channel conditions between the base station and the first terminal and the channel conditions between the base station and the second terminal may be different from each other, such that the received signal-to-noise ratios of the first terminal and the second terminal may be different from each other. Accordingly, the indication information 612a to 617b transmitted from the eMBB #1 resource 610 allocated to the first terminal and the indication information 622a to 627b transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to the embodiment of FIG. 6A described above, and therefore a redundant description will be omitted.

Next, referring to FIG. 7C which is another embodiment, mini-slots may be grouped in a predetermined number of units as described with reference to FIG. 2. When one slot consists of seven mini slots, as described above, the first slot may be a mini slot through which the control channel is transmitted. Therefore, the mini slots in which the second service data may be actually transmitted may be the second mini slot to the seventh mini slot. Therefore, FIG. 7C illustrates a case in which six mini slots from the second mini slot to the seventh mini slot are divided into two groups 630 and 640.

Figure 7C:
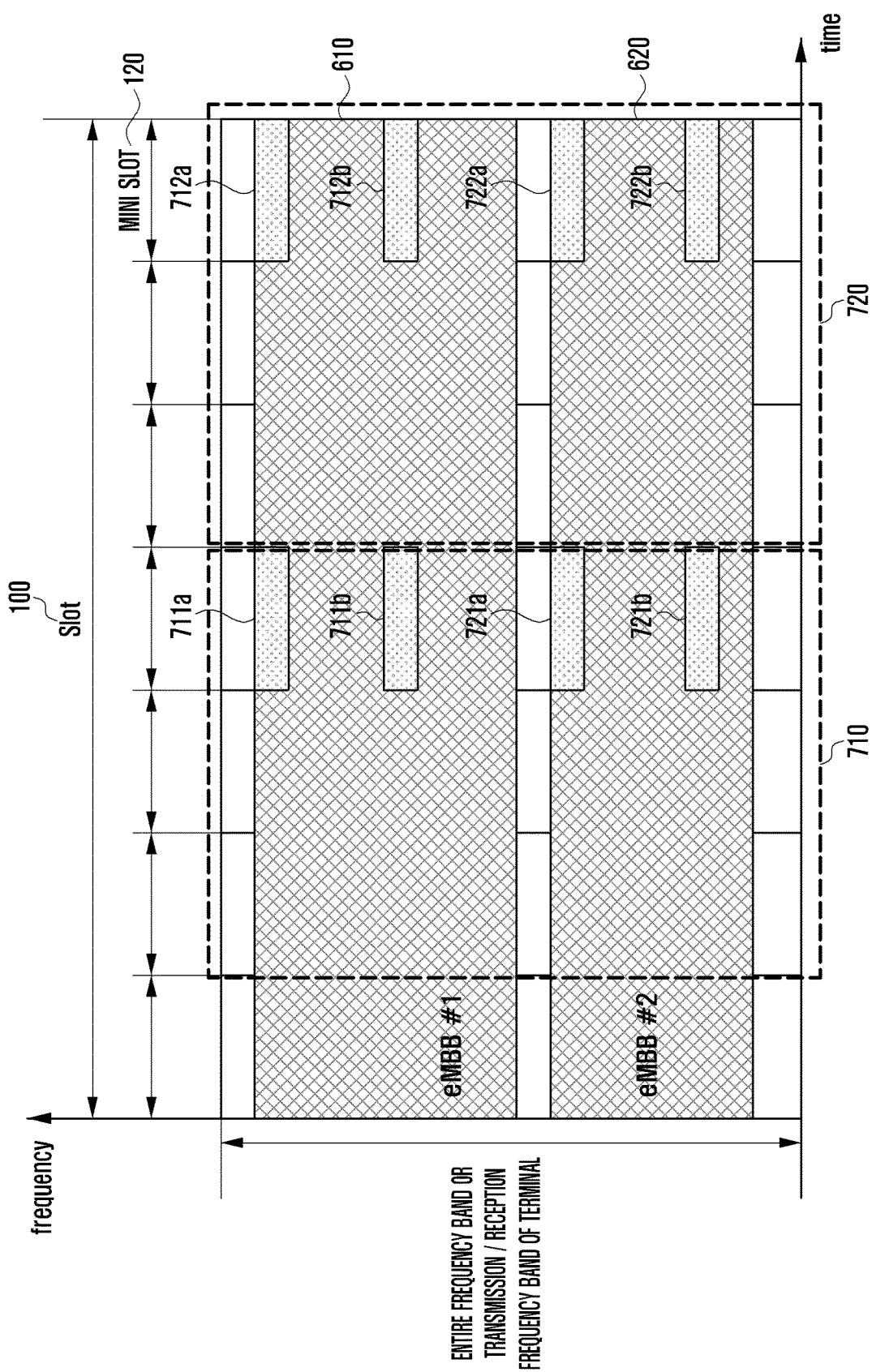

In addition, in the embodiment of FIG. 7C, indication information 711a and 711b and 712a and 712b using different frequency resources may be transmitted to each of the first group 710 and the second group 720 of the eMBB #1 resources 610 allocated to the first terminal, and indication information 721a, 721b, 722a, and 722b using different frequency resources may be transmitted to each of the first group 710 and the second group 720 of the eMBB #2 resource 620 allocated to the second terminal.

Each indication information may indicate whether to transmit the second service data in at least one of the mini slots included in the corresponding group of the resource allocated to the corresponding terminal. For example, when the URLLC data, which is the second service data, is transmitted only in the fifth mini slot of the eMBB #2 resource 620 allocated to the second terminal, only the indication information 722a and 722b of the above-mentioned indication information indicates that the second service data is transmitted and all the remaining indication information indicates that the second service data is not transmitted. In addition, for example, when the URLLC data, which is the second service data, is transmitted only in the fifth mini slot of the eMBB #2 resource 620 allocated to the second terminal, only the indication information 722a and 722b of the above-mentioned indication information indicates that the second service data is transmitted and all the remaining indication information may be configured to transmit only the first service data without transmitting the indication information notifying whether to transmit the second service data. Therefore, even in the embodiment of FIG. 7C, the indication information 711a to 712b transmitted from the eMBB #1 resource 610 allocated to the first terminal is information transmitted only to the first terminal, and may be information valid only for the first terminal. In addition, the indication information 721a to 722b transmitted from the eMBB #2 resource 620 allocated to the second terminal is the information transmitted only to the second terminal, and may be the information valid only for the second terminal.

In addition, the indication information 711a, 711b, 712a, and 712b transmitted from the eMBB #1 resource 610 allocated to the first terminal is the information transmitted only to the first terminal, and the indication information 721a, 721b, 722a, and 722b transmitted from the eMBB #2 resource 620 allocated to the second terminal is information transmitted only to the second terminal. The channel conditions between the base station and the first terminal and the channel conditions between the base station and the second terminal may be different from each other, such that the received signal-to-noise ratios of the first terminal and the second terminal may be different from each other. Accordingly, the indication information 711a, 711b, 712a, and 712b transmitted from the eMBB #1 resource 610 allocated to the first terminal and the indication information 721a, 721b, 722a, and 722b transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to the embodiment of FIG. 6A described above, and therefore the additional description will be omitted.

Figure 7D:
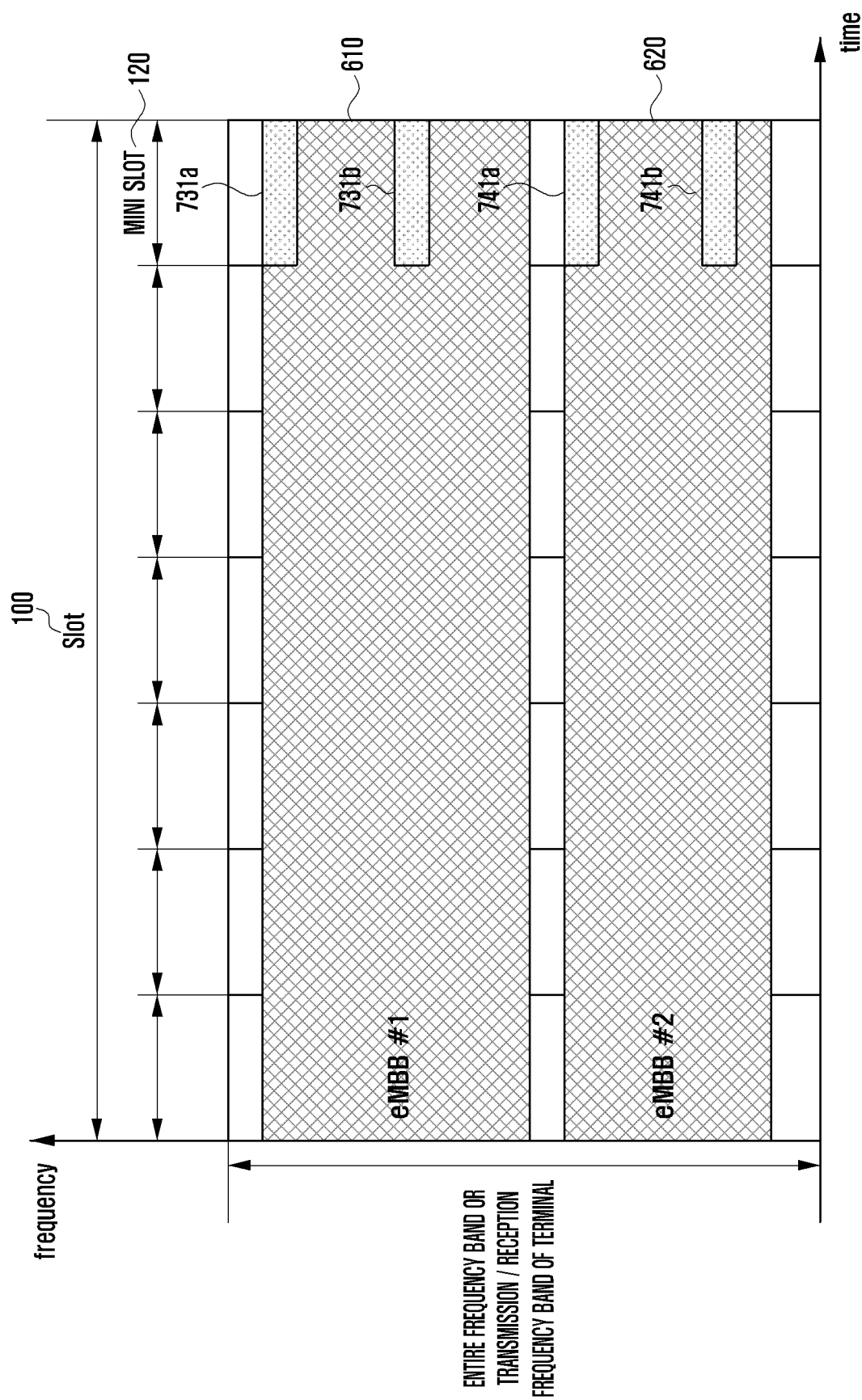

Referring to FIG. 7D which is another embodiment of the present disclosure, the indication information 731a, 731b, 741a, and 741b may be configured in units of one slot (long TTI 100) instead of the units of the mini slots for each resource allocated to each terminal. For example, when the second service data is transmitted in at least one of the first mini slot to the seventh mini slot of the eMBB #1 resource 610 allocated to the first terminal, the indication information 731a and 731b configured in the last mini slot of the corresponding slot (long TTI 100) may be transmitted by being configured to notify that the second service data is transmitted. On the other hand, when there is no transmission of the second service data in all of the first mini slot to the seventh mini slot in the eMBB #2 resource 620 allocated to the second terminal, the indication information 741a and 741b configured in the last mini slot of the corresponding slot (long TTI 100) may be configured to notify that the second service data is not transmitted. In addition, on the other hand, when there is no transmission of the second service data in all of the first mini slot to the seventh mini slot in the eMBB #2 resource 620 allocated to the second terminal, the indication information 741a and 741b configured in the last mini slot of the corresponding slot (long TTI 100) may be configured to transmit only the first service data without transmitting the control information indicating the second service data.

In addition, the indication information 731a to 731b transmitted from the eMBB #1 resource 610 allocated to the first terminal is the information transmitted only to the first terminal, and the indication information 741a to 741b transmitted from the eMBB #2 resource 620 allocated to the second terminal is information transmitted only to the second terminal. The channel conditions between the base station and the first terminal and the channel conditions between the base station and the second terminal may be different from each other, such that the received signal-to-noise ratios of the first terminal and the second terminal may be different from each other. Accordingly, the indication information 731*a* to 731*b* transmitted from the eMBB #1 resource 610 allocated to the first terminal and the indication information 741*a* to 741*b* transmitted from the eMBB #2 resource 620 allocated to the second terminal may be applied with different modulation methods and different channel encoding techniques or channel encoding rates, mapped by the sequence having different lengths, and transmitted by differently allocating the resource amount used for the indication information transmission. This has already been described with reference to the embodiment of FIG. 6A described above, and therefore the additional description will be omitted.

As illustrated in FIGS. 7A to 7D described above, there may be a case in which it is notified whether transmit the second service data every mini slot for each band allocated to each terminal, several mini slots are grouped within one slot to notify whether to transmit the second service data within the grouping, or it is notified whether the second service data is transmitted in a slot unit, not a mini slot unit. That is, FIGS. 7A to 7D illustrate a method for reducing an error that may occur by transmitting only the minimum indication information in the embodiments of FIGS. 6A to 6D. That is, FIGS. 7A to 7D illustrate a method for using and transmitting resources at a plurality of location to improve the reliability of the indication information and to overcome the situation that the specific frequency band in which the indication information is transmitted is in the deep fading.

Meanwhile, comparing FIGS. 6A to 6D with FIGS. 7A to 7D, in the case of FIGS. 6A to 6D, the indication information may be transmitted once in the units of the mini slot, the group unit of the mini slots, or every slot unit. On the other hand, in the case of FIGS. 7A to 7D, the indication information may be transmitted plural times in the units of the mini slot, the group unit of the mini slots, or every slot unit. Therefore, in the case of FIGS. 7A to 7D, the acquisition probability of the indication information can be increased in terms of the receiving terminal as compared with the case of FIGS. 6A to 6D, thereby providing a more stable service. On the other hand, the case of FIGS. 7A to 7D may waste more bandwidth than the case of FIGS. 6A to 6D. Therefore, it is preferable to set the number of times of the indication information to be transmitted in the units of each mini slot, the group unit of the mini slots, or the slot unit to be the appropriate number of times in terms of the bandwidth and the stability. This may be set by an experiment in the real environment, or may use a simulation result obtained by assuming the real environment.

On the other hand, when the first cell and the second cell are neighboring to each other, the same frequency resources may be allocated to different terminals. In this case, the interference may occur as in FIGS. 5A and 5B described above. In order to prevent such a case, according to the present disclosure, when resources are differently allocated to the terminals for each cell as much as possible or the same resource is allocated to the terminals, the indication information may be configured to be transmitted from different locations for each cell. This may apply the contents described with reference to FIGS. 5A and 5B as they are, and therefore the additional description will not be omitted herein.

As described above, when the transmission region of the indication information is different depending on resources allocated to each base station, each cell, or each terminal resource allocated to the terminal, robustness to the inter-cell interference signal can be obtained.

Also, in the case in which the transmission region is different or the same for each cell when the indication information is transmitted, the indication information may be transmitted by boosting the transmit power of the indication information to increase the reliability of the indication information. In the case in which the transmission region is different or identical for each cell when the indication information is transmitted, as another method for increasing the reliability of the indication information, the indication information may be transmitted by a spreading and/or channel encoding method. The spreading and channel encoding methods may use various techniques. For example, in the case of the spreading, various techniques such as a sequence based spreading technique may be used. In the case of the channel encoding, a simple repetition method, a substantial channel encoding method or the like may be considered.

On the other hand, in the above-mentioned types, only the form in which the indication information is included is assumed. However, the indication information may not necessarily be included.

In one embodiment, the receiving terminal may receive and decode the first service data on the assumption that the second service data can be transmitted in the entire band at any time in advance. However, in this case, since the uncertainty is increased in the receiving terminal, not only the complexity of the receiving terminal but also the performance of the decoding may deteriorate.

Therefore, the method of providing the indication information may be considered in various forms. For example, if there is no receiving terminal requiring the second service data in the current base station or the cell, on/off of the indication information may be controlled by the higher signaling information or the broadcasting information.

First, the meaning of indicating that the indication information is turned on may be a method of continuously allocating a specific resource to information indicating whether a second service data, that is, a URLLC data transmission is generated, as described above. Therefore, the data should be configured in a form except for the resource of the indication information for notifying whether to transmit the second service data, and the transmission/reception should be performed. In addition, a method for transmitting indication information only when the second service data is generated in the above situation may be considered. In this case, a method for setting a length of a sequence for transmitting indication information to make correlation characteristics excellent and transmitting indicating information only when a URLLC service data, which is a second service data, is generated may be considered.

On the other hand, the fact that the indication information is turned off may mean that there is no receiving terminal requiring the second service data in the current base station or the cell. In this case, there is no indication information. That is, it may be the case that only general eMBB service data is transmitted.

On the other hand, it may have trouble coping with the case of determining whether there is a terminal for receiving a second service data in the current base station or the cell. For example, if there is the receiving terminal requiring the second service data in neighboring base stations or cells, the receiving terminal requiring the second service data at any time may perform communication by being handed over from neighboring cells. In this case, it is possible to consider both neighboring base stations or cells.

Contents Including Indication Information

In the above description, when the second service is transmitted to the resource allocated to the first service in a burst in the wireless communication system, various frame structures for notifying indication information for indicating whether to transmit the second service from the base station or the cell to the terminal which is a receiver was described. Hereinafter, a method of configuring actual indication information will be described.

According to the above-mentioned methods, it is possible to indicate whether the second service data is transmitted in the corresponding mini slot by including an accurate time index, i.e., indication information in all mini slots, and it is possible to indicate a coarse time index. As the method for indicating whether to transmit the second service data using the coarse indication information, a method of configuring a group of mini slots or a method of performing an indication in units of a slot was described.

In the case of FIG. 3C or FIG. 6C in which only one indication information is transmitted for each mini slot group, one indication information may consist of 1 bit. Therefore, if there are two groups of mini slots, a total of two bits are required. At this time, 1-bit information may be defined as follows. When the indication information is 0, there is no transmission of the second service data, that is, the URLLC service data, in the corresponding group of the mini slots. On the other hand, when the indication information is 1, there may be the transmission of the second service data, that is, the URLLC service data, in the corresponding group of the mini slots.

On the other hand, in other cases in which reliability is further increased, if one indication information consists of one bit, the entire information is required as many as the sum of the numbers included in each mini slot within the entire one slot. Therefore, a method that can perform indication in an accurate or coarse time index according to each embodiment of FIGS. 3A to 7D was described.

Also, since the method of FIG. 3D, the method of FIG. 4D, the method of FIG. 6D, and the methods of FIG. 7D among each embodiment described above all indicate only whether to transmit the second service data, that is, the URLLC service data, it can be seen that the blind detection method is used from the viewpoint of the time index.

However, the method for notifying it is not described in the frequency resource. Therefore, the blind detection method should be used for the frequency resources. The blind detection method for the frequency resource will be described in more detail in the blind detection of the second service to be described below.

In the above-described methods, in the case in which the size of the indication information is set to be larger, it may be configured to indicate a clear time index and a frequency index. In this case, one indication information may be set to have a size of 3 to 14 bits to notify in which OFDM symbol the second service data is transmitted or in which mini slot the second service data is transmitted. That is, the index of the frequency resource as well as the time index can be indicated more explicitly or implicitly to some extent. To explicitly notify the frequency resource, a lot of information is needed. In addition, there may also be a method for implicitly notifying it to some extent. One embodiment of the method for implicitly allocating a frequency resource will be described below. When explicitly notifying the location of the frequency resource, in the case of notifying in which mini slot and which frequency resource the second service data is transmitted in units of a physical resource block (PRB), approximately 10 bits may be consumed. As described above, whether the second service data is transmitted and the transmission location can be clearly indicated in the time resource and the frequency resource. However, as described above, when the size of the indication information increases, the bandwidth of the system may be wasted.

To reduce the waste of resources, in the case of accurately indicating the time index and coarsely indicating the frequency resource, 3 to 14 bits may be required depending on the OFDM symbol index or mini slot index unit. In case of accurately indicating the time index and coarsely indicating the index of the frequency resource, when the PRB group index is used, it is possible to reduce the number of indication information instead of notifying the accurate frequency resource location information by a few bits.

As another method, there may be a method for notifying an accurate time index and performing the blind detection on the frequency. Such a method may be the methods shown in FIG. 3A or 3B or FIG. 4A or 4B or FIG. 6A or 6B or FIG. 7A or 7B described above. In this case, the number of bits may be determined depending on the number of mini slot indexes.

In addition, as briefly described above, it is also possible not to notify both the time index and the frequency index. In this case, all the terminals should use the blind detection method to notify whether the second service data is included in the first service data. However, as described above, if the blind detection method is used, the complexity of the terminal may be greatly increased, which may not be a preferably form.

Method for Transmitting Indication Information

So far, how to indicate the accurate time index, how to indicate the accurate frequency index or the like is described above. Also, it has been described that the indication information for notifying whether to transmit the second service data may consist of 1 bit. That is, when the indication information is 0, there is no transmission of the second service data, that is, the URLLC service data in the corresponding group of the mini slots, and when the indication information is 1, there may be the transmission of the second service data, that is, the URLLC service in the corresponding group of the mini slots. Of course, when the value of the indication information is 1, there is no transmission of the second service data, that is, the URLLC service data in the corresponding group of the mini slots, and when the value of the indication information is 0, there may be the transmission of the second service data, that is, the URLLC service in the corresponding group of the mini slots.

Next, the method for transmitting 1-bit indication information will be described. The indication information may be transmitted so that the receiving terminal may apply a non-coherent demodulation method. For example, an orthogonal sequence may be used, or a constant amplitude zero auto-correlation (CAZAC) sequence or a Zadoff chu sequence may be used. As another example, a pseudo random sequence, a complex random pattern, or the like may be used.

In one example of the above orthogonal sequence, when the indication information is '0', it may be transmitted by being set as a sequence of '1 1 1 1', and when the indication information is '1', it may be transmitted by being set as a sequence of '1 1 1 −1'. As described above, when a sequence having a length of 4 is used, the transmission form may be transmitted in the same manner as the method of FIGS. 8A to 8C.

FIGS. 8A to 8C are diagrams illustrating a method of transmitting indication information in a case in which a sequence length is 4 according to an embodiment of the present disclosure.

Referring to FIG. 8A, a resource to which '1' or '−1', which is a value of each sequence, is mapped may be a resource element (RE). That is, as illustrated in FIG. 8A, when the indication information is '0', the sequence values of '1, 1, 1, 1' are mapped to four consecutive REs 801, 802, 803, and 804 in a vertical direction (same time axis), and when the indication information is '1', consecutive sequence values of '−1, −1, 1, 1' may be mapped to the four consecutive REs 801, 802, 803 and 804 in the vertical direction (same time axis).

FIG. 8B illustrates a case in which four REs are formed in a rectangular shape. In the example of FIG. 8B, when the indication information is '0', the sequence value of '1' is consecutively (same frequency axis) mapped to the two consecutive REs 811 and 812 on the time axis, and then the sequence value of '1' may be consecutively (same frequency axis) mapped to the consecutive REs 813 and 814 on the frequency axis. In addition, in the example of FIG. 8B, when the indication information is '1', the sequence value of '−1' is consecutively mapped to the two consecutive REs 811 and 812 on the time axis, and then the sequence value of '1' may be consecutively (same frequency axis) mapped to the consecutive REs 813 and 814 on the time axis.

As another sequence mapping method, the method of FIG. 8C is also possible. That is, as illustrated in FIG. 8C, when the indication information is '0', the sequence values of '1, 1, 1, 1' are mapped to four consecutive REs 821, 822, 823, and 824 in a horizontal direction (same frequency axis), and when the indication information is '1', consecutive sequence values of '−1, −1, 1, 1' may be mapped to the four consecutive REs 821, 822, 823 and 824 in the horizontal direction (same frequency axis).

In the above description, the transmission method in which the receiving method can use the non-coherent demodulation method was described. However, the case in which the receiving method can use the coherent demodulation method is possible. The case in which the receiving terminal can use the coherent demodulation method will be described.

To allow the receiving terminal to use the coherent demodulation method, the transmitter, that is, the base station may use a repetition method, a short length block code or the like. As one of the methods, a method for transmitting the same sequence as the indication information may be used. That is, the repetition method may be used. As another method, different sequences may be generated and transmitted as the indication information. That is, it may be a method of using a short length code block.

In addition, it is possible to notify whether the second service data is included from a current (or previous) frequency index to a next (or current) frequency index as well as whether to transmit the second service data by applying the sequence to the second service transmission information. This will be described with reference to FIG. 9.

FIG. 9 illustrates the same configuration as that of FIG. 2 described above according to an embodiment of the present disclosure, but has a difference in that only the second service data 920 may be transmitted by using only resources that are not allocated to the third mini slot among the resources 201 of the eMBB #1 allocated to the first terminal and other terminals. Therefore, FIG. 9 illustrates the case in which the second service data is not transmitted in the eMBB #2 resource 202 allocated to the second terminal, unlike FIG. 2 described above. In addition, to describe the embodiment of the present disclosure, it is to be noted that reference numerals different from those of FIG. 2 are used for only a plurality of indication information 901, 902, 903, 904, 911, 912, 913, and 914 transmitted within the group of the mini slots.

Referring to FIG. 9, a method for notifying whether a second service data is included from a current frequency index to a next frequency index as well as notifying whether to transmit a second service data using an orthogonal sequence will be described.

As the method for using the orthogonal sequence according to the embodiment of the present disclosure, there is a method for indicating whether to indicate a range of a coarse frequency index as well as indicating whether to transmit a second service data in the corresponding group of the mini slots. For example, when the second service data is transmitted within the group of the specific mini slots, the indication information is transmitted by being set to be 1 to indicate that the second service data is transmitted. In this case, the meaning of '1' indicates only whether to transmit the second service data simply within the group of the specific mini slots. However, when four sequences are used as described above, it is possible to notify whether there is the transmission of the second service data within the range from the current frequency index in which the sequence is transmitted to the frequency index in which the next sequence is transmitted as well as whether to transmit the second service data within the group of specific mini slots.

When the second service data, that is, the URLLC service data, exists in the range from the current frequency index to the next frequency index, the sequence value is set to be '1, 1, −1, −1'. However, when the second service data, that is, the URLLC service data does not exists in the range from the current frequency index to the next frequency index, the sequence value is set to be '1, −1, 1, −1'. On the other hand, when the second service data, that is, the URLLC service data does not exist I the corresponding group of the mini slots, the sequence value of '1, 1, 1, 1' is used as described above.

Therefore, referring to FIG. 9, the first indication information 901 located in the first group of the mini slots has a sequence value of '1, 1, −1, −1', and it may be indicated that the second service data, that is, the URLLC service data exists up to the range in which the next indication information exists. In addition, the second indication information 902 located in the first group of the mini slots also has a sequence value of '1, 1, −1, −1', and it may be indicated that the second service data, that is, the URLLC service data exists up to the range in which the next indication information exists. In addition, the third indication information 903 located in the first group of the mini slots also has a sequence value of '1, −1, 1, −1', and it may be indicated that the second service data, that is, the URLLC service data does not exist up to the range in which the next indication information exists. Similarly, the fourth indication information 904 located in the first group of the mini slots also has a sequence value of '1, 1, −1, −1', and it may be indicated that the second service data, that is, the URLLC service data does not exist up to the range in which the next indication information exists.

If this is applied to the second group of the mini slots, there is no second service data even in any mini slots in the second group. Therefore, the indication information 911, 912, 913, and 914 located in the second group all should have a value of '0'. Therefore, the indication information 911, 912, 913, and 914 located in the second group all may be set to have sequence values of '1, 1, 1, 1' which is a sequence corresponding to the indication information '0'.

In this way, when the second service data is transmitted through any one of the mini slots in the group of the mini slots, the coarse time index and the frequency index may be notified.

Although the above-mentioned embodiment has been described with reference to FIG. 4C, it is obvious that the indication information transmission structure described in FIGS. 3A to 7D may be applied. In addition, in the structure for transmitting the indication information in the resource allocated to each terminal, for example, in FIGS. 6A to 7D, since the channel conditions between the base station and each terminal may be different from each other, the received signal-to-noise ratios of each terminal may be different. Therefore, the indication information transmitted to each terminal may be applied with different modulation methods and different channel encoding methods or channel encoding rates, may be mapped by the sequence having different lengths, and may be transmitted by differently allocating the resource amount used for the indication information transmission. The case in which each terminal has the different channel environment as described above has already been described in the embodiment of FIG. 6A described above, and therefore the additional description will be omitted.

Blind Detection Method of Transmission Location of Second Service

The frame structure for notifying the transmission of the second service data when the second service data is transmitted using at least some of the resources allocated to the first service data transmission of the specific terminal in the wireless communication system, the method for transmitting indication information, the contents of the indication information or the like will be described. Hereinafter, a method for detecting, by a receiving terminal, a first service data and a second service data actually allocated to a specific terminal will be described.

Hereinafter, a method for identifying, by a receiving terminal, an eMBB service data which is a first service data and a URLLC service data which is a second service data will be described.

First, referring to FIG. 9, the first terminal may use the indication information as described above to confirm whether the second service data is included in the resource area allocated to the first terminal in the first resource, eMBB #1 resource 201, allocated to receive the first service data. In addition, in the case of using the special sequence, the coarse frequency index as well as the location of the slot may be recognized. However, it is not possible to exactly recognize how far the second service is transmitted by the indication information alone. Therefore, if the receiving terminal does not process and transmit the data to be able to recognize the second service data, the first terminal receiving the first service data as well as the terminal receiving the second service may not be able to process the received data.

Accordingly, as one method, the present disclosure proposes a method for transmitting data by performing specific scrambling on a second service data, that is, a URLLC service. For example, in the case of using a scrambling sequence for changing only the phase of the second service data, the blind detection is possible since the phases between the second service data and the first service data are different from each other. As another method, a scrambling sequence in which the amplitude and the phase are changed together may be used. In this case, since the amplitudes and the phases between the second service data and the first service data are different from each other, the blind detection may be performed easier.

There is a method of applying a constant phase shifted QAM constellation as another method for processing data to allow a receiving terminal to recognize a second service data. This will be described with reference to FIGS. 10A and 10B.

Figure 10A:
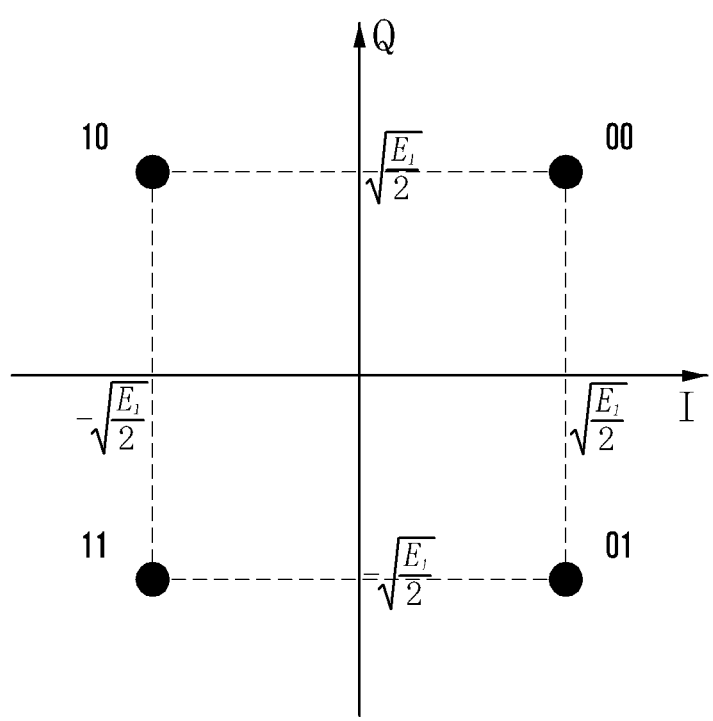
FIGS. 10A and 10B are diagrams for explaining a case of applying a fixed phase-shifted quadrature amplitude modulation (QAM) constellation according to an embodiment of the present disclosure.
Figure 10B:
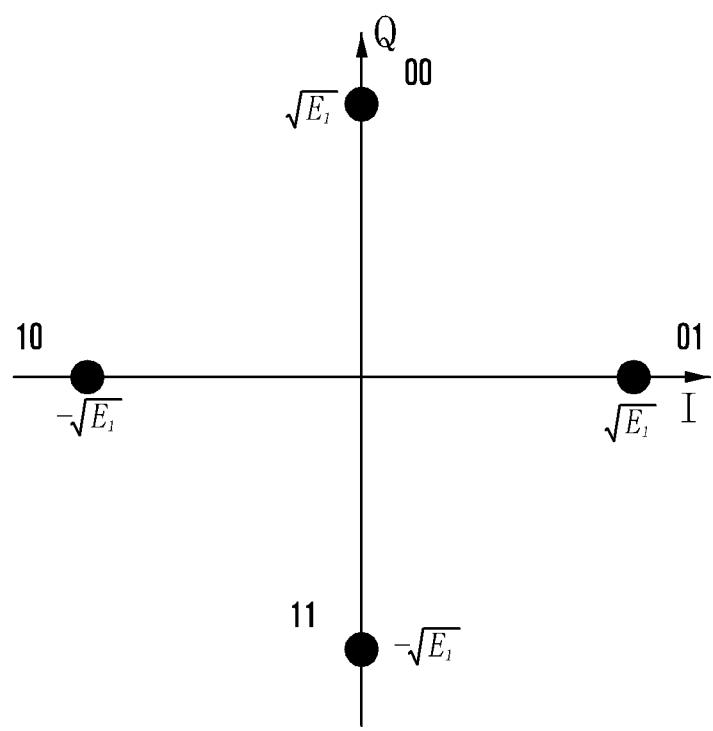

FIGS. 10A and 10B are diagrams for explaining a case of applying a fixed phase-shifted QAM constellation according to an embodiment of the present disclosure.

Referring to FIG. 10A, illustrates a QAM constellation used to transmit the first service data. That is, it is a constellation corresponding to a modulation method of data used in a wireless communication system when a resource is generally allocated and data is transmitted through the allocated resource. Therefore, the constellation of FIG. 10A may be used when transmitting the eMBB service data.

The present disclosure proposes the form in which the constellation is changed and used as illustrated in FIG. 10B to identify the second service data from the first service data. That is, for the URLLC service data which is the second service data, the first service data and the second service data may be identified by using the constellation in which the phase is changed by 45° in the original constellation diagram.

Also, the case in which the phase change in the constellation is 45° may be only one embodiment, and therefore the phase may be variously changed such as 30°, 60°, and 90°.

When the constellations for each service are changed as illustrated in FIGS. 10A and 10B, this may be predefined or notified to all terminals in the cell through the URLLC DCI or RRC.

It is possible to determine whether the second service data is transmitted to the area of the resource allocated to the first service data using an operation such as the following Equation 1 as a method for identifying, by a receiving terminal, a first service data from a second service data using the above-mentioned method.

$$L_k = \sum_{i=1}^{N_i} \log \left( \frac{\frac{1}{M_{eMBB}} \sum_{i=1}^{M_{eMBB}} \frac{1}{\pi\sigma^2} \exp\left(-\frac{|Y[l] - H[l]s_e^{eMBB}|^2}{\sigma^2}\right)}{\frac{1}{M_{URLLC,k}} \sum_{i=1}^{M_{URLLC,k}} \frac{1}{\pi\sigma^2} \exp\left(-\frac{|Y[l] - H[l]s_{k,i}^{URLLC,k}|^2}{\sigma^2}\right)} \right) \quad \text{Equation 1}$$

In the above Equation 1,
$N_s$: Number of sample for blind detection
Y[l]: Receiver signal for lth RE,
$s_l^{eMBB}$: candidate modulation symbol for eMBB,
$M_{eMBB}$: Modulation order of eMBB,
H[l]: Fading channel coefficient for lth RE,
$s_{K,i}^{URLLC}$: candidate modulation symbol for URLLC,
$M_{URLLC,k}$: Candidate kth modulation order of URLLC, and
$\sigma^2$: Noise variance.

Therefore, if $L_k$ is greater than 0 for all k, it is the first service data, that is, the eMBB service data, or otherwise, is not the first service data, that is, the eMBB service data. If it is not the first service data, it is the URLLC service data which is the second service data.

In addition, the phase value or the scrambling sequence may also be predefined and specified in the standard, or may be determined in each base station or cell and indicated to the eMBB/URLLC terminals through the URLLC DCI or RRC. In another form, the phase or the scrambling sequence may be configured to change at a constant period, or may also be set to have the same value at all times.

Configuration and Operation of Base Station Apparatus and Terminal Apparatus

Figure 11:
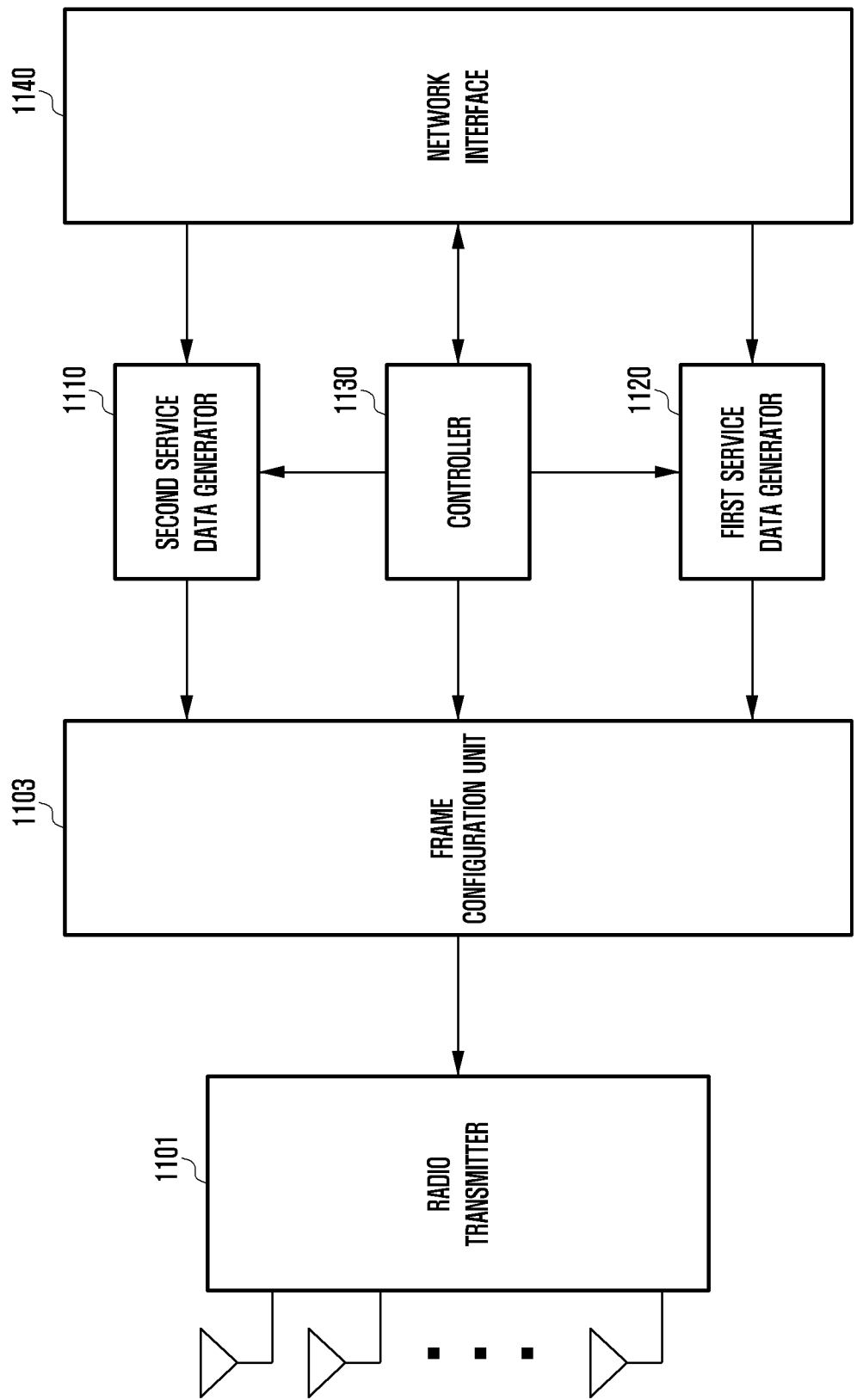
FIG. 11 is a block configuration diagram of a base station apparatus according to an embodiment of the present disclosure.

FIG. 11 is a block configuration diagram of a base station apparatus according to an embodiment of the present disclosure.

FIG. 11 is a functional block diagram in terms of the transmission of the base station that transmits the first service data and the second service data according to the present disclosure. Therefore, the base station may further have other configurations other than the block configuration of FIG. 11 but they are parts that may obscure the gist of the present disclosure, and therefore only an illustrative configuration is exemplified.

Referring to FIG. 11, a plurality of antennas and radio transmitter 1101, a frame configuration unit 1103, a second service data generator 1110, a first service data generator 1120, a controller 1130, and a network interface 1140 may be included.

The network interface 1140 may provide an interface for communicating with neighboring base stations or cells or for transmitting or receiving data or control information to or from an upper node. For example, the network interface 1140 may receive data to be transmitted to a specific terminal and provide the data to the controller 1130 and the corresponding data processor. For example, the network interface 1140 may provide the first service data to the first service data generator 1120 when the data to be transmitted to the specific terminal is the first service data, and provide the second service data to the second service data generator 1110 when the data to be transmitted to the specific terminal is the second service data. In addition, when a specific data is received, the network interface 1140 may notify the controller 1130 of the specific data.

The controller 1130 may control to detect the type of the received data, and in the case of the first service data, perform scheduling for transmitting the first service data, and then transmit the first service data through the resource area scheduled by the first service data generator 1120. In addition, when the type of the received data is the second service data, the controller 1130 may control to perform the scheduling for transmitting the second service data and transmit the corresponding resource area from the second service data generator 1110.

In addition, the controller 1130 may generate the indication information according to the present disclosure and provide the generated indication information to the frame configuration unit 1103. The indication information may be configured as described above, and therefore the additional description will be omitted herein.

The first service data generator 1120 and the second service data generator 1110 may all generate data in a manner set in each of them. At this time, the data generation may mean an operation of dividing data in a specific unit, modulating data according to a modulation order, encoding, and the like. That is, it may include an operation for mapping to the constellation described above.

Hereinafter, the frame configuration unit 1103 may perform the mapping to the allocated resources using the data received from the first service data generator 1120 and the second service data generator 1110. In addition, the frame configuration unit 1103 may configure a frame including the indication information received from the controller 1130. Accordingly, the mapping may be performed by any of the methods illustrated in FIGS. 2 to 7D described above. The signal output from the frame configuration unit 1103 is input to the radio transmitter 1101.

The radio transmitter 1101 may perform band up-conversion of a received baseband signal into a radio frequency (RF) signal of a band set in the radio communication system, amplify power, and transmit first service data and/or second service data through a plurality of antennas. In addition, a digital-to-analog converter may be included between the radio transmitter 1101 and the frame configuration unit 1103. It should be noted that these specific configurations may obscure the gist of the present disclosure and therefore are omitted.

In the 5G wireless communication system, a very large number of array antennas may be basically used, and therefore a plurality of antennas connected to the radio transmitter 1101 are illustrated in FIG. 11.

Figure 12:
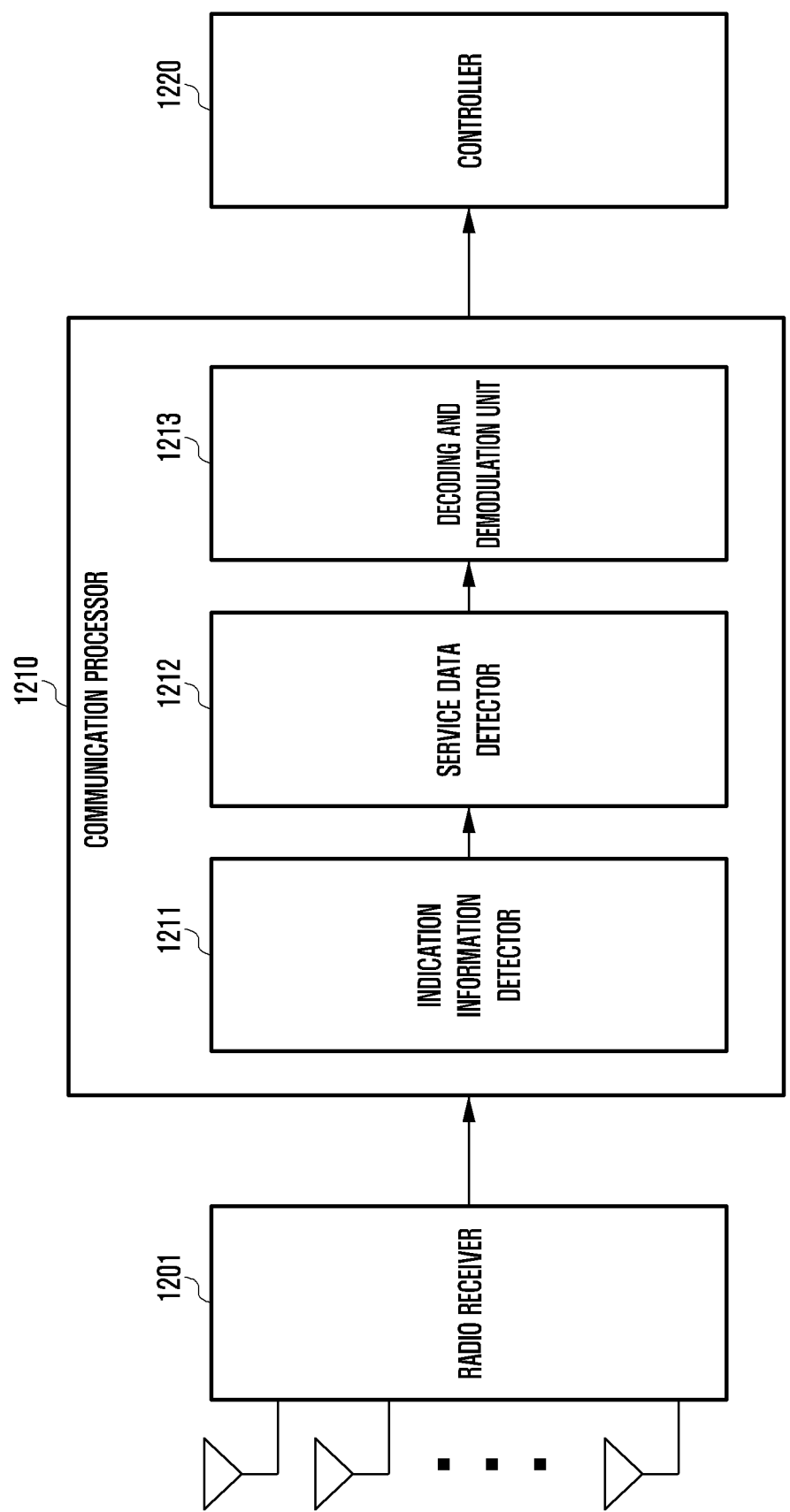
FIG. 12 is a block configuration diagram of a receiving terminal according to an embodiment of the present disclosure.

FIG. 12 is a block configuration diagram of a receiving terminal according to an embodiment of the present disclosure.

The configuration of FIG. 12 is a functional block diagram for describing the configuration of the terminal receiving the first service data. Therefore, it is noted that all of them are omitted except for the functional configuration for receiving the first service data.

Referring to FIG. 12, a wireless receiver 1201 connected to a plurality of antennas, a communication processor 1210, and a controller 1220 may be included. The wireless receiver 1201 may low-noise amplify the received radio signal and perform band down-conversion of the amplified radio signal to output the baseband signal.

The baseband signal converted by the wireless receiver 1201 may be input to the communication processor 1210. It should be noted that an analog-to-digital converter may be included between the communication processor 1210 and the wireless receiver 1201, but it may obscure the gist of the present disclosure and therefore only an illustrative configuration is exemplified.

The communication processor 1210 may include an indication information detector 1211, a service data detector 1212, and a decoding and demodulation unit 1213. As described above, the indication information detector 1211 is a configuration for detecting whether the second service data is transmitted to the resource allocated for the reception of the first service data, and may allocate it to the specific resource as described above. The indication information detector 1211 may detect the indication information in the received slot, in the mini slot, or in the group of the mini slots and detect whether the second service data is included. As described above, it is possible to provide the service data detector 1212 with whether to detect the second service data.

The service data detector 1212 may output the received data by removing the service data according to whether the second service data exists in the received data using the received indication information or output the received data as it is. For example, if the second service data is included in the specific mini slot, in the group of the mini slots, or in the slot, the location of the second service data is detected using one of the methods described above, the corresponding data is punctured and then supplied to decoding and demodulation unit. In addition, if the second service data does not exist in the received data using the received indication information, the service data detector 1212 may puncture only the indication information from the received data and provide the received data to the decoding and demodulation unit 1213.

The decoding and demodulation unit 1213 may demodulate and decode the corresponding data using the data input from the service data detector 1212. At this time, the decoding and demodulation unit 1213 may have different codebooks depending on whether the second service data exists or not, as described above. Therefore, the decoding and demodulation unit 1213 may perform decoding and demodulation using different codebooks according to the case where the second service data is punctured from the received data and the second service data is received without the second service data.

The controller 1220 may be configured as an application processor and may receive information processed by the communication processor. For example, if the first service data is image data, an operation for processing an image can be performed, and if the first service data is voice or message data, processing may be performed accordingly. That is, the controller 1220 may perform a control according to the application of the electronic device.

Figure 13:
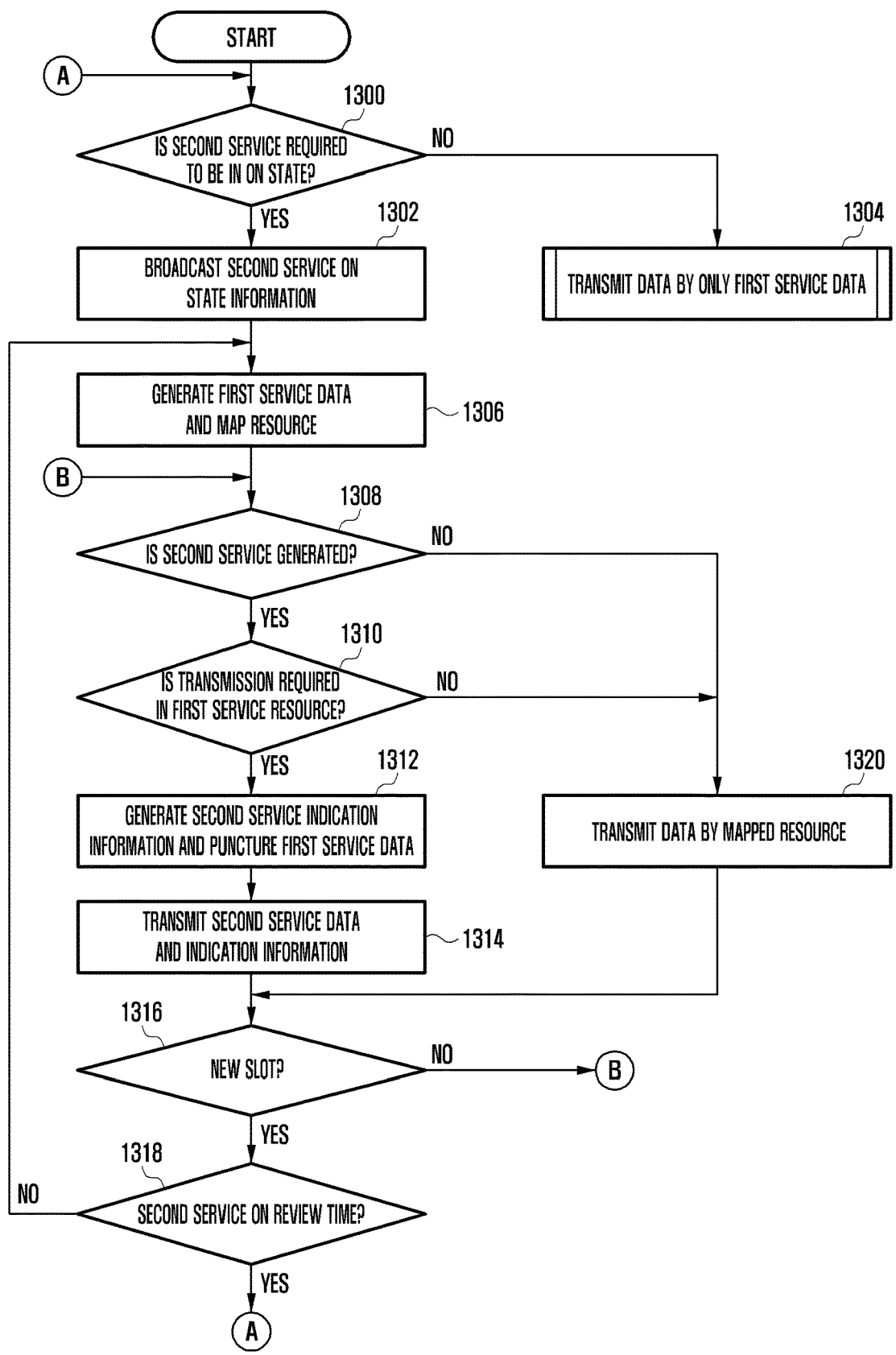
FIG. 13 is a control flowchart for transmitting a first service data and a second service data in the base station according to an embodiment of the present disclosure.

FIG. 13 is a control flowchart for transmitting a first service data and a second service data in the base station according to an embodiment of the present disclosure.

Referring to FIG. 13, the configuration of the base station will be described using the configuration of FIG. 11 described above. In addition, the base station may also be replaced by a cell or by another control node. Hereinafter, the terminology of the base station is used for convenience of description.

The controller 1130 of the base station may check whether the second service is required to be in an on state at operation 1300. The checking in the operation 1300 may be performed at a predetermined time period or may be performed when the power of the base station is turned on. In addition, it is possible to set the state in which the second service is unconditionally required to be in an on state without performing the operation 1300. Here, the checking on whether the second service is required to be in an on state in a predetermined period unit may be performed by checking whether the terminal receiving the second service data exists in the communication area of the current base station or in the communication area of base stations neighboring to the base station, and may be set based on the indicated information from the upper node.

If it is determined as a result of the check at operation 1300 that the second service is required to be in an on state, the controller 1130 of the base station proceeds to operation 1302, otherwise proceeds to operation 1304. Since the second service data does not generally exist at operation 1304, the first service data and other service data may be transmitted. However, if the on/off state of the second service is notified periodically, the second service off state may be broadcast through the control information at operation 1304. That is, it indicates that there is no terminal receiving the URLLC service data, which is the second service data, among the terminals connected to the base station and may be the form in which the indication information is inactivated in the first service data to be transmitted. Other operations 1304 correspond to the operation of transmitting general first service data only, a description thereof will be omitted herein.

If the controller 1130 of the base station proceeds to the operation 1302, the information that the second service is turned on may be broadcast. The on-state broadcast of the second service may be transmitted to all the terminals in the base station using the RRC signal or using other control information. The on-state of the second service may mean that there is the terminal receiving the URLLC service data, which is the second service data, among the terminals connected to the base station and the form in which the indication information is activated in the first service data to be transmitted.

Thereafter, the controller 1130 of the base station proceeds to operation 1306 to generate the first service data and map the generated first service data to the resource. In this case, since the terminal receiving the second service data exists in operation 1306, the controller 1130 of the base station may perform the mapping considering the resource to which the indication information is allocated when mapping the first service data. In addition, the controller 1130 of the base station may perform the mapping without considering the resource to which the indication information is allocated when mapping the first service data. In this case, the base station may be operated to transmit the first service data using the corresponding resource in the situation in which the indication information is not transmitted, and puncture the data of the first service from the resource and transmit the indication information in the situation in which the indication information is transmitted.

Thereafter, the controller 1130 of the base station may check whether the second service is generated in operation 1308. As a result of the check in the operation 1308, when the second service data has been generated, it proceeds to operation 1310 and when the second service data is not generated, the process proceeds to operation 1320.

First, when the second service data is not generated, the controller 1130 of the base station may transmit the service data using the mapped resource in the operation 1320. First, if the second service data is not generated, the controller 1130 of the base station may control to transmit only the first service data using the mapped resource. The controller 1130 of the base station may proceed to operation 1316 after transmitting the specific mini slot in operation 1320. In operation 1320, the data transmission unit may be the units of the mini slot, the group unit of the mini units, or the slot unit. Hereinafter, for the sake of convenience of description, the description will be made based on the units of the mini slot.

On the other hand, if the process goes from operation 1308 to operation 1310, the controller 1130 of the base station may check whether the transmission is required in the first service resource. That is, it is checked whether the resource area for transmitting the second service data should be transmitted through the resource allocated to the first service data. When the second service data may be transmitted through another unallocated resource other than the resource required for transmission of the first service data, the process may proceed to the operation 1320 after allocating the second service resource. It should be noted that the contents of allocating the second service data resource are omitted in FIG. 13. When the resources for the second service data transmission and the resources for the first service data transmission do not overlap with each other as described above, they may be transmitted using the allocated resources.

On the other hand, as a result of the check in operation 1310, when the transmission is required in the first service resource, the controller 1130 of the base station proceeds to the operation 1312 to generate the indication information for notifying that the second service data is transmitted and puncture the first service data in the resource transmitting the first service data. Thereafter, in operation 1314, the controller 1130 of the base station may control to include the second service data in the location at which the first service data is punctured and transmit the data after performing the mapping to include the previously configured indication information. At this time, the indication information may be transmitted in the same mini slot as the second service data, or may be transmitted in the next mini slot. The location of the mini slot to which the indication information is transmitted has already been described above, and therefore the redundant description will be omitted.

Then, the controller 1130 of the base station proceeds to operation 1316 to check whether a new slot needs to be transmitted. Operation 1316 is the same as the operation of checking whether the transmission of all mini slots included in one slot is completed as described above. As a result of the check in the operation 1316, when the transmission of all mini slots is completed, the controller 1130 of the base station proceeds to the operation 1318, or otherwise proceeds to the operation 1308.

If it proceeds from the operation 1316 to the operation 1318, the controller 1130 of the base station may check the on/off review time of the second service. That is, it is checked whether the broadcasting time arrives by periodically checking the on/off of the second service second service. As a result of the check in operation 1318, when the time to check the on/off of the second service arrives, the controller 1130 of the base station proceeds to the operation 1300. However, as a result of the check in the operation 1318, when the time to check the on/off of the second service does not arrive, the controller 1130 of the base station proceeds to the operation 1306.

Figure 14:
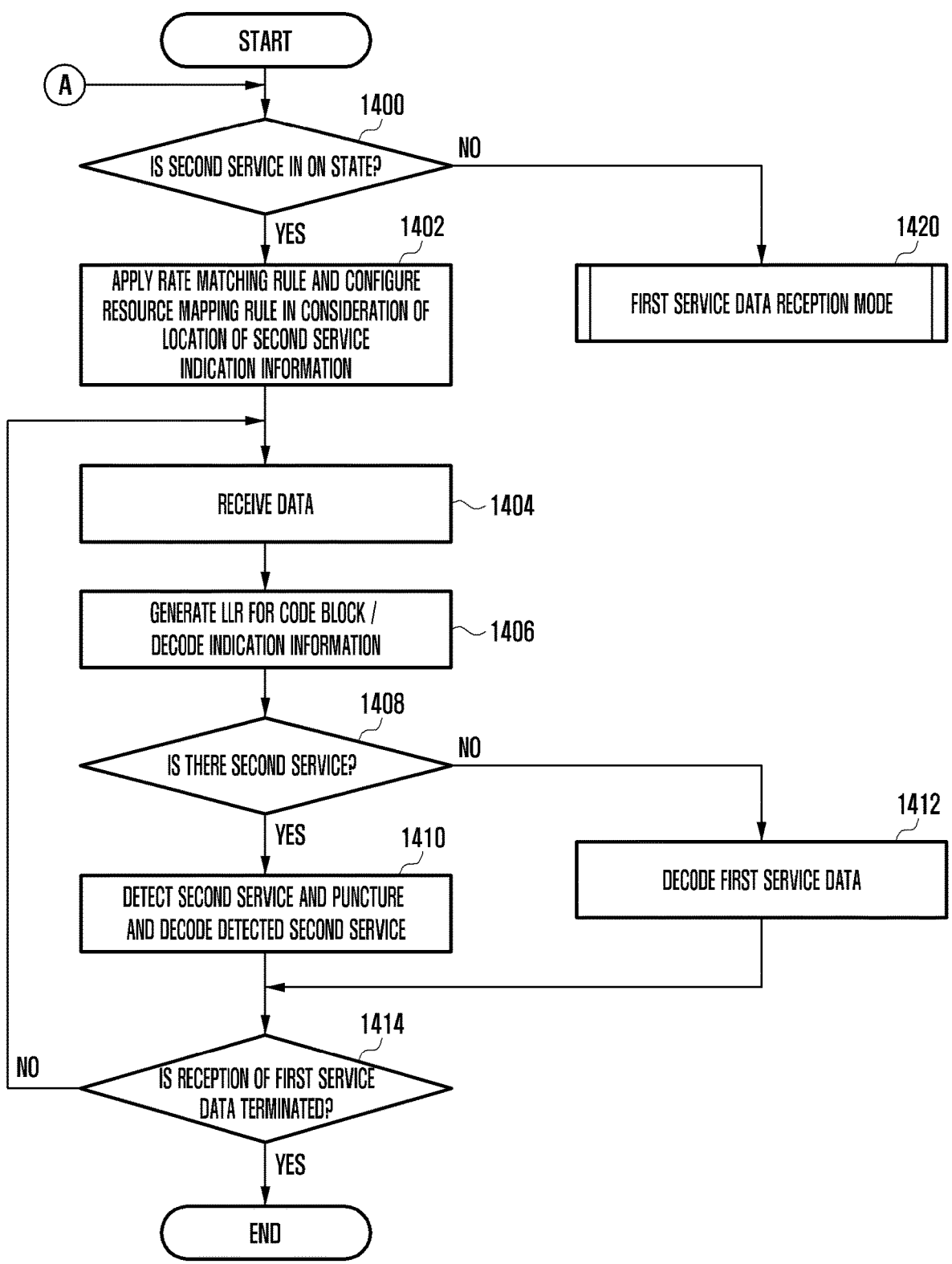
FIG. 14 is a control flowchart for receiving a first service data and a second service data in the receiving terminal according to an embodiment of the present disclosure.

FIG. 14 is a control flowchart for receiving a first service data and a second service data in the receiving terminal according to an embodiment of the present disclosure.

Referring to FIG. 14, the configuration of the receiving terminal will be described using the configuration of FIG. 12 described above. In addition, the receiving terminal may be a terminal capable of receiving the second service data as well as the first service data. In addition, the receiving terminal may also receive other service data. However, since FIG. 14 is a control flow diagram from the viewpoint of receiving the first service data, the operation in the terminal receiving the first service data will be described.

In operation 1400, the communication processor 1210 of the terminal may check whether the second service is in an on state based on information previously received by the base station. If the second service is in an on state, as a result of the check in the operation 1400, the communication processor 1210 may proceed to operation 1402 when the second service is in an on state and proceed to operation 1420 when the second service is in an off state. As described above, when the second service is in the off state, since the indication information may also not be received, the operation 1420 may be the state in which only the first service data is received.

If the communication processor 1210 proceeds to the operation 1402, it activates the indication information detector 1211, the service data detector 1212, and the decoding and demodulation unit 1213 described above. The communication processor 1210 may apply a rate matching rule considering the location of the second service indication information and set a RE mapping rule. For example, even when only the first service data is transmitted, it may be transmitted including the indication information. Therefore, it is possible to set the rate matching considering the size and location of the indication information, a mapping rule by which the indication information is mapped to the resource RE, or the like.

Thereafter, the communication processor 1210 controls to receive data through the wireless receiver 1201 in operation 1404, and proceeds to operation 1406 to generate an LLR value for the code block CB. In addition, the communication processor 1210 also decodes the indication information from the received data. The communication processor 1210 may proceed to operation 1408 to check whether the second service data exists using the decoded result. It is determined as a result of the check in the operation 1408 that when the second service data exists, it proceeds to operation 1410 and when the second service data does not exist, it proceeds to operation 1412.

First, if it proceeds to the operation 1412, the communication processor 1210 may perform the decoding of the first service data since the second service data is received. The decoded first service data may be provided to the controller 1220 of the terminal. In the flowchart of FIG. 14, the contents of the complex automatic retransmission or the retransmission protocol are omitted, and it is assumed that the decoding is always successful.

On the other hand, as a result of the check in the operation 1408, when the second service data exists, the communication processor 1210 proceeds to operation 1410 to detect the second service data from the received data and puncture the second service data, thereby performing the decoding. The method for detecting a second service data may be variously configured according to the method in which the indication information indicates the frequency index and the time index as described above. That is, when both the frequency index and the time index are accurately indicated, it can be detected simply. On the other hand, if at least one of the frequency index and the time index does not exist or is coarsely indicated, the blind detection method may be used. The examples for the blind detection method have already been described above, and the redundant description will be omitted herein.

Finally, the communication processor 1210 may proceed to operation 1414 to check whether the reception of the first service data is terminated. As a result of the check in the operation 1414, when the reception of the first service data is terminated, the communication processor 1210 may terminate the routine. On the other hand, if the reception of the first service data is not terminated, the communication processor 1210 may proceed to operation 1404.

Figure 15A:
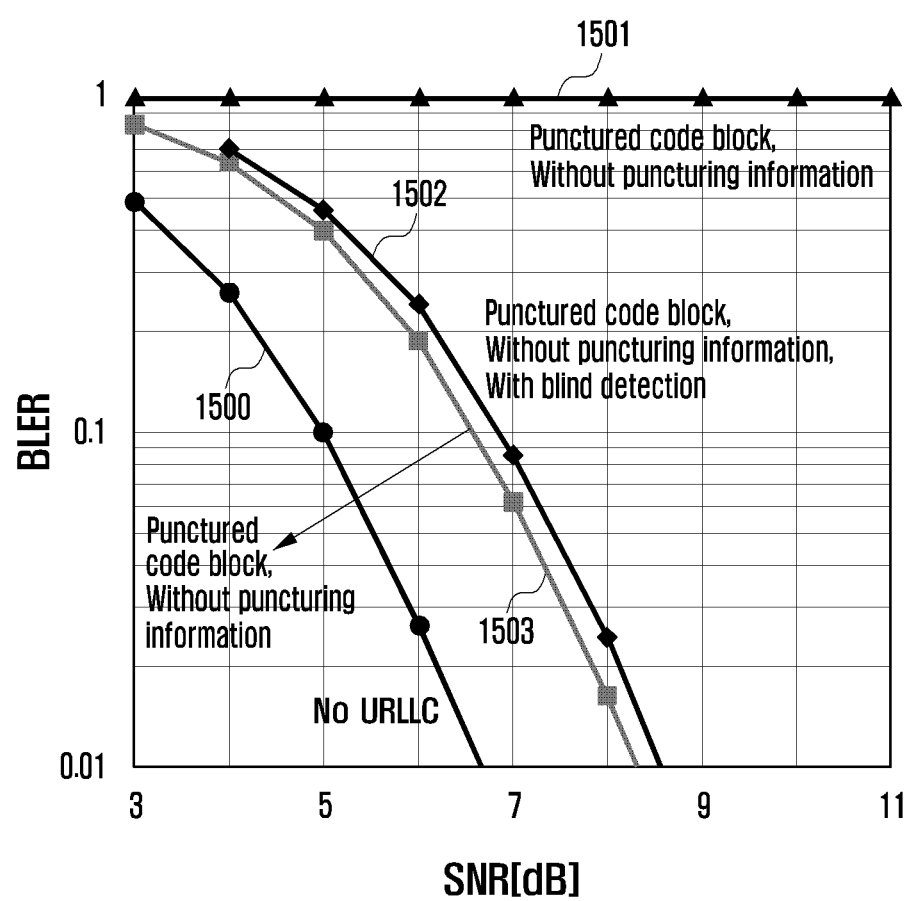
FIGS. 15A and 15B are simulation result graphs according to an embodiment of the present disclosure.
Figure 15B:
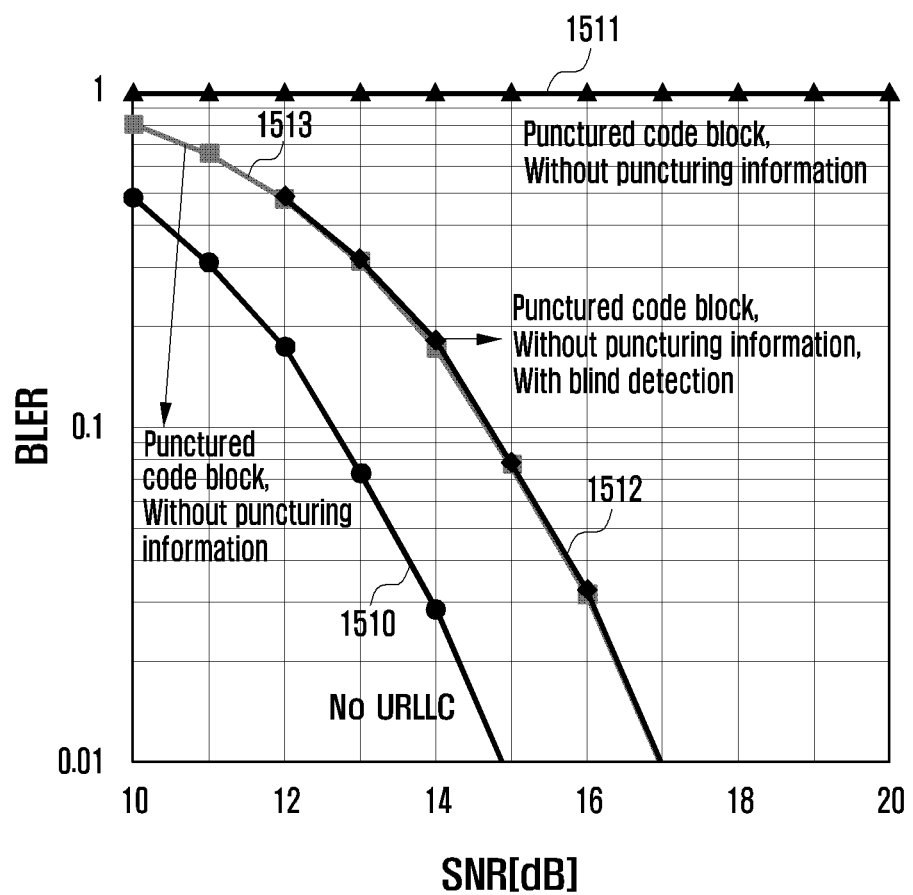

FIGS. 15A and 15B are simulation result graphs according to an embodiment of the present disclosure.

FIG. 15A illustrates a simulation graph of a signal to noise ratio (SNR) versus a block error rate (BLER) when the present is applied or not applied in the case in which the QPSK scheme is used for the first service data and the second service data, that is, the eMBB service data and the URLLC service data, respectively, and FIG. 15B illustrates a simulation graph of a SNR versus a BLER when the present is applied or not applied in the case in which the 16 QAM scheme and the QPSK scheme are used for the first service data and the second service data, that is, the eMBB service data and the URLLC service data, respectively.

Referring to FIG. 15A, reference numeral 1500 denotes a simulation graph of the SNR versus the BLER when only first service data is transmitted, and reference numeral 1501 denotes a simulation graph when the second service data is transmitted by being included in at least some of the resources allocated to the first service data and the receiving terminal does not know that the second service data is transmitted.

That is, in a normal case, the SNR versus the BLER should be displayed as in the graph 1500. However, if some of the second service data is inserted into the resource allocated to the first service data in a burst manner and if such information is not provided to the receiving terminal, the phenomenon that the receiving terminal may not process it in the entire data received occurs.

However, by applying the above-mentioned methods, the graph of the SNR versus the BLER may be changed similarly to the case in which only the first service data is transmitted as in reference numerals 1502 or 1503. The simulation graph 1502 is a graph of SNR versus BLER when the second service data is blind detected and information on from which of the resources allocated to the first service data the second service data is transmitted is not provided. The graph 1503 of the SNR versus BLER having more improved characteristics than that of reference numeral 1502 is a graph when the information on from which of the resources allocated to the first service data the second service data is transmitted is not provided.

Compared to the case of originally transmitting only the first service data, the reason why the graphs 1502 and 1503 are in the deteriorated form is that some of the first service data to be originally transmitted may not be transmitted. Therefore, the deterioration may be inevitable as much as the second service data is transmitted.

On the other hand, FIG. 15B can be understood in the same form as in FIG. 15A. That is, the graphs of FIGS. 15A and 15B of reference numeral 1510 merely show that the first service data is changed from the QPSK to the 16QAM. Therefore, the graph 1500 in FIG. 15A corresponds to the graph 1510 in FIG. 15B, the graph 1501 in FIG. 15A corresponds to the graph 1511 in FIG. 15B, the graph 1502 in FIG. 15A corresponds to the graph of 1512 in FIG. 15B, and the graph 1503 in FIG. 15A corresponds to the graph 1513 in FIG. 15B.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting data from a base station, the method comprising:
transmitting, to a terminal through a high layer signaling, configuration information for configuring the terminal to monitor control information associated with an interrupted transmission;
generating the control information notifying at least one resource group associated with no transmission for the terminal, wherein at least a part of the at least one resource group was scheduled for the terminal; and
transmitting, to the terminal, the control information,
wherein the control information includes 14 bits,
wherein each bit of the control information is mapped to each of resource groups,
wherein the each of resource groups includes at least one orthogonal frequency division multiplexing (OFDM) symbol and at least one physical resource block (PRB),
wherein the each bit of the control information has a bit value of 0 or 1, and
wherein the bit value of 0 indicates transmission to the terminal in the corresponding resource group, and the bit value of 1 indicates no transmission to the terminal in the corresponding resource group.

2. The method of claim 1, wherein the at least one resource group is allocated for the interrupted transmission of an ultra-reliable and low latency communication (URLLC) service data for a first terminal.

3. A base station for transmitting data, the base station comprising:
a radio transmitter configured to transmit the data in a transmission band; and
at least one processor configured to:
transmit, to a terminal through a high layer signaling, configuration information for configuring the terminal to monitor control information associated with an interrupted transmission for the terminal,
generate the control information notifying at least one resource group associated with no transmission for the terminal, wherein at least a part of the at least one resource group was scheduled for the terminal, and
transmit, to the terminal, the control information,
wherein the control information includes 14 bits,
wherein each bit of the control information is mapped to each of resource groups,
wherein the each of resource groups includes at least one orthogonal frequency division multiplexing (OFDM) symbol and at least one physical resource block (PRB),
wherein the each bit of the control information has a bit value of 0 or 1, and
wherein the bit value of 0 indicates transmission to the terminal in the corresponding resource group, and the bit value of 1 indicates no transmission to the terminal in the corresponding resource group.

4. The base station of claim 3, wherein the at least one resource group is allocated for the interrupted transmission of an ultra-reliable and low latency communication (URLLC) service data for a first terminal.

5. A method for receiving, by a terminal, a data from a base station in a terminal, the method comprising:
receiving, from the base station through a high layer signaling, configuration information for configuring the terminal to monitor control information associated with an interrupted;
receiving, from the base station, the control information; and
receiving, from the base station through a data channel, the data based on the configuration information and the control information,
wherein the control information notifies at least one resource group associated with no transmission for the terminal,
wherein at least a part of the at least one resource group is scheduled for the terminal,
wherein the control information includes 14 bits,
wherein each bit of the control information is mapped to each of resource groups,
wherein the each of resource groups includes at least one orthogonal frequency division multiplexing (OFDM) symbol and at least one physical resource block (PRB),
wherein the each bit of the control information has a bit value of 0 or 1, and
wherein the bit value of 0 indicates transmission to the terminal in the corresponding resource group, and the bit value of 1 indicates no transmission to the terminal in the corresponding resource group.

6. The method of claim 5, wherein the at least one resource group is allocated for the interrupted transmission of an ultra-reliable and low latency communication (URLLC) service data for a first terminal.

7. A terminal for receiving data, the terminal comprising:
a wireless receiver configured to convert a radio signal received through a set band into a baseband signal; and
a communication processor configured to:
receive, from a base station through a high layer signaling, configuration information for configuring the terminal to monitor control information associated with an interrupted transmission,
receive, from the base station, the control information, and
receive, from the base station through a data channel, the data based on the configuration information and the control information,
wherein the control information notifies at least one resource group associated with no transmission for the terminal,
wherein at least a part of the at least one resource group is scheduled for the terminal,
wherein the control information includes 14 bits,
wherein each bit of the control information is mapped to each of resource groups,
wherein the each of resource groups includes at least one orthogonal frequency division multiplexing (OFDM) symbol and at least one physical resource block (PRB),
wherein the each bit of the control information has a bit value of 0 or 1, and
wherein the bit value of 0 indicates transmission to the terminal in the corresponding resource group, and the bit value of 1 indicates no transmission to the terminal in the corresponding resource group.

8. The terminal of claim 7, wherein the at least one resource group is allocated for the interrupted transmission of an ultra-reliable and low latency communication (URLLC) service data for a first terminal.

* * * * *